United States Patent [19]

Drori et al.

[11] Patent Number: 5,081,667
[45] Date of Patent: Jan. 14, 1992

[54] SYSTEM FOR INTEGRATING A CELLULAR TELEPHONE WITH A VEHICLE SECURITY SYSTEM

[75] Inventors: Ze'ev Drori, Los Angeles; Robert M. Woskow, Encino, both of Calif.

[73] Assignee: Clifford Electronics, Inc., Chatsworth, Calif.

[21] Appl. No.: 497,107

[22] Filed: Mar. 20, 1990

Related U.S. Application Data

[63] Continuation-in-part of Ser. No. 345,654, May 1, 1989, abandoned.

[51] Int. Cl.⁵ .......................................... H04M 11/00
[52] U.S. Cl. ...................................... 379/59; 379/44; 340/426; 340/539; 340/993; 290/38 C
[58] Field of Search .......... 290/38 C; 340/441, 425.5, 340/426, 531, 539, 825.31, 993; 379/57–60, 63, 39, 41, 44; 455/33, 54

[56] References Cited

U.S. PATENT DOCUMENTS

| | | | |
|---|---|---|---|
| Re. 32,856 | 2/1989 | Millsap | 340/539 |
| 2,698,391 | 12/1954 | Braden et al. | |
| 2,748,759 | 6/1956 | Schiffer | |
| 2,836,732 | 5/1958 | Newlin | |
| 2,975,296 | 4/1961 | Dominguez | |
| 3,078,834 | 2/1963 | Wright | |
| 3,357,417 | 12/1967 | Baumann | |
| 3,455,403 | 7/1969 | Hawthorne | |
| 3,530,846 | 9/1970 | Bean et al. | |
| 3,538,898 | 11/1970 | Edgemir | |
| 3,633,040 | 1/1972 | Baxter | |
| 3,657,720 | 4/1972 | Audenko et al. | 290/38 C |
| 3,696,333 | 10/1972 | Mott | |
| 3,718,899 | 4/1971 | Rollins | 340/993 |
| 3,859,540 | 1/1975 | Weiner | |
| 4,177,466 | 12/1979 | Reagan | 340/63 |
| 4,200,080 | 5/1980 | Cook et al. | |
| 4,236,594 | 12/1980 | Ramsperger | |
| 4,345,554 | 8/1982 | Hildreth et al. | |
| 4,392,059 | 7/1983 | Nespor | |
| 4,606,307 | 8/1986 | Cook | |
| 4,674,454 | 6/1987 | Phairr | |
| 4,688,244 | 8/1987 | Hannon et al. | 379/44 |
| 4,718,080 | 1/1988 | Serrano et al. | 379/59 |
| 4,736,461 | 4/1988 | Kawasaki et al. | 455/38 |
| 4,750,197 | 6/1988 | Dewekamp et al. | 379/59 |
| 4,754,255 | 6/1988 | Sanders et al. | 340/64 |
| 4,794,649 | 12/1988 | Fujiwara | 455/38 |
| 4,809,316 | 2/1989 | Namekawa | 379/58 |
| 4,821,309 | 4/1989 | Namekawa | 379/58 |
| 4,860,336 | 8/1989 | D'Avello et al. | 379/63 |
| 4,887,064 | 12/1989 | Drori et al. | 340/426 |
| 4,893,240 | 1/1990 | Karkouti | 290/38 C |
| 4,904,983 | 2/1990 | Mitchell | 379/41 |
| 4,905,271 | 2/1990 | Namekawa | 379/58 |
| 4,910,493 | 3/1990 | Chambers et al. | 340/426 |
| 4,928,778 | 5/1990 | Tin | |

FOREIGN PATENT DOCUMENTS 0128861 8/1986 Japan.

OTHER PUBLICATIONS

Motorola publication, "DYNAT·A·C 6000x Universal Mobile Telephone", 1984, pp. 1–6.
"AB3X Cellular Interface–Owner's Manual," Morrison & Dempsey Communications Inc, 1987.

*Primary Examiner*—James L. Dwyer
*Assistant Examiner*—Dwayne D. Bost
*Attorney, Agent, or Firm*—Roberts and Quiogue

[57] ABSTRACT

An interfacing system for integrating a wide variety of cellular communication systems with most vehicle security systems. The system includes a controller and an interfacing arrangement for matching the cellular telephone to the controller. The interfacing arrangement includes a library, stored in memory, having a plurality of unique translation tables corresponding to the protocols of a plurality of unique cellular communication systems. The interfacing arrangement further includes an initializing capability for selecting an operating protocol for the interfacing system from the library which is compatible with the protocol of the cellular communication system. Hardware and software are included for interfacing the vehicle security to the controller and for interfacing the controller to the vehicle. In a specific embodiment, the selection of cellular telephone type or make is made from the keypad of the cellular telephone.

92 Claims, 46 Drawing Sheets

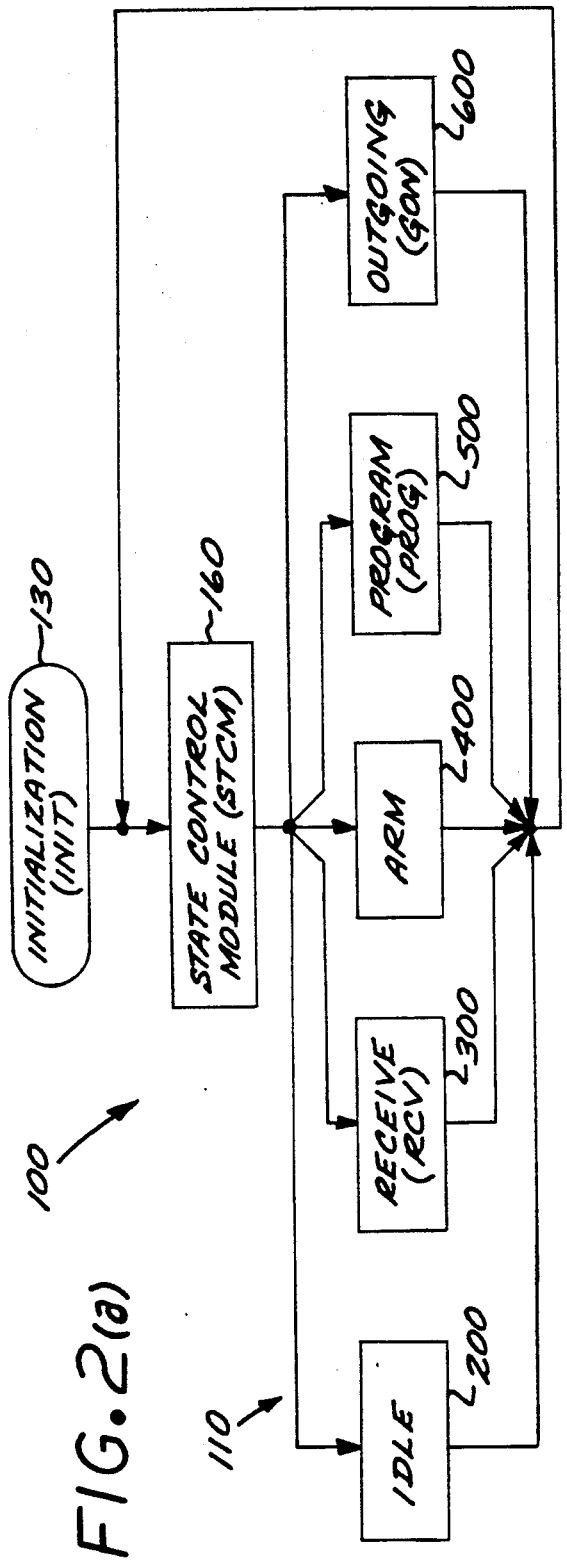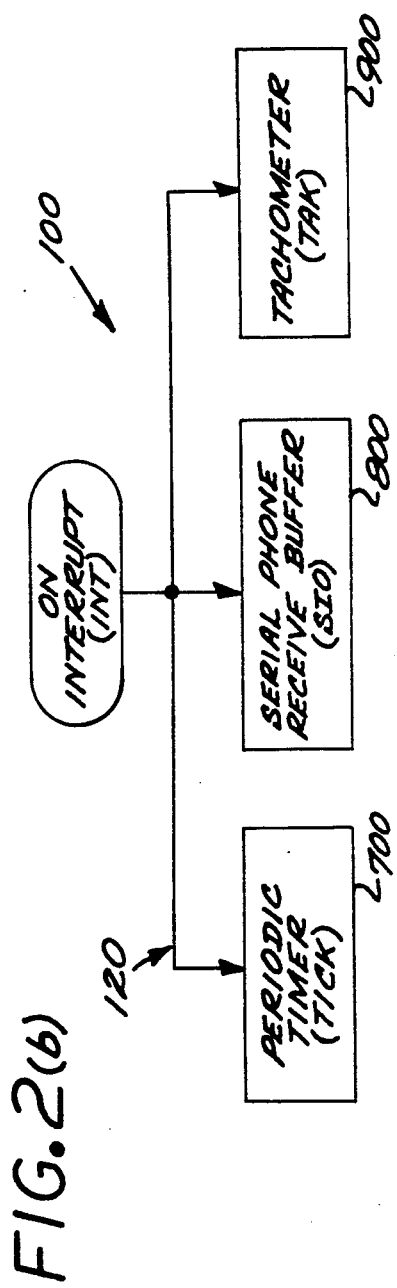
FIG. 2(a)
FIG. 2(b)

SYSTEM FOR INTEGRATING A CELLULAR TELEPHONE WITH A VEHICLE SECURITY SYSTEM

This is a continuation-in-part of application Ser. No. 07/345,654, filed 5-1-89, (Abandoned) entitled "System for Integrating a Cellular Telephone With a Vehicle Security System".

BACKGROUND OF THE INVENTION

The present invention relates to cellular telephone systems, automobile security systems and associated apparatus.

Cellular telephone usage has grown rapidly in recent years out of a recognition of the value of ambulatory voice and data communication capabilities. There has been an associated growth in products and services related to the cellular telephone. Many manufacturers have introduced and continue the introduction of a myriad of cellular telephones with varied features, functions and protocols. Presently, with an appropriate interface, a cellular telephone may be interconnected to a facsimile machine, an answering machine, or an autodialer to name a few. While the capability of the typical cellular telephone system has grown, cellular telephones have not heretofore been adequately adapted to enhance the security of the host vehicle. This task has remained almost exclusively in the province of vehicle security systems.

Vehicle security systems have been available for a longer period of time relative to cellular telephones. Nonetheless, vehicle security systems have also grown in capability and sophistication in recent years. For example, systems currently on the market provide for remote arming and disarming of the alarm, locking and unlocking of the vehicle's doors, controlling the windows, or opening the trunk. An exemplary security system is described in U.S. Pat. No. 4,887,064. However, the remote capability of a typical conventional security system is limited. These remote controls have a typical operating range of less than one hundred yards since they generally rely on a radio or infrared link of very limited range. Further, these systems generally provided simple on, off, or status indications, yet there are many situations that require a broader, more versatile, and more powerful communication link.

U.S. Pat. Nos. Re 32,856, reissued Feb. 7, 1989, to Millsap et al.; 4,809,316 issued Feb. 28, 1989, to Namekawa; and 4,821,309, issued Apr. 11, 1989, to Namekawa show systems integrating cellular telephone systems with alarm systems. Millsap's system is adapted to provide an alarm system for protected premises at a fixed location and is therefore not applicable to vehicle protection. The Namekawa systems require the use of a proprietary cellular telephone system and therefore do not allow for use with cellular telephones manufactured by others. Thus, none of the large variety of cellular telephone systems already installed in vehicles will readily accept the system described in U.S. Pat. Nos. 4,809,316 and 4,821,309.

Thus, there is a need in the art for a versatile cellular security system which is compatible with a wide variety of cellular telephones.

SUMMARY OF THE INVENTION

The need in the art is addressed by the present invention which provides a system that interfaces between a variety of vehicle security systems and most cellular communication systems whether already sold and installed in vehicles or yet to be marketed. The system includes a system controller and an interfacing arrangement. The interfacing arrangement includes a first library, stored in memory, having a plurality of unique translation tables corresponding to the protocols of a plurality of unique cellular communication systems. The interfacing arrangement further includes an initializing capability for selecting an operating protocol for the interfacing system from the first library means which is compatible with the protocol of the cellular communication system. The library may be updated by adding to it the protocol of new cellular communication systems as they become available. Hardware and software are included for interfacing the vehicle security system to the controller and for interfacing the controller to the vehicle. In a specific embodiment, the selection of the desired cellular telephone type or make is made from the keypad of the cellular telephone by spelling the telephone type in English via the telephone keypad's buttons.

Other features of the system include an ability to expand and update the system's library with a protocol of new types and models of cellular phones. The system further includes means for starting the vehicle engine and verifying the engine's status from any direct dial telephone anywhere in the world. Another feature enables the vehicle's owner to telephone the vehicle once it has been discovered that the vehicle has been stolen and stop the engine. If the vehicle is being driven while the command to stop the engine is received, the command will be registered. However, the execution of the command will take place only when the engine's RPM or vehicle speed are below a preset level, at which point the engine will be disabled and the lights will flash. The system further includes means to electronically lock the telephone keypad preventing an intruder from interrupting or terminating any incoming or outgoing command or calls.

Another feature allows the owner to listen in or have a two-way voice communication with an intruder, even though the telephone's handset is resting in its cradle. Another feature of the system enables the vehicle's owner to call the system from any direct dial telephone in the world and program into the system either a pager number or a telephone number at which the owner can be reached and notified in case of intrusion into the vehicle.

Another feature of the invention activates a navigation system when the alarm is triggered and repeatedly transmits at certain time intervals over the communication system the coordinates identifying the vehicle location.

Another feature of the invention provides synthesized voice guiding and prompting for the operation and control of the system. Another feature of the invention provides for programming through the cellular telephone keypad such features as entry delay, valet mode enabling, horn sounding and sound loudness control. These and other features and advantages will become more apparent from the following description and claims.

BRIEF DESCRIPTION OF THE DRAWINGS

These and other features and advantages of the present invention will become more apparent from the following detailed description of an exemplary embodiment thereof, as illustrated in the accompanying drawings, in which:

FIG. 2(a) is a top level flow diagram of the foreground routines of the program of the present invention.

FIG. 2(b) is a top level flow diagram of the background routines of the program of the present invention.

DETAILED DESCRIPTION OF THE PREFERRED EMBODIMENT

Illustrative embodiments and exemplary applications will now be described with reference to the accompanying drawings to disclose the advantageous teachings of the present invention.

Hardware

Figure 1:
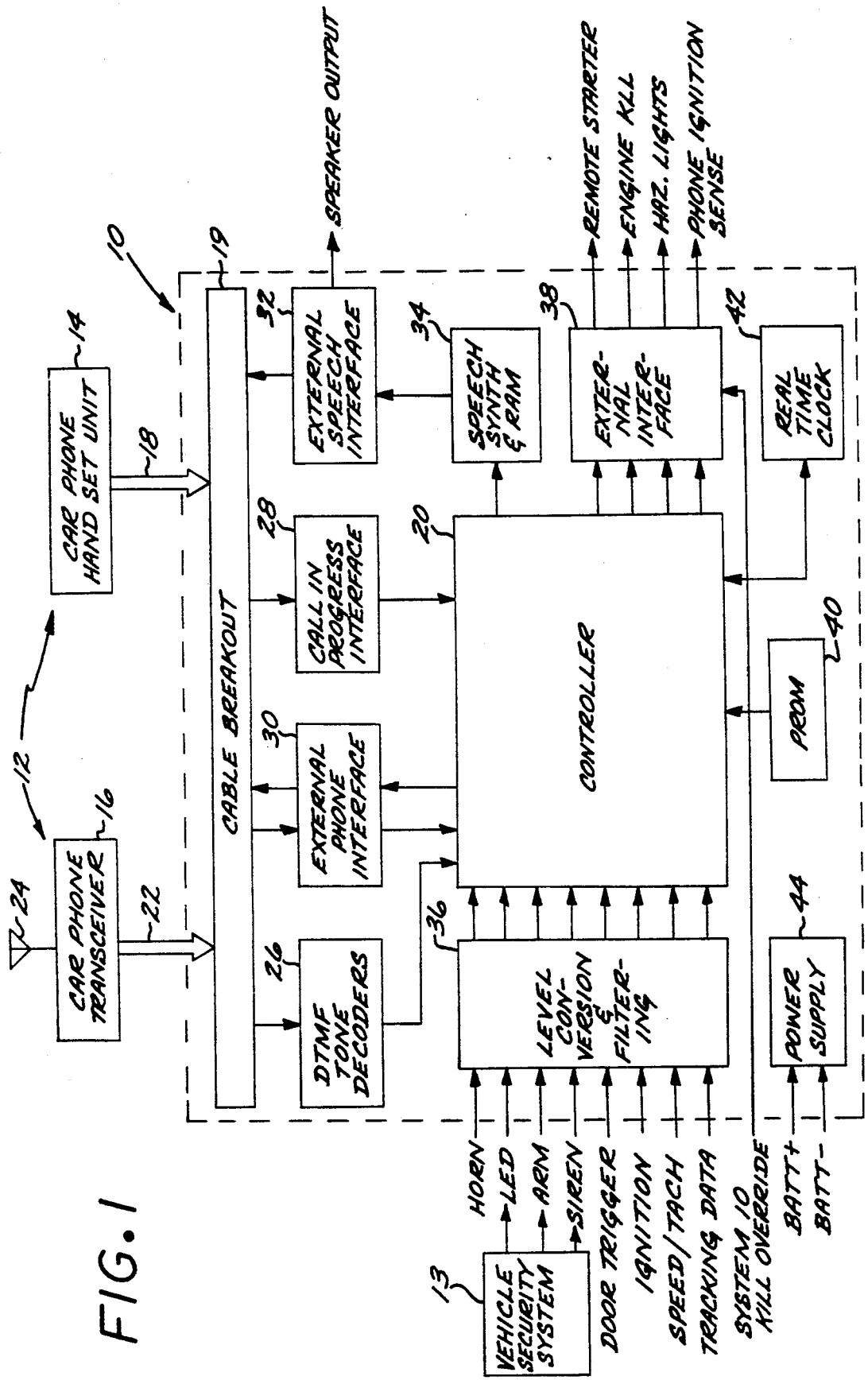
FIG. 1 is a simplified block diagram of the system for integrating a communication system with a security system of the present invention.

FIG. 1 is a simplified block diagram of the system for integrating a communication system with a security system of the present invention. In the preferred embodiment, the system 10 is adapted for use with a cellular telephone system 12. The system 10 is interposed between the handset unit 14 and the transceiver 16 of the cellular telephone system 12. That is, the cable 18, which would ordinarily connect the handset 14 to the transceiver 12, is connected to a cable breakout or terminating strip 19. Cable breakout 19 includes relays and other switching elements for providing digital and audio interfacing. A second cable 22 is connected between the cable breakout 19 and the transceiver 16. The cables 18 and 22 are terminated at the cellular ends with connectors to fit various cellular telephone types. The transceiver 16 is connected to a conventional cellular telephone antenna 24. The cellular telephone communication link passes through the system 10 unimpeded while the system 10 is idle. When the system 10 is active, it utilizes audio and digital signals from the cellular system 12 and generates audio and digital signals thereto.

The system 10 includes a controller 20 which, in the preferred embodiment, is implemented with a microprocessor. As discussed below, the cable breakout 19 provides interconnection of the cellular telephone system 12 to the controller 20 via plural interface units including a dual tone multiple frequency (DTMF) decoder 26, a call-in-progress interface 28, an external telephone interface 30, and an external speech interface 32. The DTMF decoder 26 is connected to the cable breakout 19. The DTMF decoder 26 is a commercially available device, such as a type CD22204 IC chip, which decodes touch tones from the cellular system 12. The call-in-progress interface 28 detects ringing, busy signals, etc. The call-in-progress interface 28 is also a commercially available device, such as a type NE5900 IC chip. The external telephone interface unit 30 listens for audio in both directions, detects the telephone on/off status, and provides access thereto for the controller 20. The unit 30 also performs the functions of signal level conversion, buffering and filtering. The external telephone interface unit 30 also provides access for sending digital commands from the system 10 to the cellular transceivers so that the system 10 may command operation of the telephone. An external speech interface 32 cooperates with a speech synthesizer 34 to provide audio from the synthesizer on command after receiving digital output from the controller 20. The external speech interface 32 also outputs to an external speaker (not shown). The external telephone and speech interfaces 30 and 32, respectively, and the speech synthesizer 34 are constructed using commercially available devices.

Inputs from a conventional vehicle security system 13, from a host vehicle (not shown), and from a global positioning tracker (not shown) are received by the system controller 20 via level conversion and filtering circuits 36. As may be necessary for a particular input, the level conversion and filtering circuits 36 filter, convert from analog-to-digital, and adjust the level of the signals received from the vehicle and its security system in a manner well known to those of ordinary skill in the art. Thus, from the vehicle, the system controller 20 of the illustrative embodiment of FIG. 1 receives: 1) TACH signal which indicates the rate of revolution of the engine or speed of the vehicle; 2) an IGNITION input which depends on the state of the vehicle ignition switch or accessories switches; 3) a DOOR TRIGGER input from the door switch which indicates whether it is open or closed; and 4) a HORN signal which represents the state of the horn relay of the vehicle. Likewise, from the security system, if any, the system controller 20 receives ARM, SIREN and LED (light emitting diode) signals. Additionally, an input system 10 kill override exists so that a separate auto accessory designed by the assignee of this invention, a remote vehicle starter system, may work in conjunction with the system 10, while not interfering with or reducing the system 10 in any way. This input allows the remote starter system to start the car while the system 10 prevents the ignition switch from doing so.

The TACH signal may simply take the form of a signal indicating pulses from the ignition system coil or a spark plug. Alternative arrangements can provide tachometer or speedometer readout signals, for example.

The tracking data input is provided by a global positioning system (such as LORAN or TRAVELPILOT by Blaupunkt) so that, upon demand, e.g., when the security system is tripped or position data is requested by the user via a touchtone telephone, the system 10 processes the tracking data (translates the electronic inputs to a location on a map using a lookup table or other suitable technique) and outputs its location via a voice synthesizer.

The external interface 38 performs a similar functions as the level conversion and filtering circuits 36. That is, the external interface 38 converts the digital (CMOS) signals, e.g., 5 volts, from the controller 20 to signal levels necessary for the vehicle and the cellular telephone system 12, e.g., 12 volts. Through the external interface 20 sends REMOTE STARTER signals to start the engine if the vehicle is so equipped; an ENGINE KILL signal to disable the engine; a HAZARD LIGHTS signal to activate the hazard lights; and a telephone ignition sense signal to activate and deactivate the cellular telephone system 12. The system 10 may be set up to send and receive other signals without departing from the scope of the invention.

The system 10 also includes a memory 40, a real time clock 42, and a power supply 44. The clock 42 has battery backed-up memory in which engine kill status is stored to maintain the engine in a disabled state in the event the vehicle battery or power is removed from the system 10 and then reinstated. Other selected data is also locked up (stored in the clock memory) as required for operation of the system. Particularly, as discussed more fully below, the telephone type is stored in the clock memory.

In the illustrative embodiment, the memory is implemented as a conventional programmable read-only memory or PROM. The PROM 40 also stores certain telephone specific codes as discussed more fully below. As discussed below, the operation of the system 10 is controlled by the controller 20 through the execution of a program 100 stored in the PROM 40. In the best mode, the program is written in assembly language.

Software

FIGS. 2(a) and 2(b) provide top level flow diagrams of the program 100 of the present invention. The program includes a number of executive (foreground) routines 110 shown in FIG. 2(a) and a number of utility (background) routines 120 shown in FIG. 2(b). The executive routines 110 are selected by a State Control Module (STCM) 160 and include Idle 200, Receive 300, Arm 400, Program 500, and Outgoing 600 foreground routines. The utility routines 120 run in the background of the executive routines 110 and include periodic timer (TICK), serial telephone buffer (SIO), and tachometer (TAK) subroutines 700, 800, and 900, respectively.

Figure 3A:
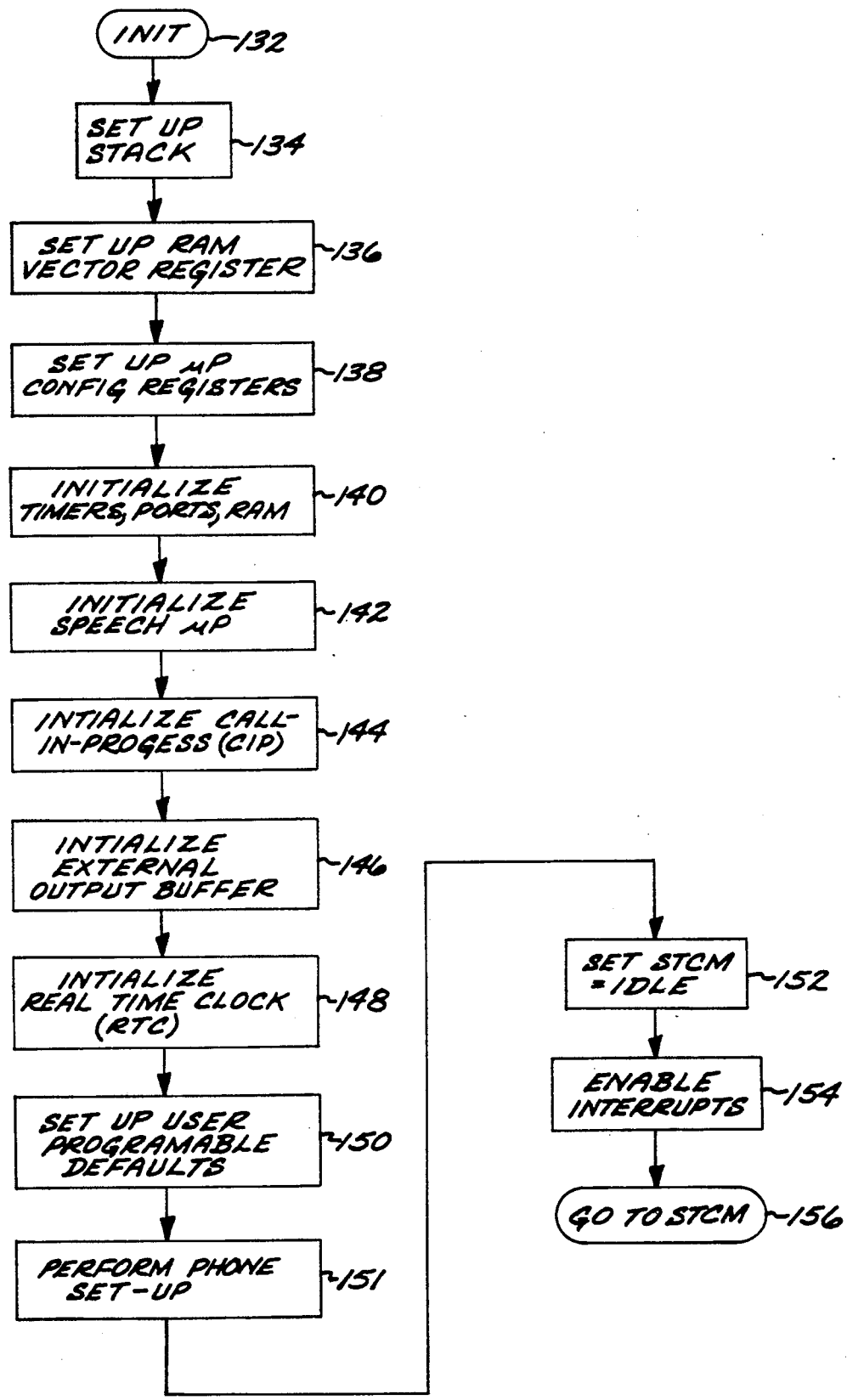
FIG. 3(a) is a flow diagram of the Initialization routine of the program of the present invention.

As shown in FIG. 2(a), the program starts with an initialization routine 130. The initialization routine is shown in greater detail in FIG. 3(a). As is evident from FIG. 3(a), the initialization routine 130 includes dedicated subroutines 134–150 (even numbers only), 151, and 152–156 (even numbers only) for setting up the program stack pointers (134); setting up RAM vector register (136); setting up configuration registers in the controller 20 (138); initializing timers, ports and random access memories (RAM) (140); initializing the speech synthesizer 34 (142); initializing the call-in-progress circuit 28 (144); initializing the external output buffer 38 (146); initializing the real time clock 42 (148); setting up user programmable defaults (150); performing telephone set-up (discussed below) (151); setting the State Control Module (discussed below) in an idle state (152); and enabling interrupts (154) respectively.

Figure 3B:
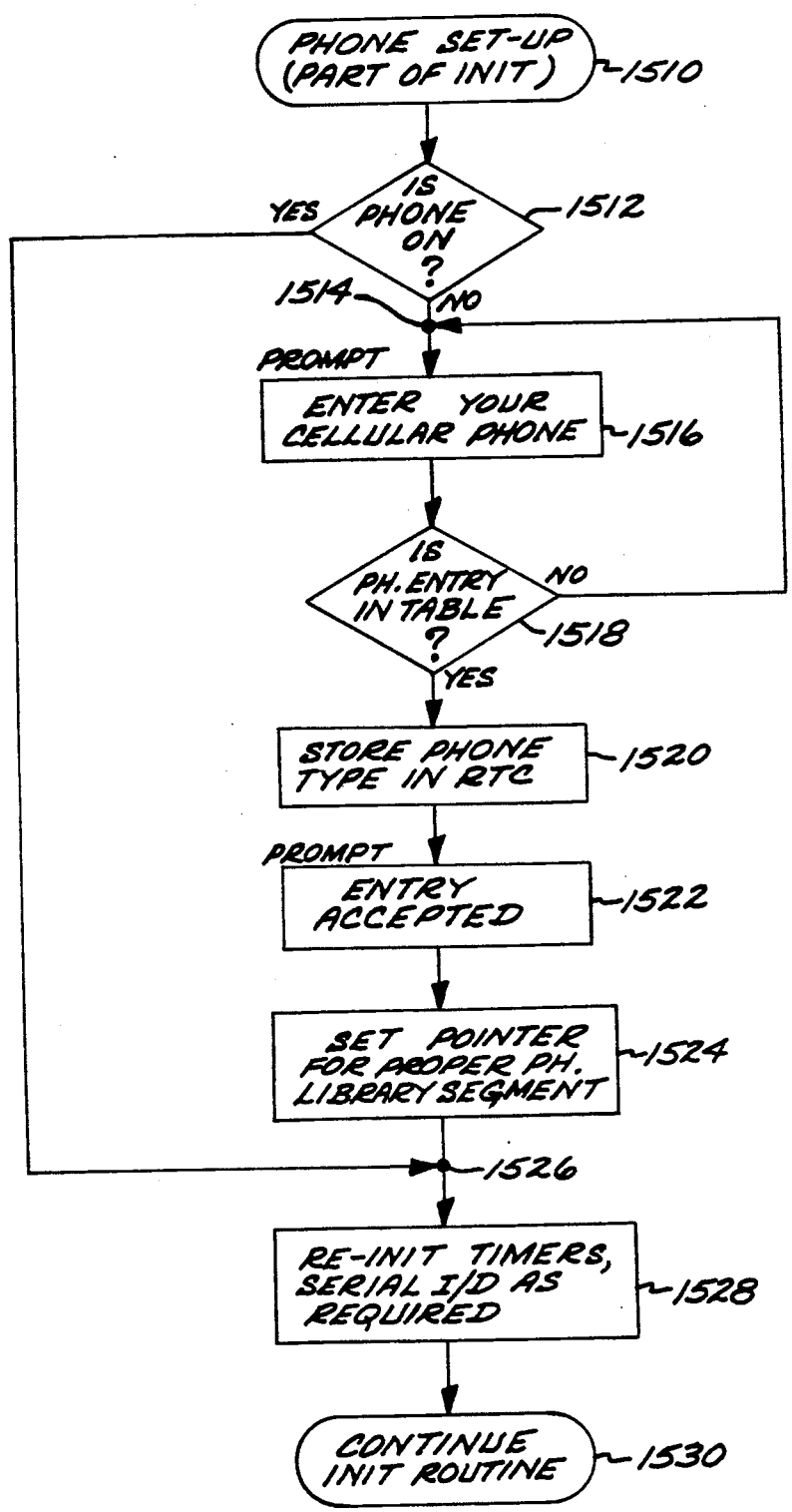
FIG. 3(b) is a flow diagram of the Telephone Set-Up subroutine called by the Initialization routine of the program of the present invention.

A particularly novel aspect of the invention is the provision of a library within which translation tables are provided for the protocols of a wide variety of specific, typically unique, cellular telephone communication systems. The telephone set-up subroutine 151 of the initialization routine 130 selects an operation protocol for the interfacing system from the library which is compatible with the protocol of the host cellular communication system. Reference is now made to the Telephone Set-Up routine 151 illustrated in the flow chart of FIG. 3(b) for the following description of the telephone set-up process:

1. First the system 10 is rapidly initialized to a known state at 1510 so that the user sees no transitory aberrations in the operation of the vehicle, telephone, and/or security system.

2. Next at 1512, the system 10 checks to see if a telephone is attached and turned on. If a telephone-on condition is detected, the system 10 assumes that the telephone type has been previously set and so jumps to 1526 (step #6 below).

3. At this point (1514), since the telephone-off condition was detected, the system 10 prompts "Enter Your Cellular Telephone Type" 1516 via the speech synthesizer 34 and looks for a response from the telephone keypad. Since at this point, the system 10 does not know what telephone protocol to use and therefore does not know how to interpret telephone key codes, it looks only at the telephone DTMF tones for identification of each key, see 1518. Examples of legitimate entries are OKI6, equivalent to 6546 (for OKI model 600 series telephones) or NOVA, equivalent to 6682 (for all Novatel telephones).

4. If no response is detected that matches any one of the telephone protocols currently in the library, after a pause of five seconds, the program goes back to Step #3 (1514) above.

5. When the system 10 detects a response that matches one of the library possibilities, it first stores the corresponding telephone type in the Real Time Clock nonvolatile memory at 1520 and then responds with the prompt "Entry Accepted" via the speech synthesizer 34 at 1522.

6. Next, at 1524, the pointers for the proper telephone library segment are set and at 1528 the timers and serial input/output routines are reinitialized (reconfigured) for the specific telephone type.

7. The balance of the initialization routine is then processed at 1530.

The above initialization telephone set-up process is necessary to identify the proper telephone type and key code library vector. However, once the program has identified the telephone to be used, it need not be set again, even if the system has been powered down and reset, until a different telephone type is to be used. To change telephone types, the existing telephone cable set is replaced with a set specific to the new telephone type and the telephone set-up procedure described above is followed.

Figure 4A:
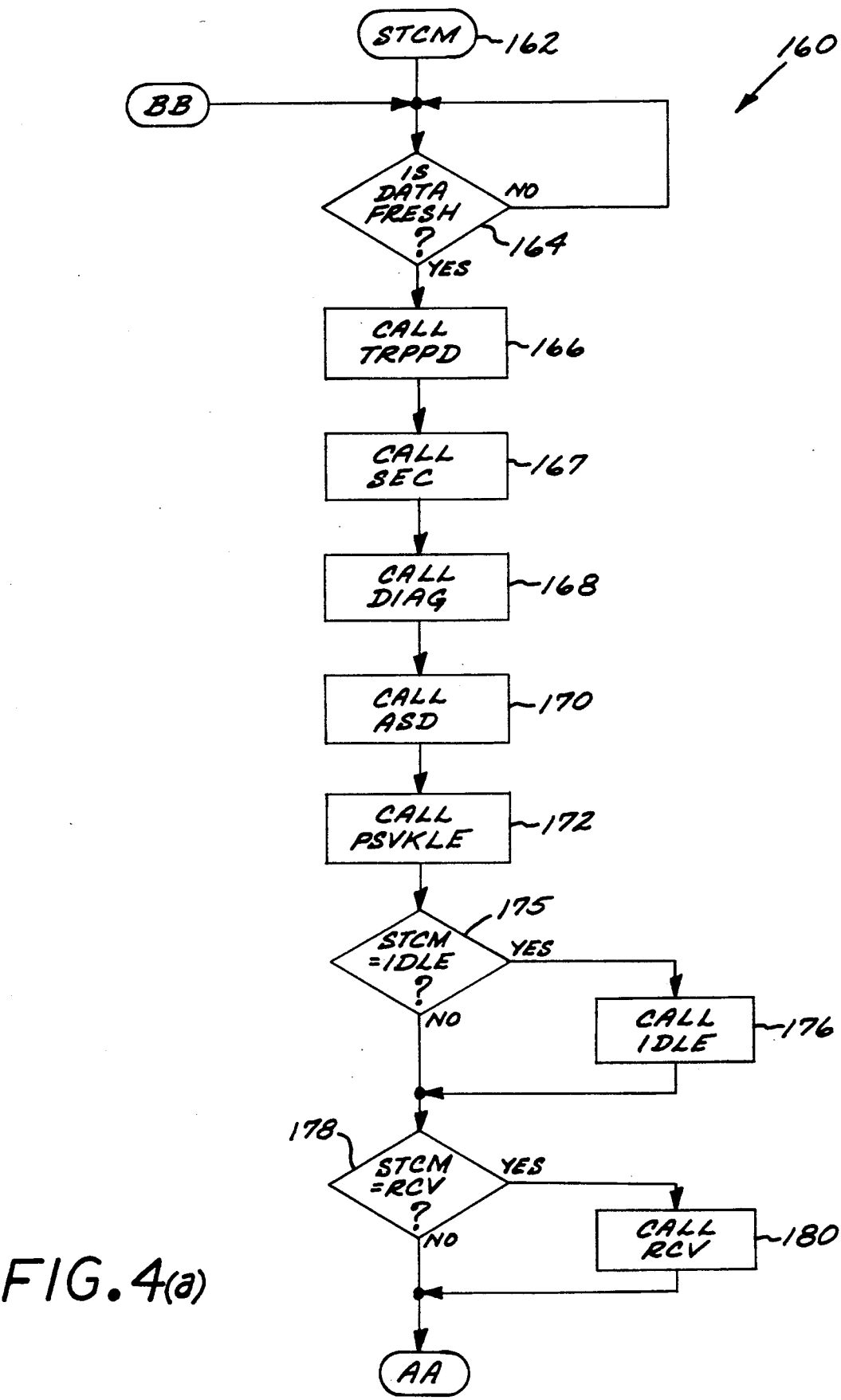
FIG. 4(a) and 4(b) are flow diagrams of the State Control Module of the program of the present invention.
Figure 4B:
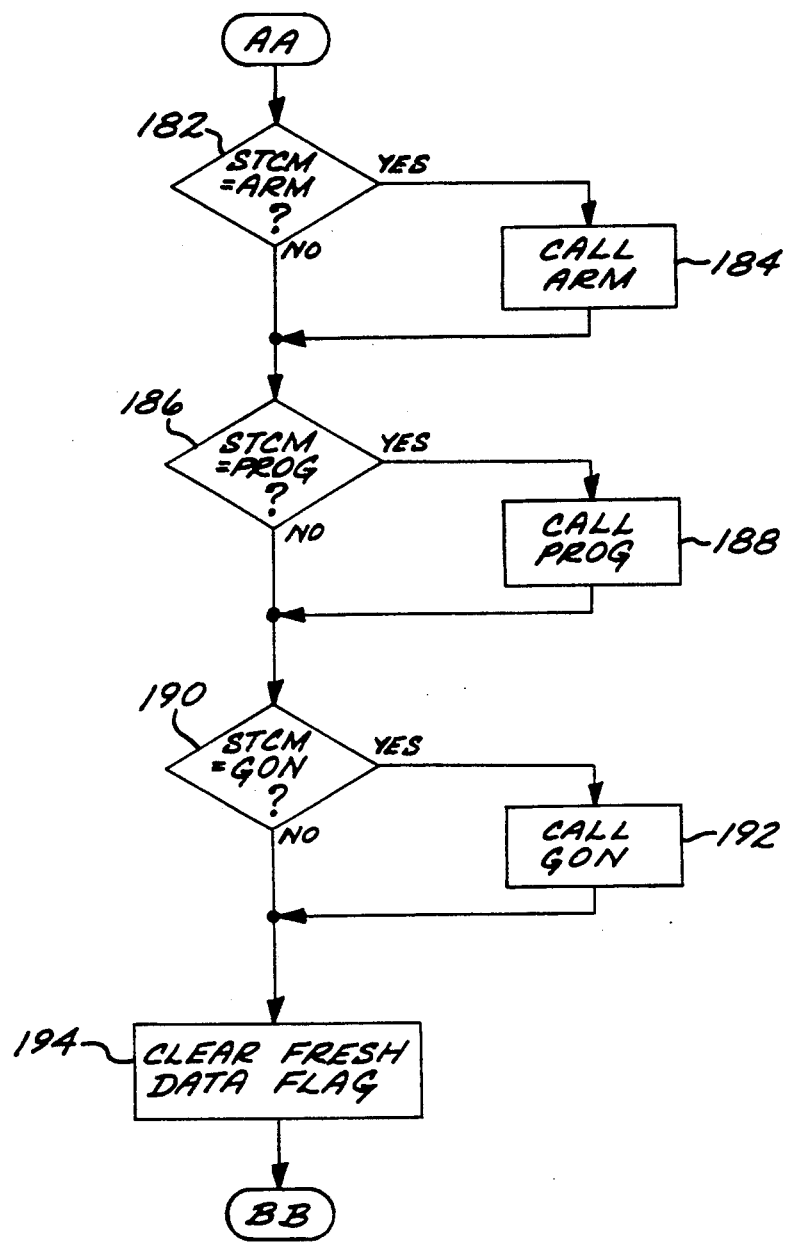

The initialization routine 130 then activates the State Control Module 160 (see FIG. 2(a). As shown in FIGS. 4(a) and 4(b), the State Control Module 160 is the highest of the executive level routines 110. It decides the mode or state of the system 10 by activating the appropriate routine, e.g, Idle 200, Receiver 300, Arm 400, Program 500, and Outgoing 600. As shown in FIGS. 4(a) and 4(b), the State Control Module 160 begins by checking a data fresh flag at a decision point 164. Initially, the flag is not set so the routine waits in a loop. Eventually, e.g., every 10 milliseconds, an interrupt or tick will be sent from the periodic timer 700. The controller 20 then executes the low level utilities, i.e., it takes care of the telephone, lights, reads and processes tracking data as necessary, updates utilities, status flags, etc. The controller 20 then sets a data fresh flag and returns to the STCM module 160. Now, with a fresh input data, the STCM module 160 then calls several dedicated subroutines to test for alarm tripped or panic state (166), to check LED diagnostics from the vehicle security system 13 (168), to check for a need for automatic shutdown after the user has inadvertently left the telephone activated (170), to execute a passive engine kill (172), and at 167 to call the SEC subroutine 167 (FIG. 4(h) to determine if the proper unlock code has been received 1671. If so, it clears the engine kill (1672), stops any flashing lights (1673), releases telephone control (1674), and sets the STCM state (register) to IDLE (1675). The STCM module 160 (FIG. 4(a)) then calls one of the foreground routines depending on the state of the STCM register which is set as required from within the foreground (and occasionally its background) routine.

Figure 4C:
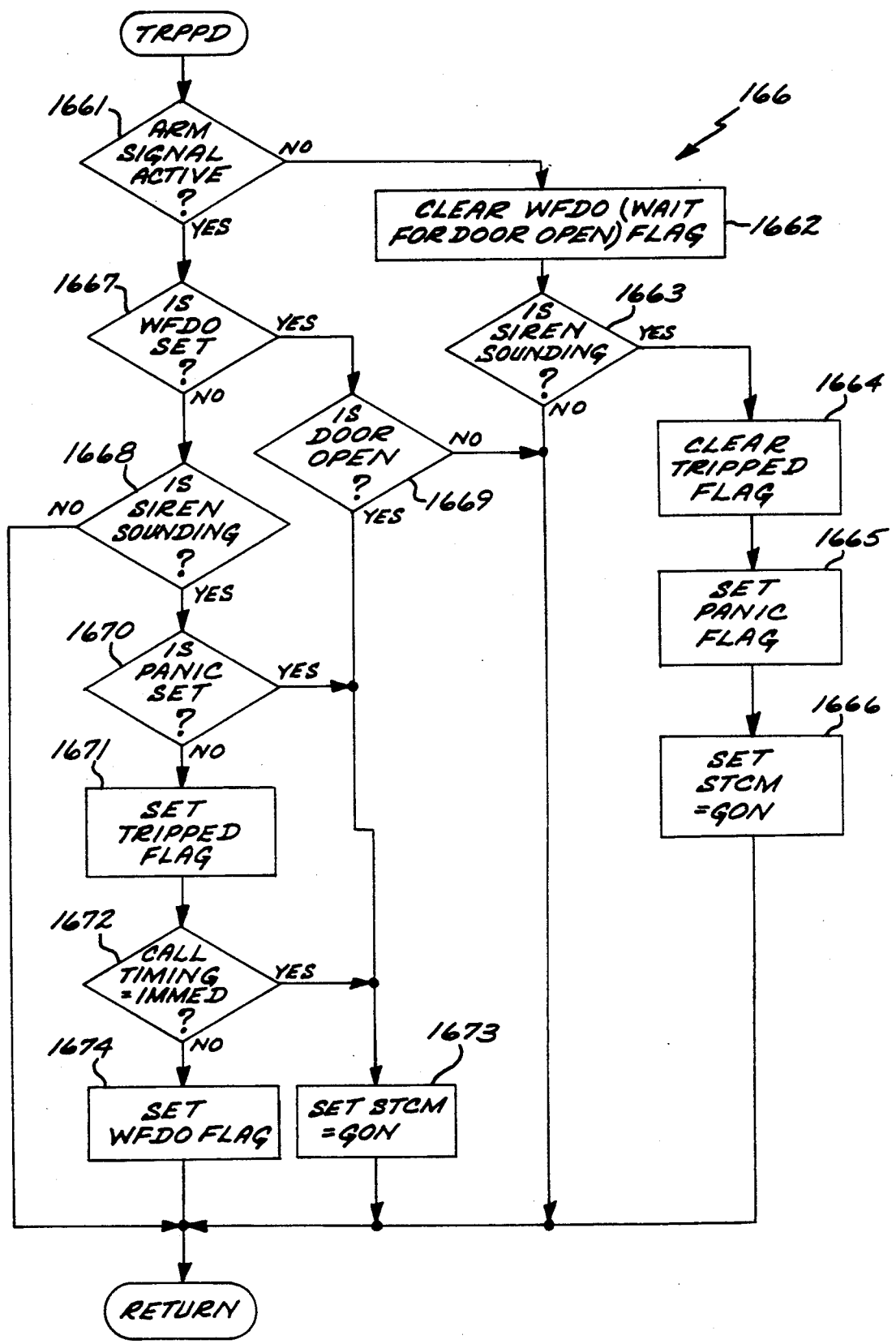
FIG. 4(c) through 4(h) are flow diagrams of the subroutines called by the State Control Module of the program of the present invention.

The routine TRPPD is shown in FIG. 4(c), and commences with an interrogation of the ARM signal from the security system (1661). If the ARM signal is not active, then the "wait for door open" flag WFDO is cleared (1662), and the siren signal from the security system is checked (1663). If the siren is not sounding, then operation returns. If the siren is sounding, then the TRIPPED flag is cleared (1664), the PANIC flag is set (1665), and the STCM register is set to GON (1666), before operation returns. If the ARM signal is active, then the flag WFDO is checked (1667). If the flag is set, then if the door is not open (1669) (determined by checking the door trigger status), operation returns. If the door is closed, operation returns. If the door is open, the STCM register is set to GON (1673) and operation returns. If the flag WFDO is not set at 1667, the siren signal is checked (1668), and if not sounding, operation returns. If the siren is sounding, then the flag PANIC is checked (1670), and if the flag is set, the STCM variable is set to GON (1673) and operation returns. If the PANIC flag is not set, the TRIPPED flag is set (1671) and the call timing is tested (1672). If "call immediate" is set, the STCM register is set to outgoing (1673) and operation returns. If "call immediate" is not set (1672), the WFDO (wait for door open) flag is set (1674) and operation returns. If the siren is not sounding back at 1668, operation returns.

Figure 4D:
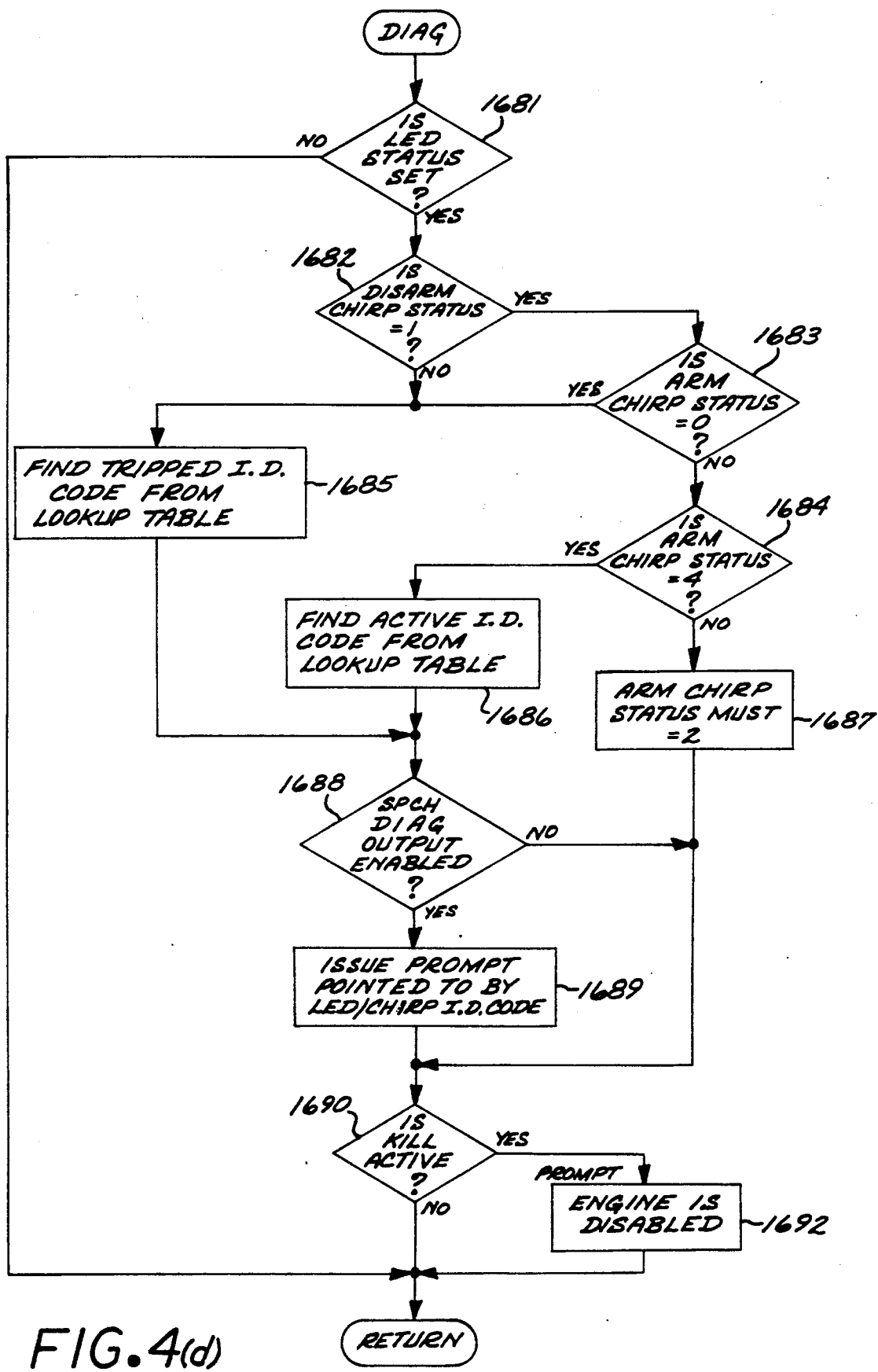

FIG. 4(d) illustrates the routine DIAG, used in conjunction with security systems equipped with a diagnostic function; one such system is described in U.S. Pat. No. 4,887,064. At 1681, the LED signal status from the security system is checked, and if not set, operation returns, since there is no diagnostic information available. If the LED signal status is set, then a variable DISARM CHIRP STATUS is checked (1682), and if set to one, then at 1683, the variable ARM CHIRP is checked to see if it is zero. If so, operation proceeds to 1685. If not, then the variable ARM CHIRP status is checked for equivalence to four, and if equivalent, the active identification code corresponding to the LED signal status is found from a lookup table (1686). If a flag SPCH DIAG OUTPUT has been enabled (1688), then a speech synthesized prompt is issued, pointed to by the LED/chirp identification code (1689). Next, the flag KILL is checked (1690, and if active, a synthesized speech prompt is issued "engine is disabled" (1692). At 1685, the tripped sensor or trigger identification code is found from a lookup table before operation proceeds to 1688. If the ARM CHIRP variable does not equal four at 1684, then the variable must equal two (1687) and operation proceeds to 1690.

Figure 4E:
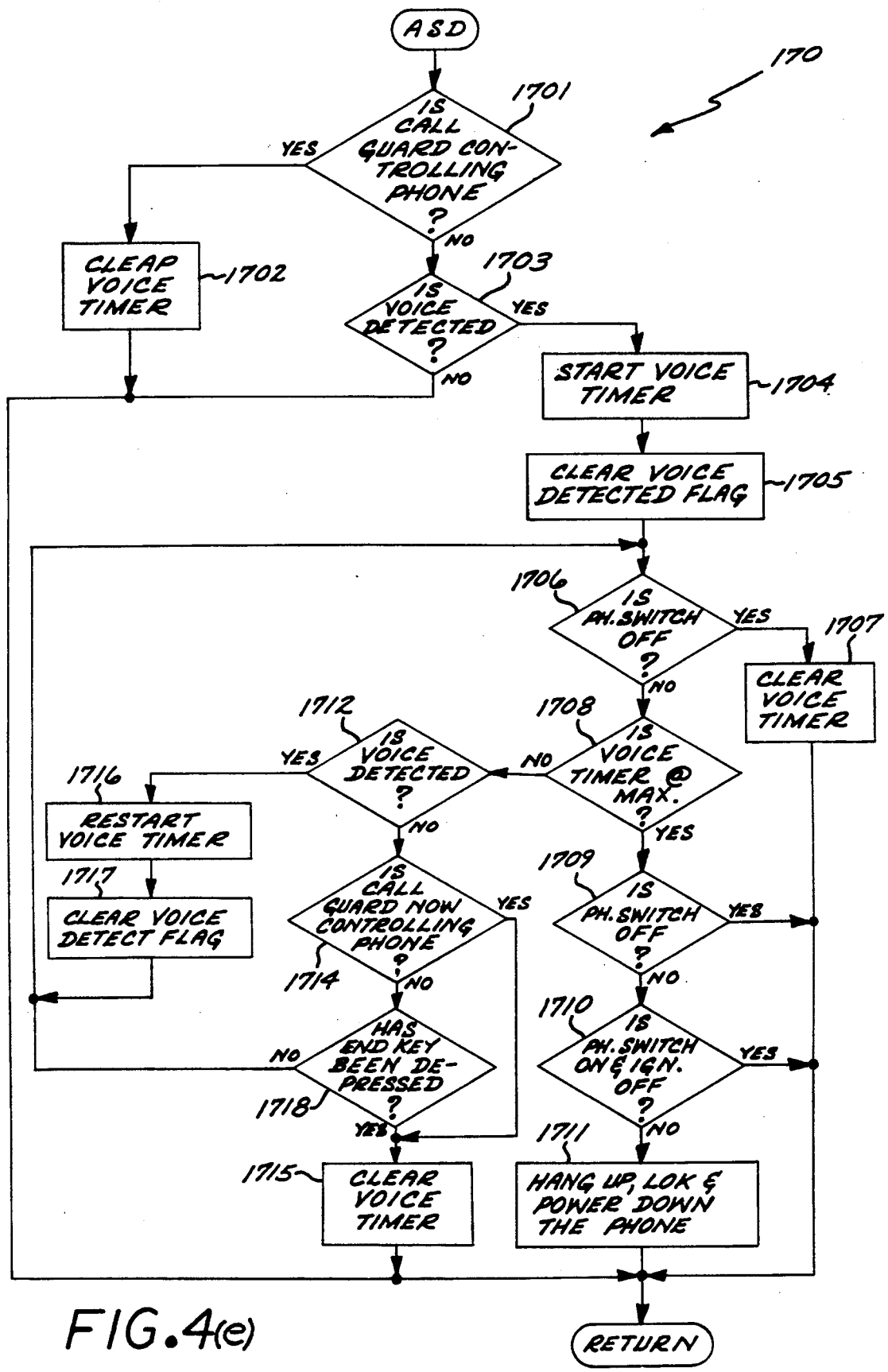

FIG. 4(e) illustrates the ASD (automatic telephone shutdown) routine. At 1701, if the system 10 is not controlling the telephone, e.g., if the system 10 is in the idle routine, then the call-in-progress interface 28 is checked to determine whether voice has been detected (1703). If not, operation returns. If the interface system is controlling the telephone, then at 1702 a voice timer is cleared, and operation returns. At 1703, if voice is detected, then the voice timer is started (1704), the VOICE DETECTED flag is cleared (1705), and operation proceeds to determine if the telephone switch is off (1706). If it is off, then the voice timer is cleared (1707) and operation returns. If the switch is on, the the voice timer is checked (1708), and if it has reached its maximum state, operation returns if the telephone switch is off (1709). If the switch is on, operation returns if the vehicle ignition switch is off (1710). If the ignition switch is not off, then at 1711, the telephone is electronically hung up, locked and powered down. If the voice timer has not reached its maximum (1708), then at 1712 if voice is detected, the voice timer is restarted (1716), the VOICE DETECT flag is cleared (1717), and operation loops back to 1706. If voice is not detected (1712), a fresh decision is made as to whether the interface system is now controlling the telephone (1714) and if not, the END button of the telephone is checked and if it has been depressed (1718), the voice timer is cleared (1715) and operation returns. If the system is controlling the telephone, the voice timer is cleared (1715) and operation returns.

Figure 4F:
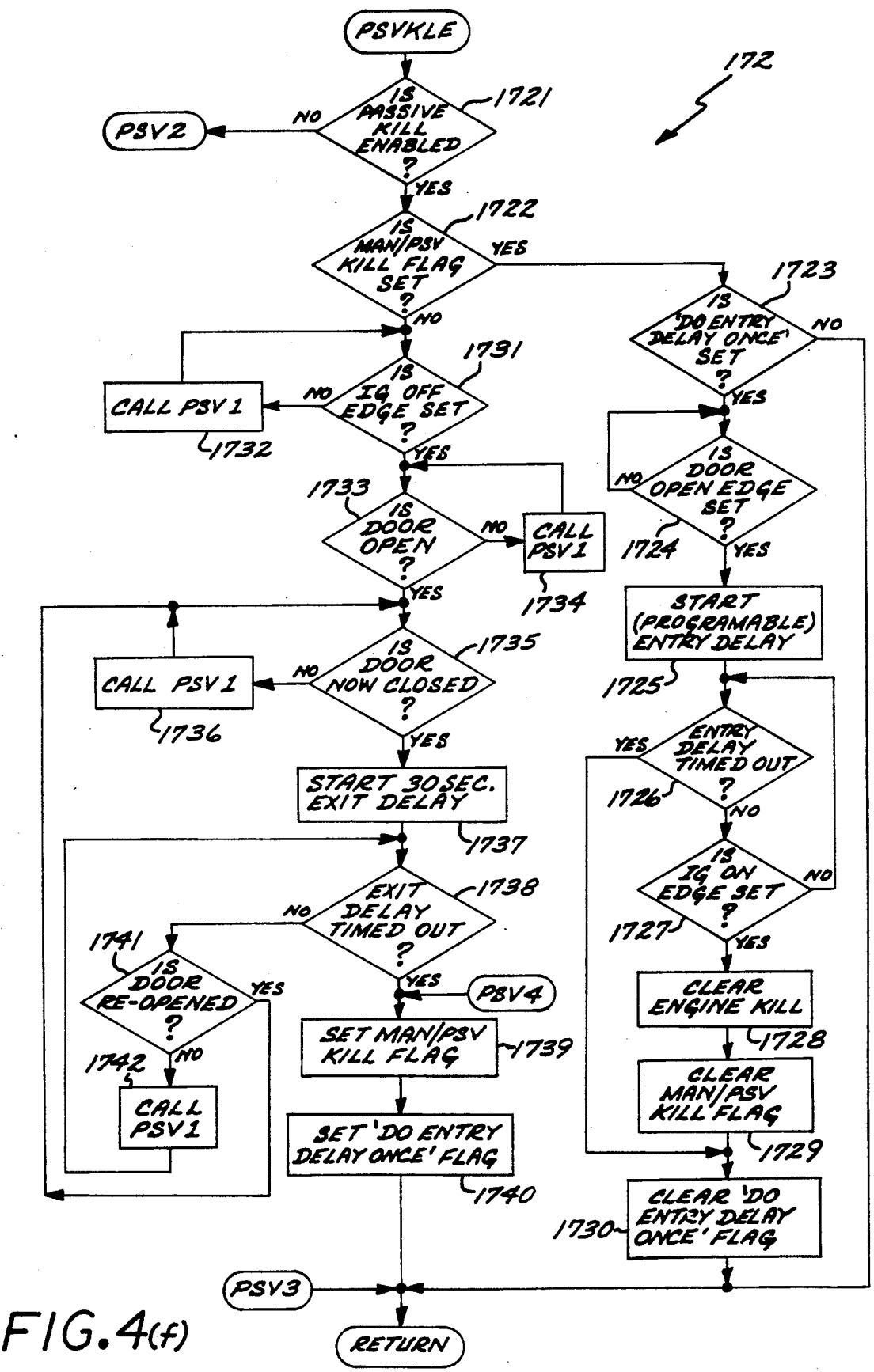

FIG. 4(f) illustrates the PSVKLE routine, the valet mode (passive kill) routine. If this feature is not enabled (1721), operation branches to node PSV2. Otherwise the flag MAN/PSV KILL is checked (1722) and if set, the flag DO ENTRY DELAY ONCE is checked (1723). If this flag is not set, operation returns. If the flag is set, then the door trigger signal is checked until an edge is detected (1724), when the entry delay time is started (1725). The timer is checked (1726) and if timed out, the DO ENTRY DELAY ONCE flag is cleared (1730) and operation returns. If the delay timer has not expired, the ignition switch signal is checked (1727) and if the ignition-on edge (transition) is not detected, operation loops back to 1726. If the transition is detected, the flag ENGINE KILL is cleared (1728), the flag MAN/PSV KILL is cleared (1729), and operation proceeds to 1730. Returning now to 1722, if the flag MAN/PSV KILL is not set, the routine PSVI is called (1732) and operation loops back to 1731. If the flag is set, then at 1733 the door trigger signal is checked (1733), and if the door is not open, the routine PSVI is called (1734), and operation loops back to 1733. Once the door has been opened, it is checked to determine if the door has now closed (1735); if not, the routine PSVI is called (1736) and operation returns to 1735. Once the door has closed, the thirty second exit delay is started (1737), and once the exit delay timer has expired (1739), the flags MAN/PSV KILL and DO ENTRY DELAY ONCE are set (1739 and 1740) and operation returns. If the delay timer has not expired, the door trigger is checked to see if the door has been reopened (1741) and if so, operation loops back to 1735. If not, the routine PSVI is called (1742) and operation loops back to 1738.

Figure 4G:
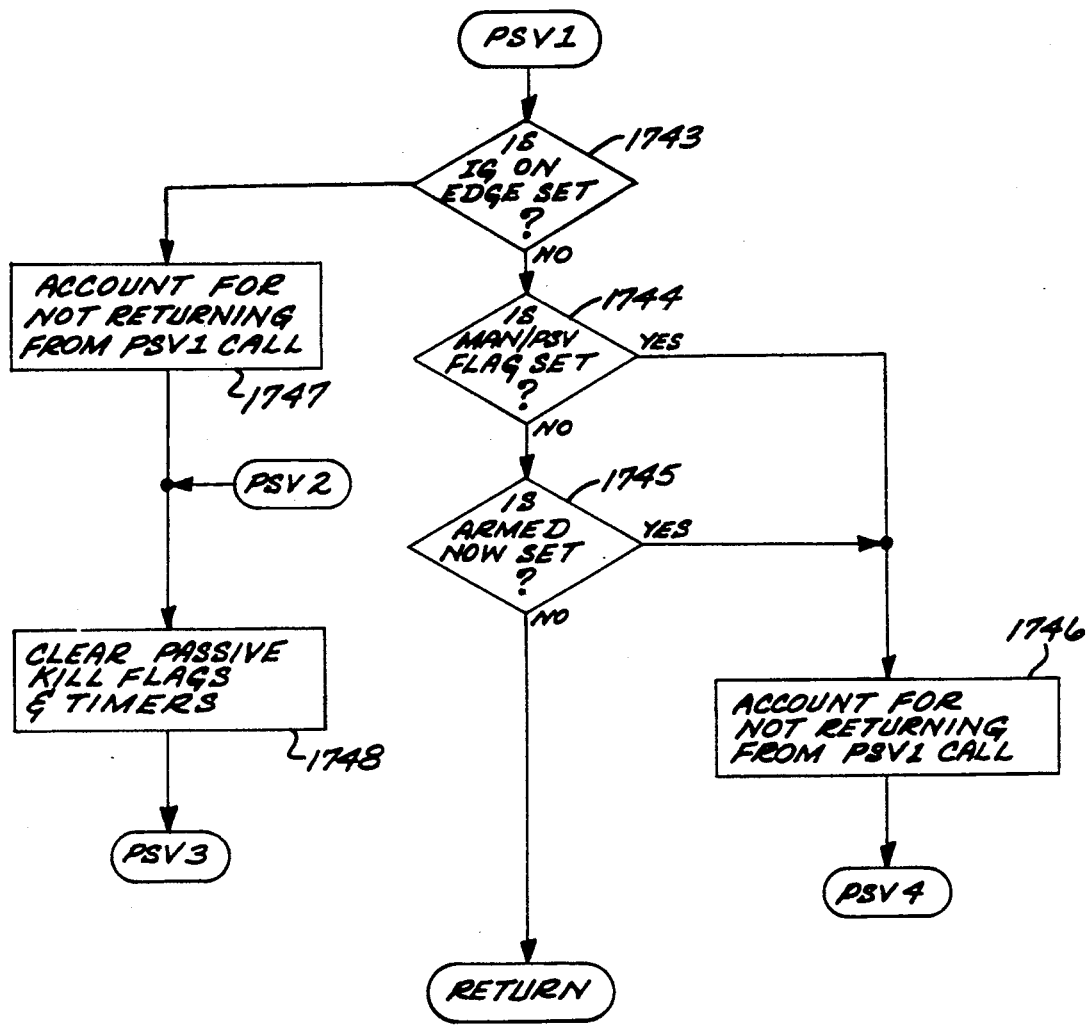
Figure 4H:
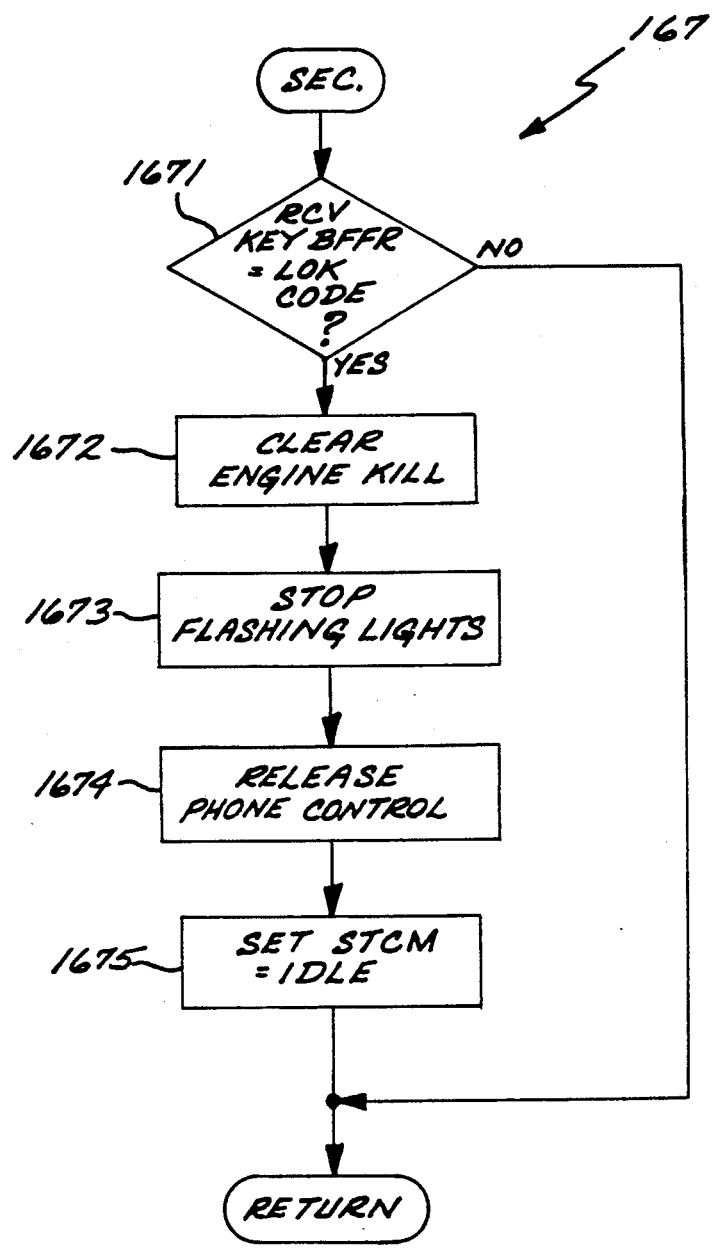

FIG. 4(g) illustrates the routine PSVI called from the routine PSVKLE. At 1743, the flag IG ON EDGE is checked and if set, the software accounts for not returning from the PSVI call (1747), the flags PASSIVE KILL and the associated timers are cleared (1748), and operation proceeds to node PSV3 (FIG. 4(f)). If the flag IG ON EDGE is not set, then the flag MAN/PSV is checked (1744) and if set, the software accounts for not returning from the PSVI call (1746) and operation returns. If the flag is not set (1744), then the ARMED signal is checked (1745) and if set, operation proceeds to 1746. Otherwise, operation returns.

Figure 5:
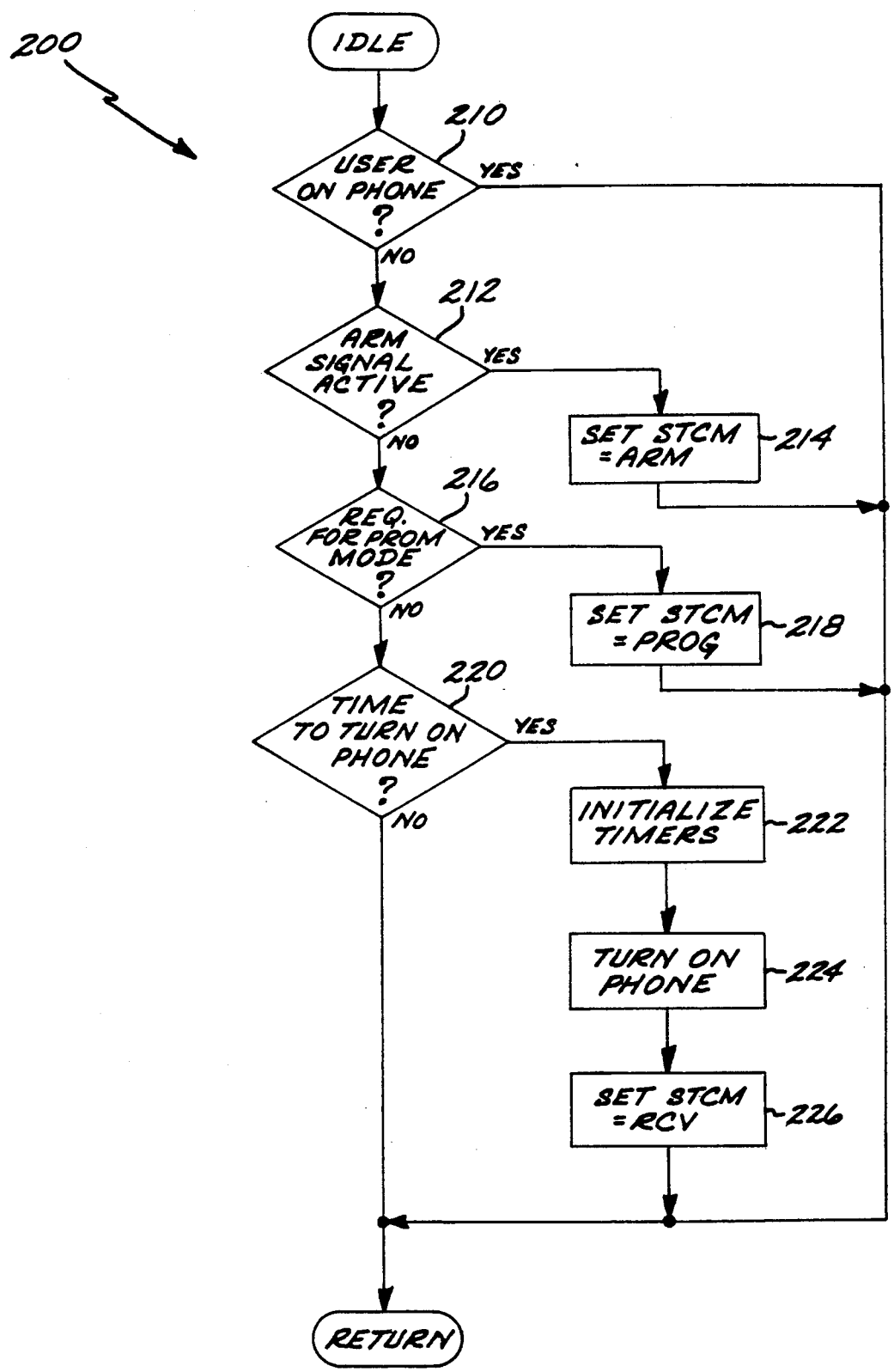
FIG. 5 is a flow diagram of the Idle foreground routine of the program of the present invention.

The Idle routine 200 is shown in detail in FIG. 5. Basically, the Idle routine 200 checks for the use of the telephone system 12 by the user. If the telephone is in use (210), it maintains the system 10 in an idle state. If the telephone is not in use, the routine checks for arm (212), program mode request (126), and time to turn on telephone (220) indications. If any of these singals are present, the STCM register is set accordingly and control is returned to the STCM module 160.

Figure 6A:
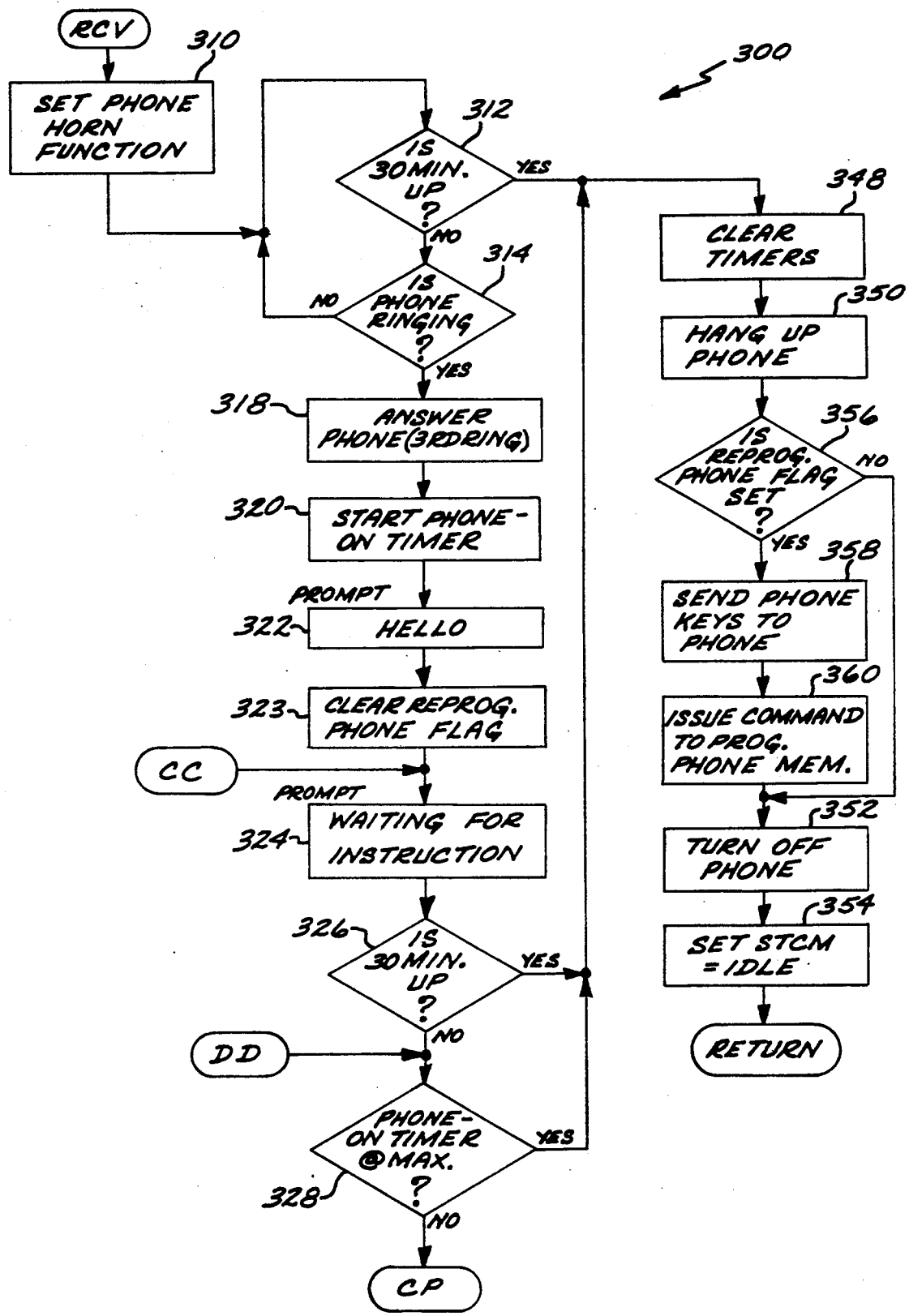
FIGS. 6(a) and 6(b) are flow diagrams of the Receive foreground routine of the program of the present invention.
Figure 6B:
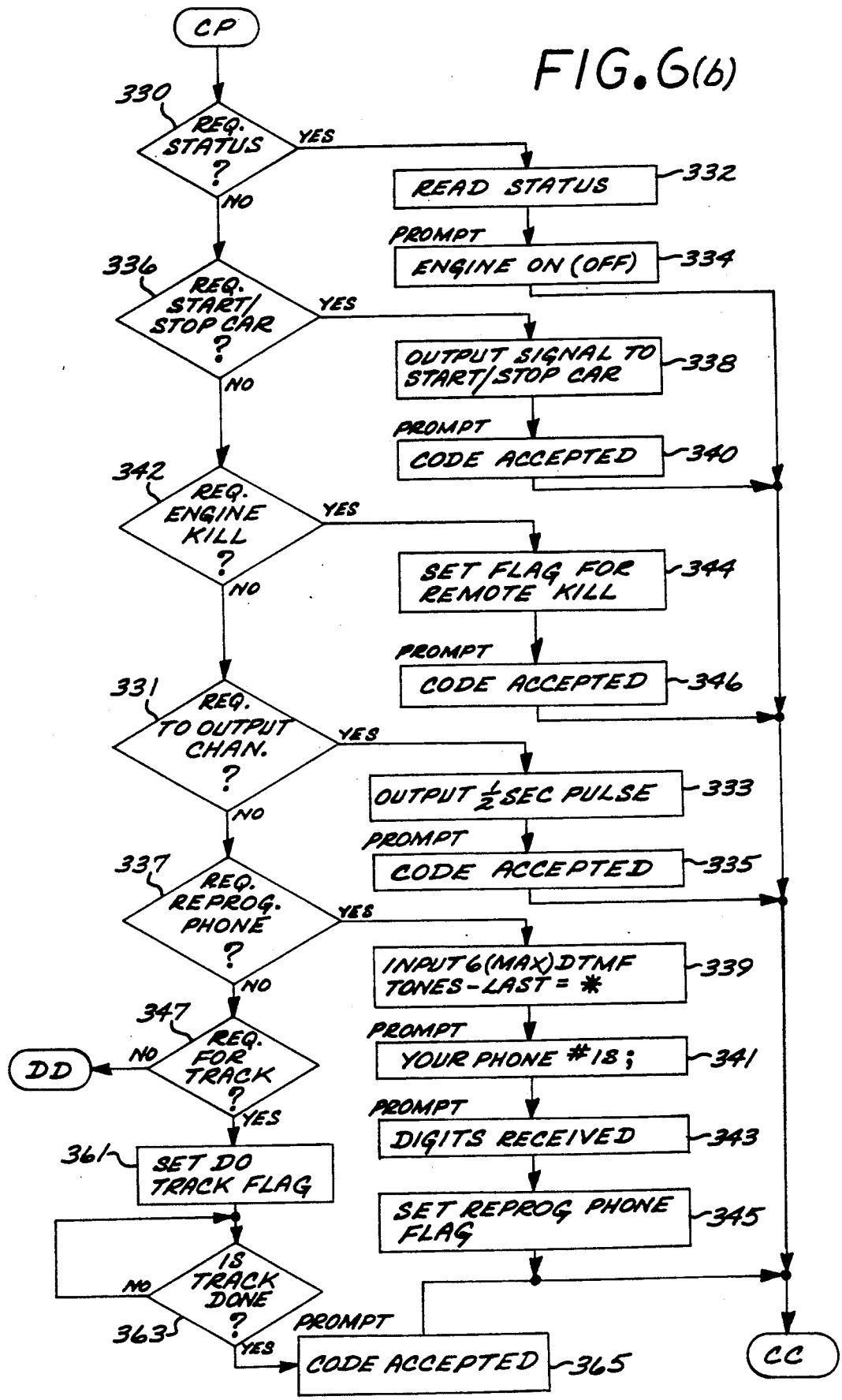

If the STCM resister is set to RCV, that is, if it is time to turn on the telephone 12, the Receive routine 300 is called by the State Control Module 160. The Receive routine 300 is shown in FIGS. 6(a) and 6(b). Basically, this routine is called during preprogrammed time periods to allow the user to remotely access the system 10. For a predetermined time during these periods, the Receive routine 300 sets the cellular telephone conventional horn function (310) and waits for the telephone to ring (314). When the telephone 12 rings, the routine 300 waits for a predetermined ring, e.g., the third ring, to give an occupant an opportunity to answer the telephone (318). It then starts a timer (320) and answers the telephone with a verbal "hello" (322) via the speech synthesizer 34. The REPROG TELEPHONE flag is cleared (323). Next, if thirty minutes has still not expired, the routine 300 waits up to one minute (324, 326, 328) for instruction via DTMF tones regarding engine status (FIG. 6(b) at 330, 332, 334), command to reprogram the telephone's outgoing number if the system 10 needs to place a call (337, 339, 341, 343, 345) or output a discrete signal to a user designated option (333, 335), commands to start or stop the engine (336, 338, 340), to give current tracking position (347, 361, 363, 365), or to kill the engine (342, 344, 346). Finally, it clear the timers (348), hangs up the telephone 12 (350), and checks the REPROG TELEPHONE flag (356). If the flag is set, the telephone key data are sent to the telephone (358) and a command is issued to program the telephone memory (360) before turning off, setting the STCM flag to IDLE (354) and returning to STCM module 160. For each user action, the system 10 responds with a verbal acknowledgement.

The DTMF tones generated by the user on a touchtone telephone to instruct the system 10 during the receive mode in the exemplary embodiment include the following:

| COMMAND | FUNCTION |
| --- | --- |
| STRT | Remotely starts/stops a remote unit such as the vehicle engine. |
| STOP | Engine kill (disable) |
| CHAN | External channel output |
| RPMS | Engine on/off status |
| PHON | Reprogram outgoing telephone call number |
| TRAK | Request vehicle position data |

Figure 7:
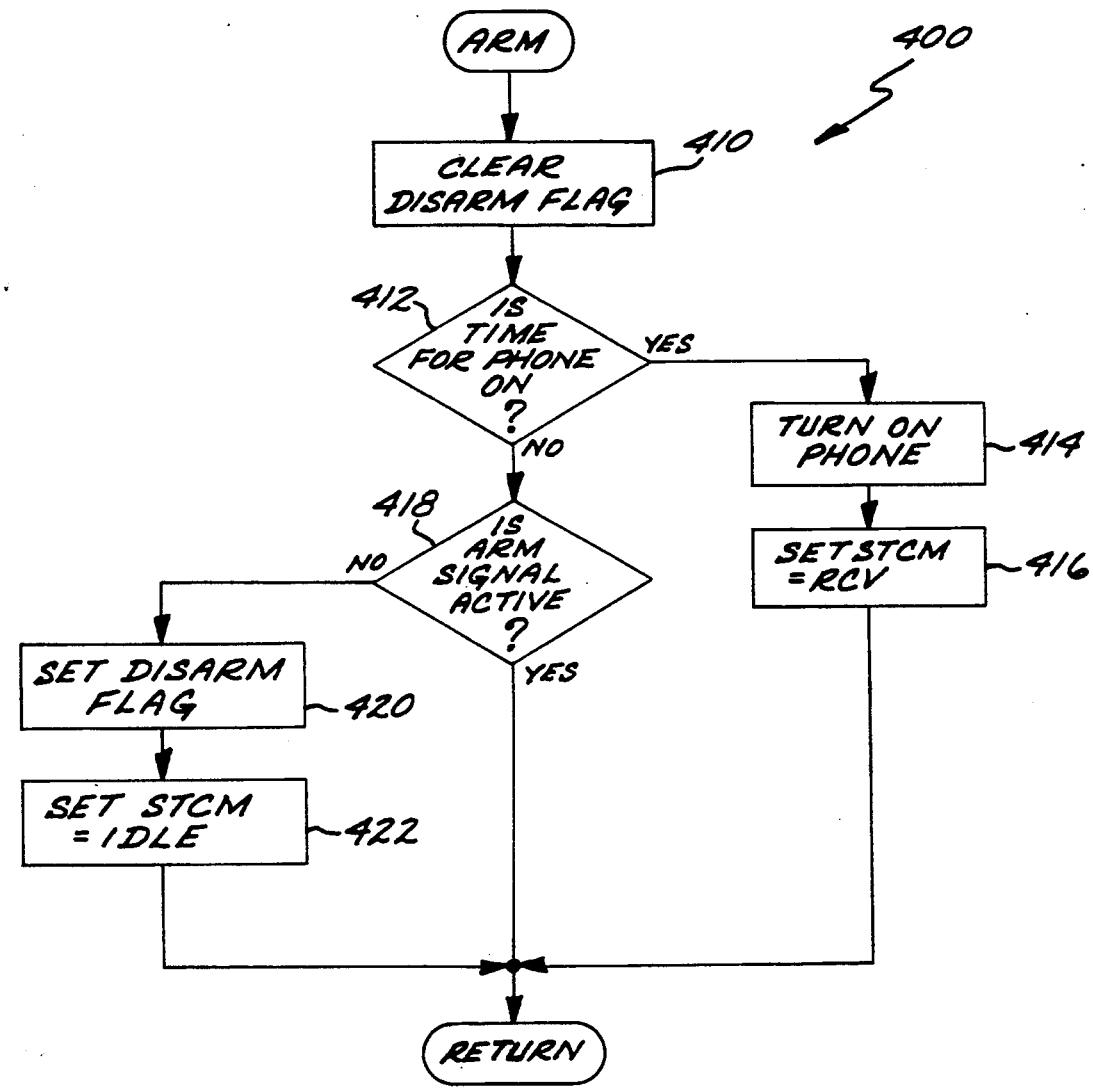
FIG. 7 is a flow diagram of the Arm foreground routine of the program of the present invention.

If the STCM register is set to ARM, that is, if the security system is set to the armed mode, the STCM module 160 calls the Arm routine 400. As shown in more detail in FIG. 7, the Arm routine 400 essentially checks to determine if it is time to turn on the telephone 12 in accordance with a preprogrammed turn-on time (412) as discussed above. If so, it turns on the telephone (414), sets the STCM register to RCV (416) and exits. The STCM module 160 then calls the Receive routine 300. If it is not time to turn on the telephone 12, the Arm routine 400 checks the state of the ARM flag (418). If the ARM flag is not active, the Arm routine 400 sets the DISARM flag (420) and sets the STCM register to IDLE (422). If it is not time to turn on the telephone 12 and the ARM flag is active, the Arm routine 400 returns.

Bypassing the programming routine 500 momentarily, if there is a need for the system 10 to place a call, that is, if the GON flag is set, the Outgoing routine 600 is called by the STCM module 160. The Outgoing routine 600 is shown in detail in FIGS. 8(a)-8(e). Basically, the Outgoing routine 600 checks a PANIC flag (610) and sets an engine KILL flag if the PANIC flag is not set (612). The outgoing routine (600) allows the system to place a call if the user is in or near the vehicle and activates a panic function or, if an intruder is present (the security system was tripped), the system disables the engine. The routine 600 then turns on (616) and unlocks (618) the telephone if it is not on (614) and starts a thirty minute timer (620). It then selects and retrieves a number in memory based on whether the PANIC flag is set (622, 624, 626), and dials the selected number (628). The CIP interface 28 is checked in a wait loop for CIP validity (630). Once CIP validity is established and the CIP status is not "busy," operation proceeds to node FF (FIG. 8(c)). If the CIP indicates a "busy" signal, operation cation, the telephone is electronically hung up (636). If this was the first call, the REDIAL flag is set and operation proceeds to node HH at FIG. 8(a). If this is not the first call, the STCM variable is set to RCV (640) and operation returns.

Figure 8A:
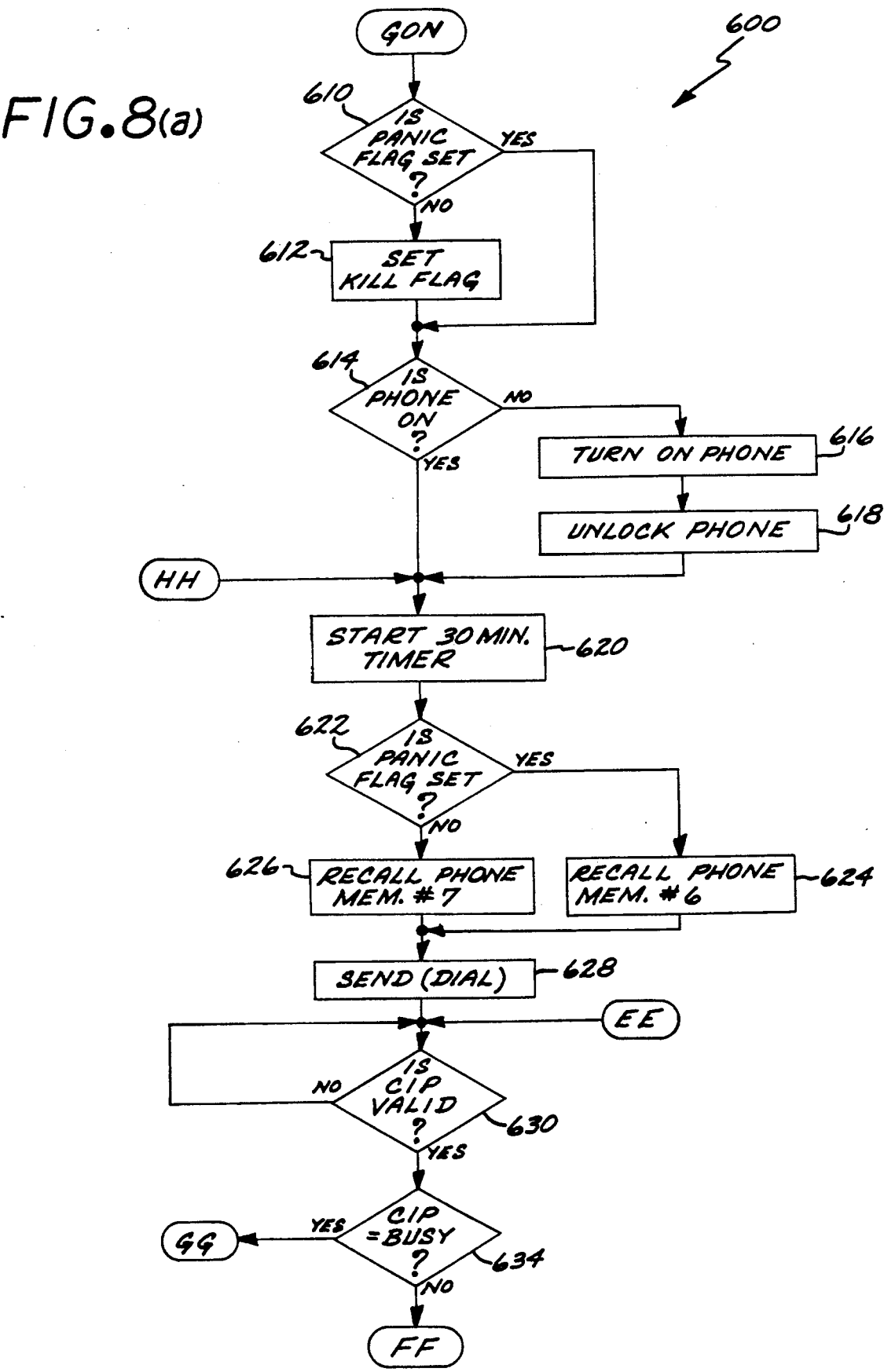
FIGS. 8(a) through 8(e) are flow diagrams of the Outgoing foreground routines of the program of the present invention.
Figure 8B:
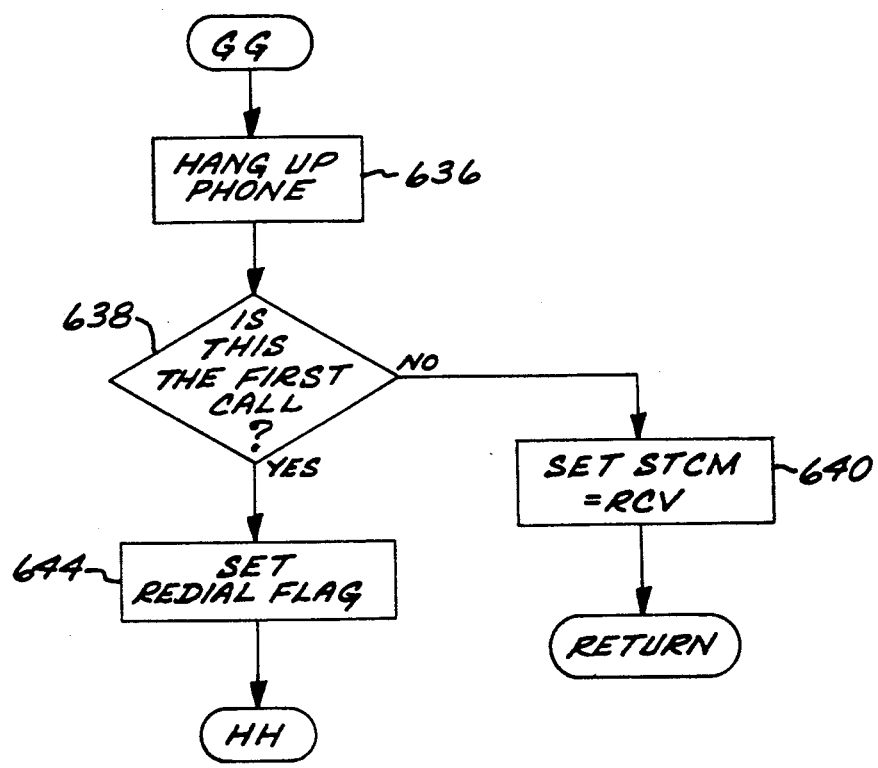
Figure 8C:
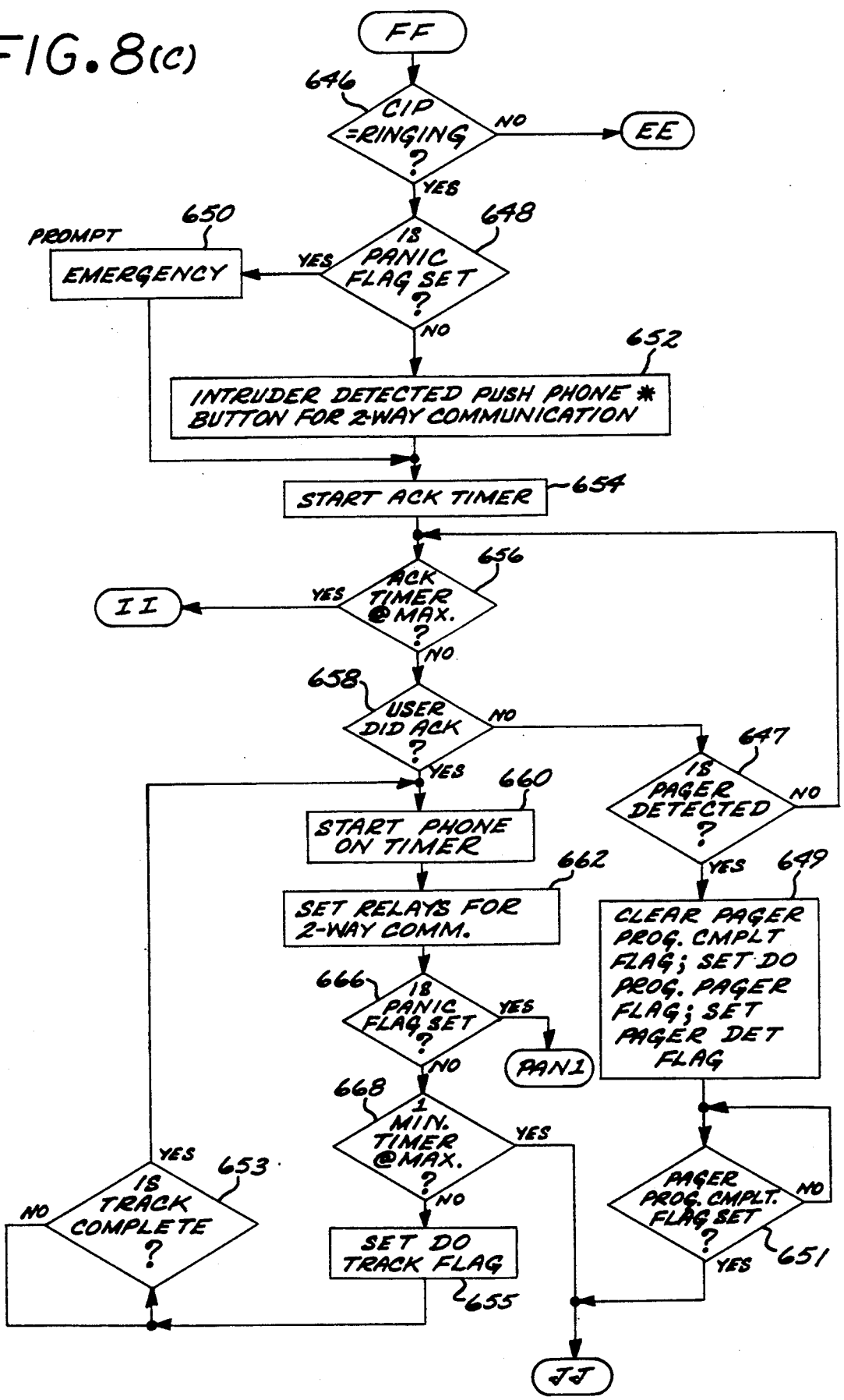

Referring now to FIG. 8(c), once the telephone is answered (646), a voice synthesized prompt message is generated, depending on whether the flag PANIC is set (648). If the flag is set, the prompt is "Emergency" (650); if not set, the prompt is "Intruder detected—push phone * button for two-way communication" (652). An acknowledge timer is then started (654) and operation proceeds to node II (FIG. 8(d)) if the timer has reached its maximum value (656). If the timer has not reached its maximum, and the user has not acknowledged the prompt for two-way communication (658), a test is performed as to whether a pager service is detected (647). If not, operation loops back to 656. If a pager service is detected, then at 649 the flag PAGER PROG CMPLT is cleared, and the flags DO PROG PAGER and PAGER DET are set. Operation then waits (651) until the flag PGR PROG COMPLT is set, at which time operation proceeds to node JJ (FIG. 8(d)). Returning now to 658, if the user did acknowledge the two-way communication prompt, then the "telephone on" timer is started (660), the relay is set for two-way communication (662), and the PANIC flag is checked (666). If set, operation proceeds to node PAN1 (FIG. 8(e)). If not set, operation proceeds to node JJ if the one minute timer has reached its maximum. If the timer has not reached its maximum, the flag DO TRACK is set (655), and operation "waits" at 653 until the track operation is completed. Operation then proceeds to 660.

Figure 8D:
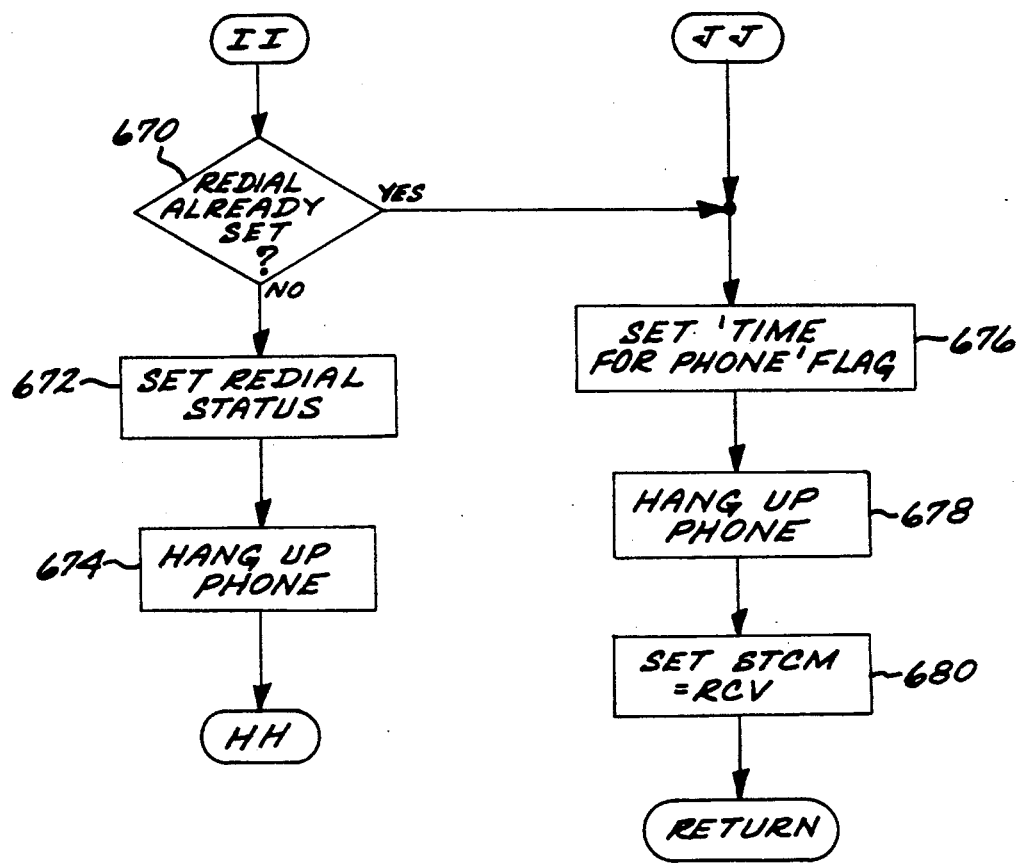

At 670 (FIG. 8(d)), if the flag REDIAL is not already set, the redial status is set (672) and the telephone is electronically hung up (674) before operation proceeds to node HH (FIG. 8(a)). If the flag is set, then the flag TIME FOR PHONE is set (676), the telephone is hung up (678), the STCM register is set to RCV (680) and operation returns.

Figure 8E:
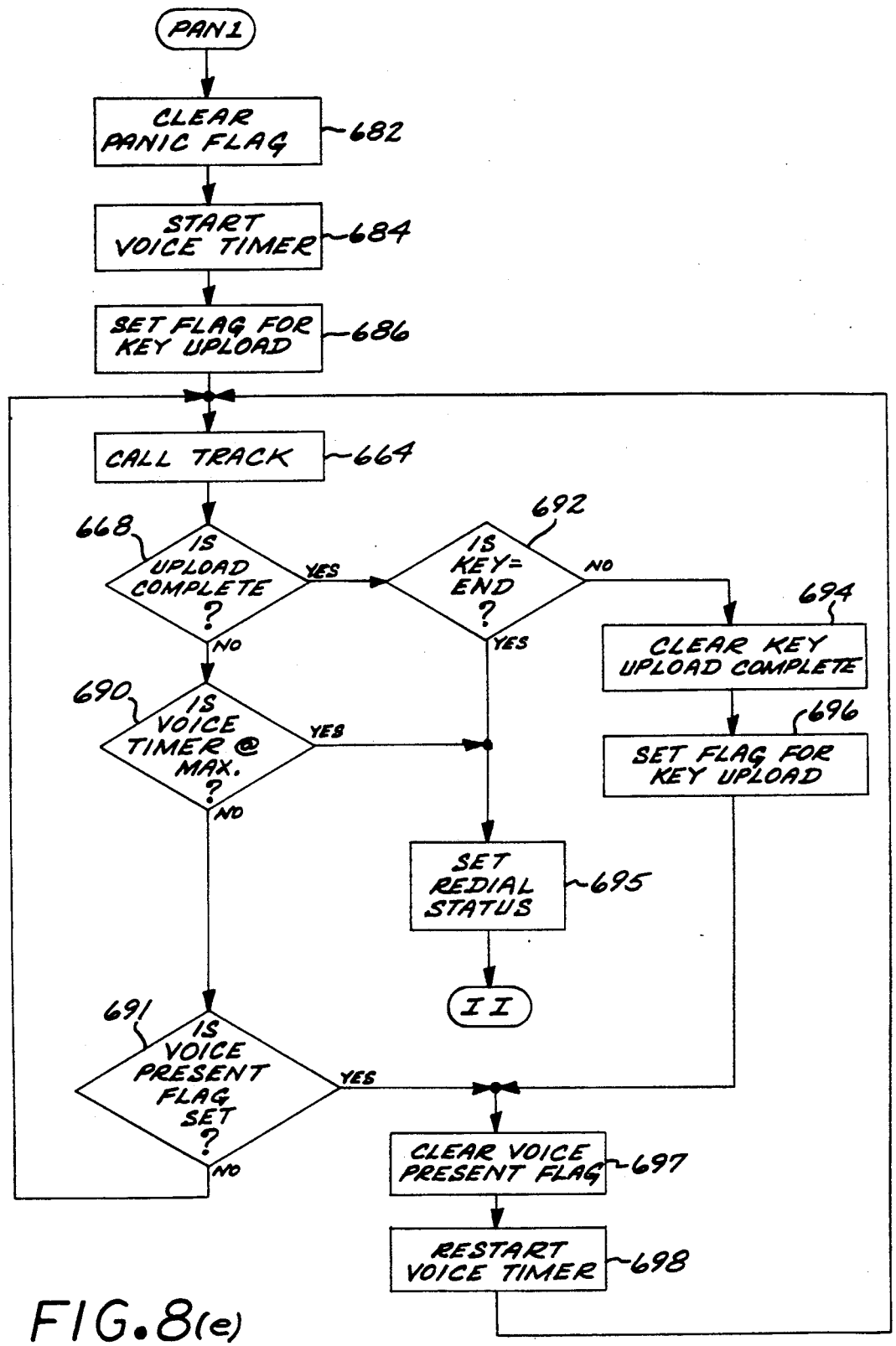

From the node PAN1 (FIG. 8(e)), the PANIC flag is cleared (682), the voice timer is started (684), and the flag for KEY UPLOAD is set (686). At 664, the TRACK routine is called. Upon return, if the upload is complete (668), and the key was the "end" key (692), the redial status is set (695) and operation proceeds to node II (FIG. 8(d)). If the key is not the "end" key, the flag KEY UPLOAD COMPLETE is cleared (694), and the flag for KEY UPLOAD is set (696). The flag VOICE PRESENT is cleared (697), the voice timer is restarted (698), and operation loops back to 664. Returning now to 668, if the upload is not complete at this point, the voice timer is checked (690) and if it has reached its maximum, operation proceeds to 695. Otherwise, at 691, if the flag VOICE PRESENT is not set, operation loops back to 664. If the flag is set, operation proceeds to 697.

Thus, as shown in FIG. 8(c)–8(e), when the telephone is answered, if answered by a digital pager service, upon receiving the pager program tones, the system 10 outputs a predesignated telephone number to the pager and then terminates the call. Otherwise, the routine issues a verbal statement appropriate for the situation and periodically outputs its current location based on tracking data input from a global positioning system. It may be output as speech, DTMF codes, modem mark/space digital data, or any other desired format. If a panic state exists, it allows the user to speak. If an intruder is present, it configures the system to allow the user to talk to the intruder in the vehicle and to disable the engine. Thereafter, for the next 10 times that the intruder turns on the ignition, the cellular telephone will be turned on, the keypad locked out, and the telephone set to receive all incoming calls from its owner.

While the security system is in the "Armed State," the system 10 will not enter the Program mode, preventing unauthorized modification of any system parameters. Furthermore, if the security system is in the "Disarmed" state, before the user may alter any parameters, he must enter his cellular unlock code. As a third tier of security, the system 10 will not allow reprogramming of the cellular unlock code while it has the vehicle engine disabled.

When the system 10 detects no security breach and receives a request from the handset 14 to enter the program mode, the STCM module 160 calls the Program routine 500. As shown in detail in FIGS. 9(a)–9(l), once the unlock code has been entered (561 through 573) and until a program timer expires (FIG. 9(b), (503)), the Program routine 500 provides verbal prompts and acknowledgements which help the user to program or configure the system 10 including, for example, and without limitation: setting the engine RPM threshold or vehicle speed threshold (so that the engine is not disabled at higher RPM or speed) (FIG. 9(b)), setting the timing for system 10 outgoing call immediately when an alarm is tripped or after an alarm is tripped and the vehicle door is opened as well (FIG. 9(c)), setting the cellular telephone lock for use by the SEC routine 228 (FIG. 9(d)), setting the local time (FIG. 9(e)), setting any number of telephone turn-on times (FIGS. 9(e-h)), setting the polarity of the door trigger (FIG. 9(l)), enabling or disabling the security system speech diagnostics function (FIG. 9(c)), selecting or deselecting a passive engine disable (for a valet mode) (FIG. 9(i)), programming a telephone number to be output should a pager answer the system's (10) outgoing call (FIG. 9(j)), programming the system 10 to place itself in an idle state, enabling or disabling horn sounding on incoming calls (FIG. 9(k)), to set the system audio level for the user (FIG. 9(j)), to set the entry delay before a passive engine disable is set (FIG. 9(h) and setting a manual engine disable (FIG. 9(i)). If the user needs assistance, the system 10 can prompt the user for assistance programming every feature through a programming menu. The user may opt for the direct access (no prompt) mode in which case the user enters 4 digit mnemonics (e.g., 7767 = RPMS).

While in the programming mode, the use selects a particular feature to be programmed by entering a predetermined instruction code via the cellular telephone keypad. In the disclosed embodiment, the following exemplary instruction codes may be employed.

| Code | Feature |
| --- | --- |
| RPMS | Engine idle speed value. |
| TRIP | "Tripped" call timing (immediate or delayed until door opened) |
| DIAG | Synthesized speech for security system diagnostic function |
| CODE | Program cellular unlock code |
| TIME | Set current time. |
| REC$\underline{X}$ | X = 0–6, to set receive times 1–6 (REC$\underline{0}$ clears all stored times) |
| DLAY | Passive engine disable entry delay. |
| STOP | Engine disable |
| AUD$\underline{X}$ | X = 1–9 for nine different audio levels |
| PAGE | Record number to be called if pager system answers outgoing call. |
| HORN | Enable/disable horn ringing when cellular telephone rings. |
| TRIG | Program door trigger polarity |
| OFFF | Turn system 10 on/off |

Figure 9A:
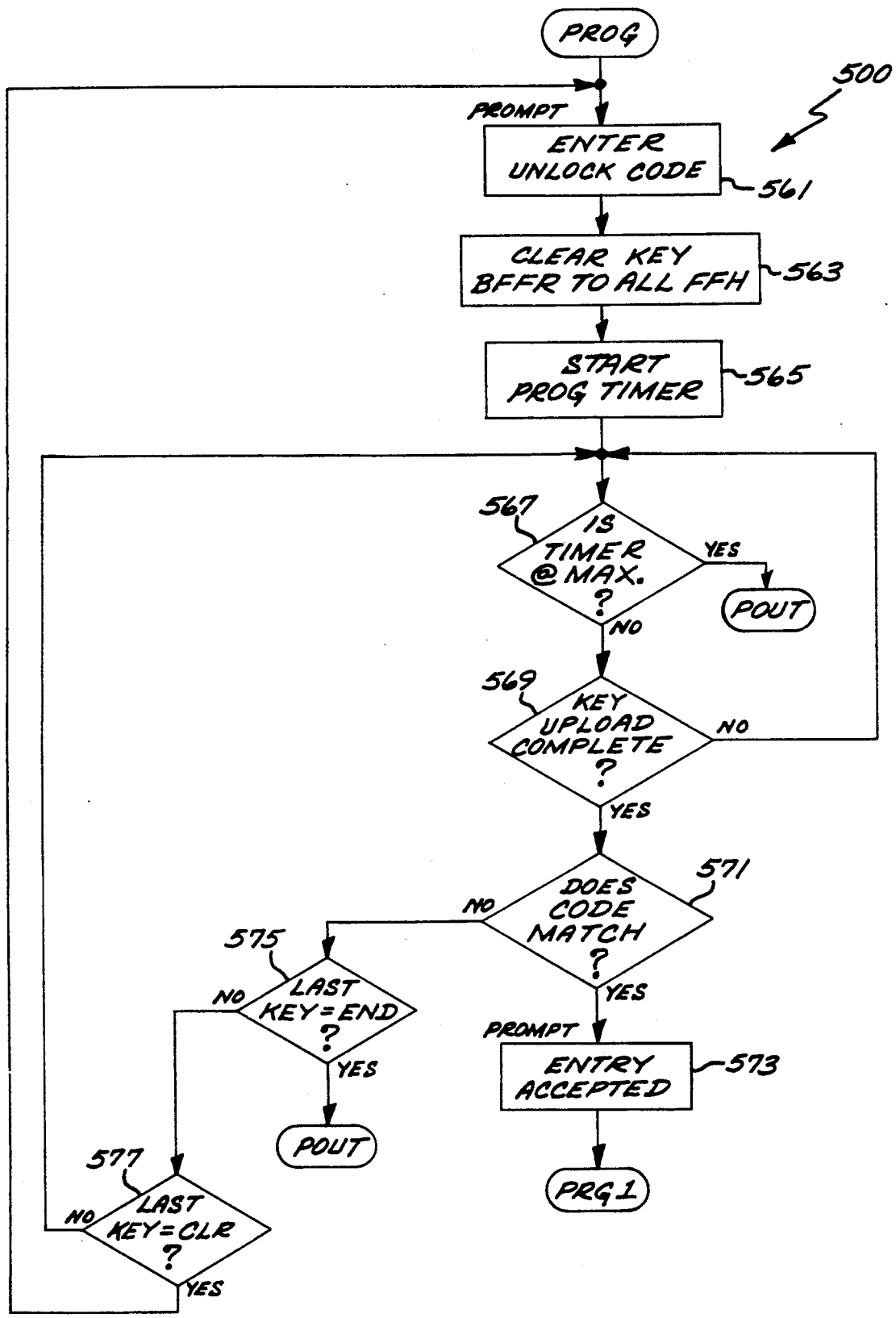
FIGS. 9(a) through 9(l) are flow diagrams of the Program foreground routines of the program of the present invention.

The PROG routine 500 is shown in FIG. 9(a), and is called from the state control module (FIG. 2(a)). At 561, the prompt "Enter unlock code" is issued via the speech synthesizer. The key buffers are cleared (563) and the program timer is started (565). Once the timer reaches its maximum value (567), operation proceeds to node POUT. At 569, operation loops back to 567 until the keypad upload operation is complete, i.e., until the user has completed entering the code. If the entered code matches a stored code value (571), the prompt "entry accepted" is issued and operation proceeds to node PRG1 (FIG. 9(b)). If the code does not match, and the last key was the "end" key, operation proceeds to node POUT. If the last key was not the "end" key, operation loops back to 567 unless the last key was the "clear" key, in which case operation loops back to 561 to repeat the process.

Figure 9B:
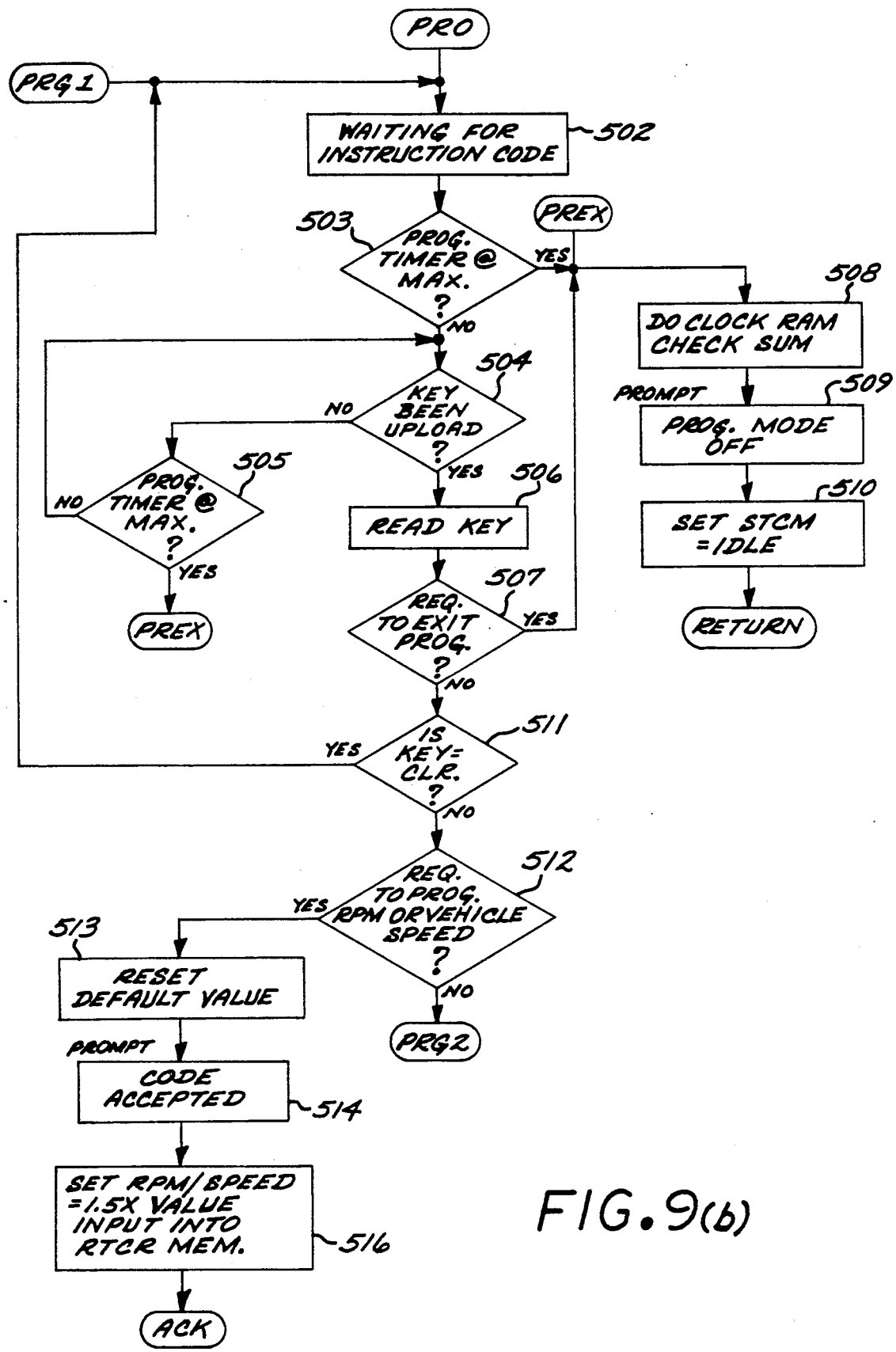

From node PRG1 (FIG. 9(b)), the prompt "Waiting for instruction code" is issued (502), and the program timer is checked (503). If the timer is at the maximum value, then at 508 a clock RAM check sum operation is performed, and the prompt "Program mode off" is issued (509). The STCM register is then set to IDLE (510) and operation returns. If the timer has not reached its maximum, a wait stage is entered until a key has been uploaded or the timer reaches its maximum (504, 505). Once the timer reaches its maximum, operation proceeds to node PREX. Once the most recent key has been uploaded, the key is read (506), and if it indicates a request to end the program mode, operation proceeds to 508. If the key is the "clear" key, operation loops back to 502. If the keys uploaded indicate a request to program the RPM or vehicle speed threshold feature (performed while the vehicle engine is idling), the default value is preset (513), and the current engine speed is read by monitoring the TACH signal. A prompt "code accepted" is issued (514), and a threshold value equal to 1.5 times the idle value read from the TACH input is stored in the real time clock memory (516). Operation then proceeds to node ACK. If the keys uploaded do not indicate a request to program the RPM or speed value, operation proceeds to node PRG2.

Figure 9C:
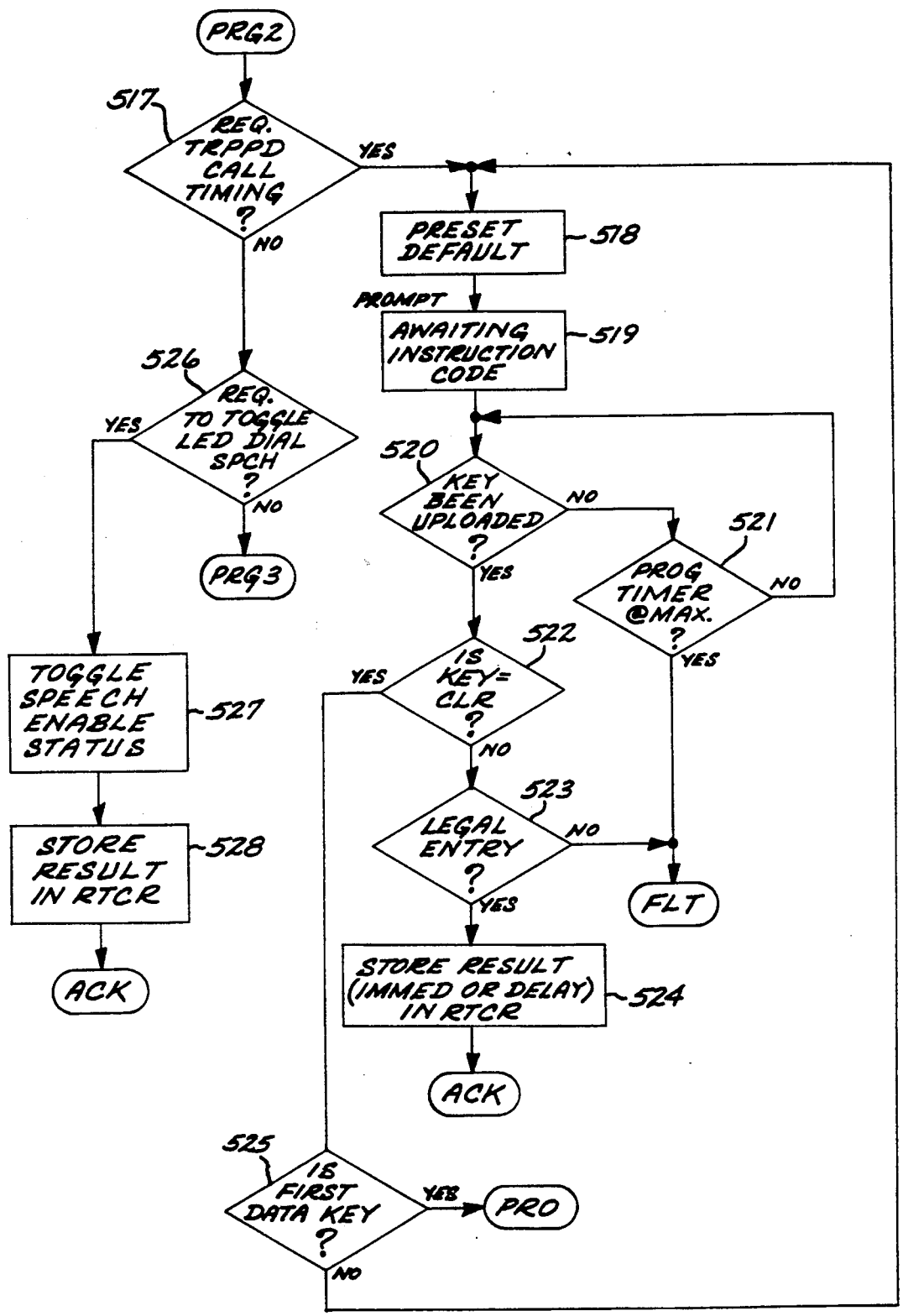

At node PRG2 (FIG. 9(c)), if the keys entered indicate that the tripped call timing feature is to be programmed (517), (i.e., whether the outgoing telephone call made when the security system is tripped is made immediately upon tripping or only after the door is opened) then the default value is preset (518), the prompt "awaiting instruction code" is issued (519). A wait state is entered until another key has been uploaded or the program timer reaches its maximum value (520 and 521). If the program time reaches its maximum value before a new key is uploaded, operation proceeds to node FLT. If the key is the "clear" key (522) and if the key was the first data key (525), operation proceeds to node PRØ (FIG. 9(b)). Otherwise, operation loops back to 518. If the key was not the clear key, and if it was a "legal" entry (523), the result (immediate or delay) is stored in the memory (524), and operation proceeds to node ACK. If the entry was not a legal entry, operation proceeds to node FLT. Returning now to 517, if the keys uploaded were not an indication that tripped call timing was to be programmed, if the uploaded keys indicate that the LED diagnostic speech feature is to be enabled/disabled (526), then the status of this feature is toggled (527), and the resulting status for this feature is stored in memory (528). Operation then proceeds to node ACK.

Figure 9D:
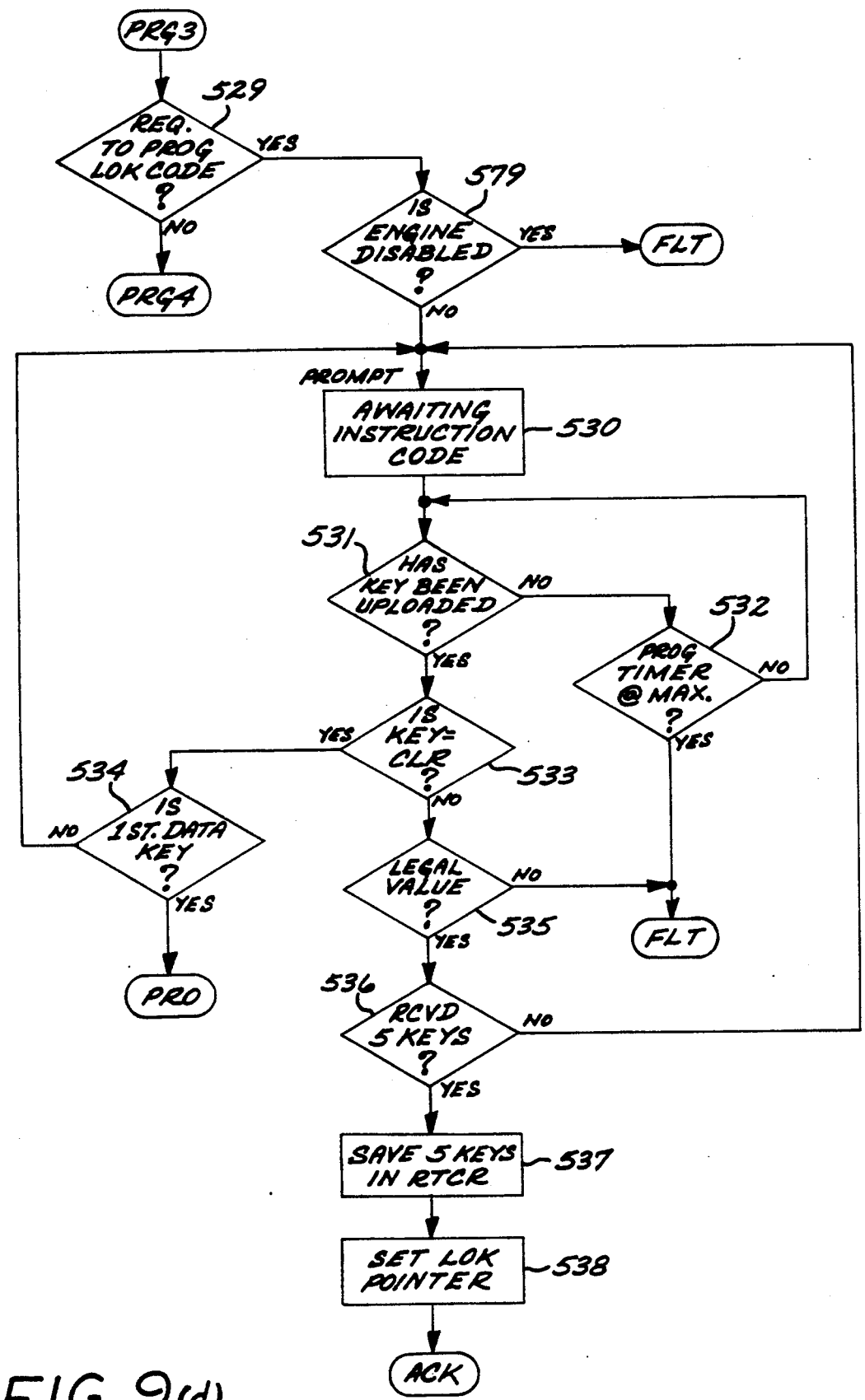

At node PRG3 (FIG. 9(d)), if the entered keys indicate a request to program the lock code (529), only if the engine is not disabled (579) will this feature be programmed. If the engine is not disabled, the prompt "awaiting instruction code" is issued (530), and five key values are entered by the user (531–536). The five keys are entered in the memory (537) and the LOK pointer is set (538), before operation proceeds to node ACK.

Figure 9E:
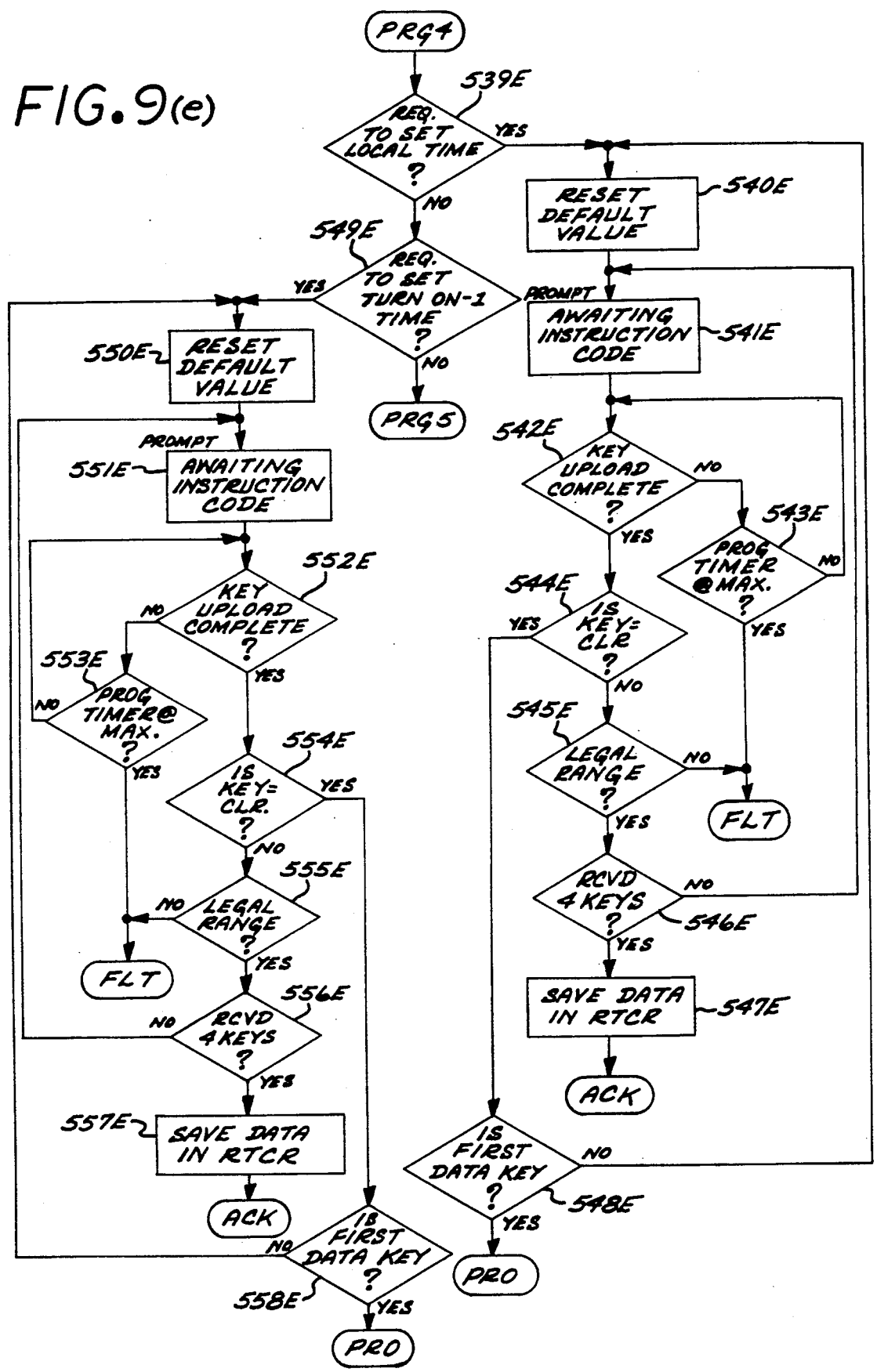
Figure 9F:
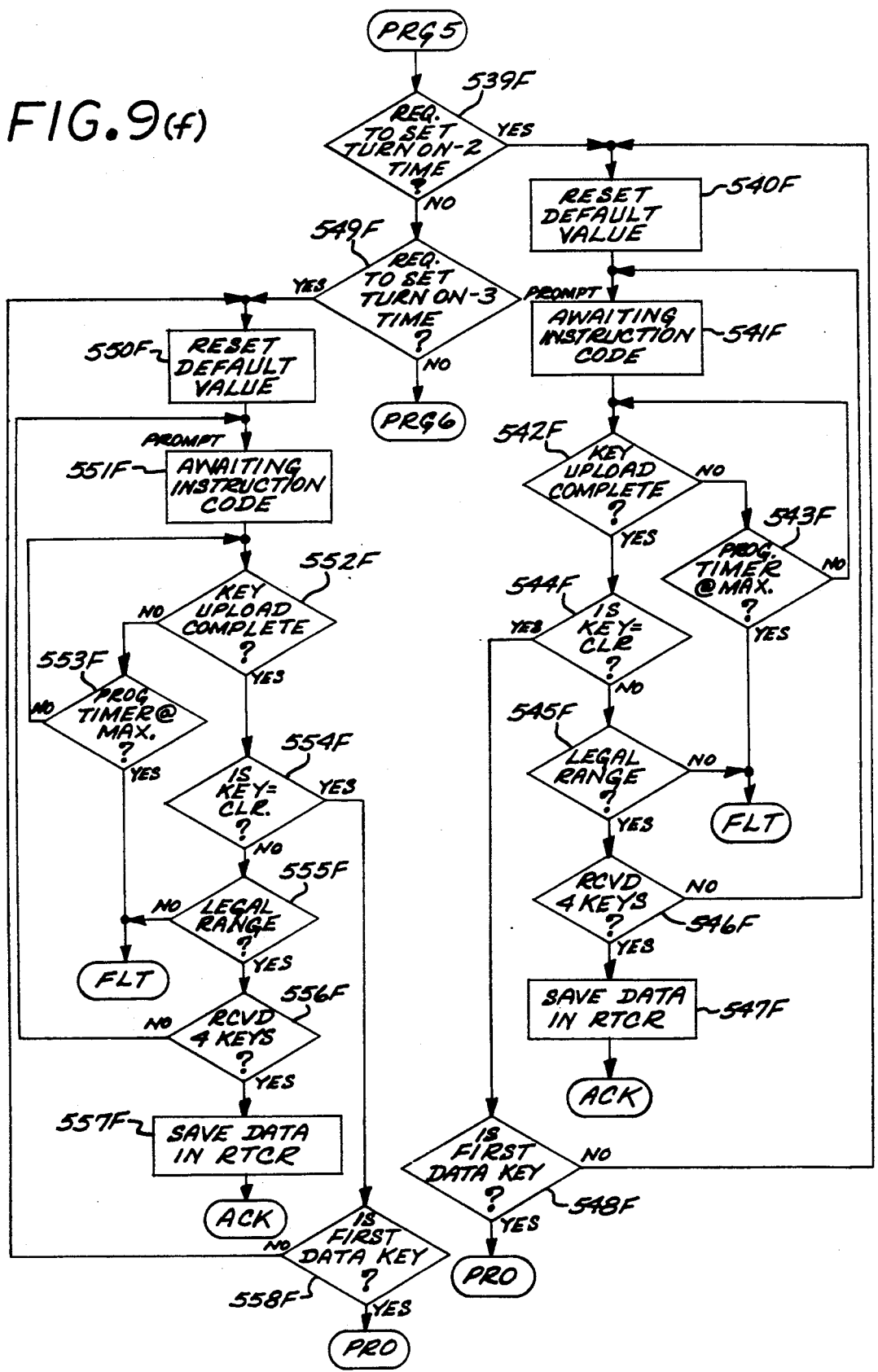
Figure 9G:
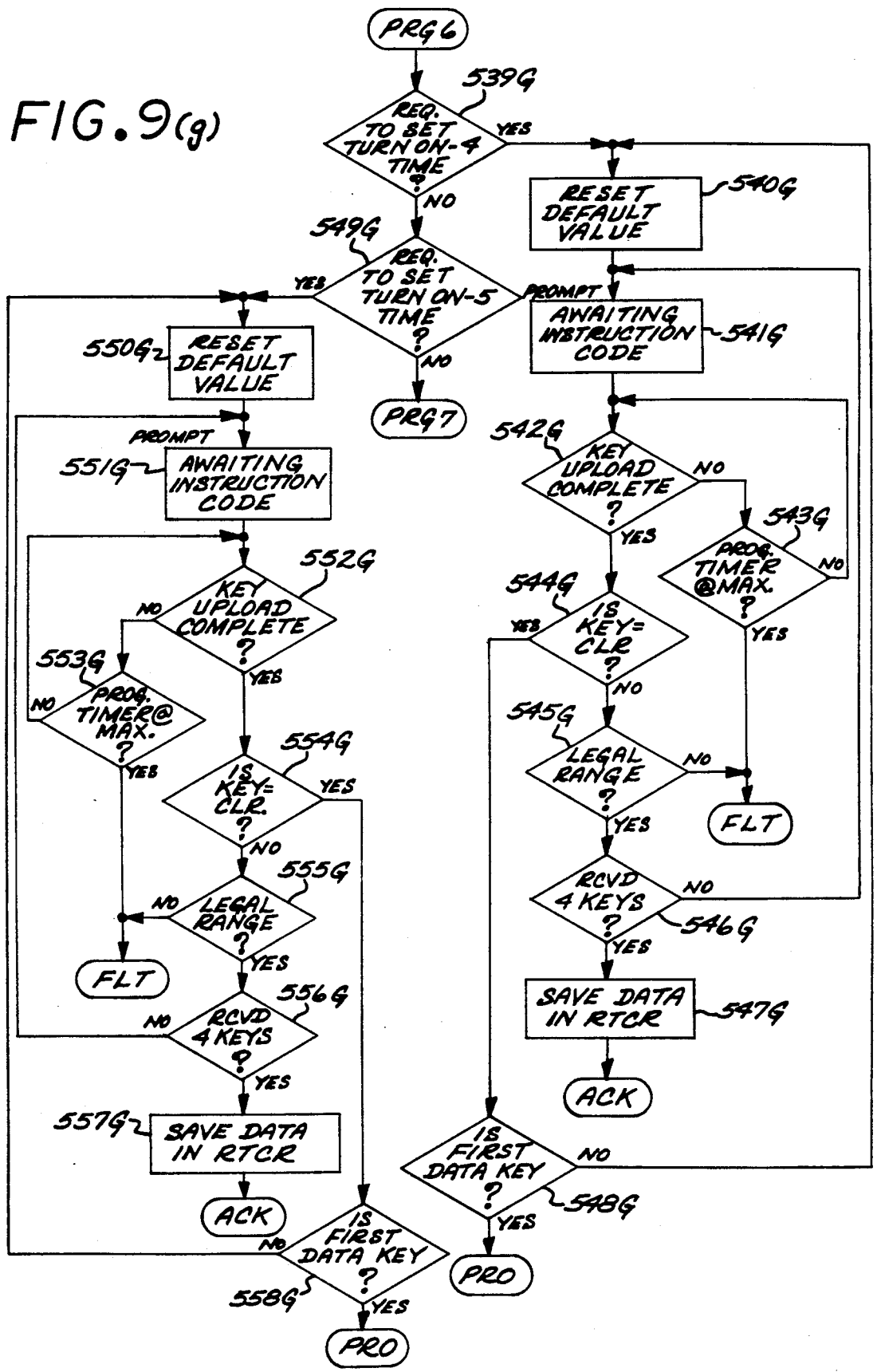
Figure 9H:
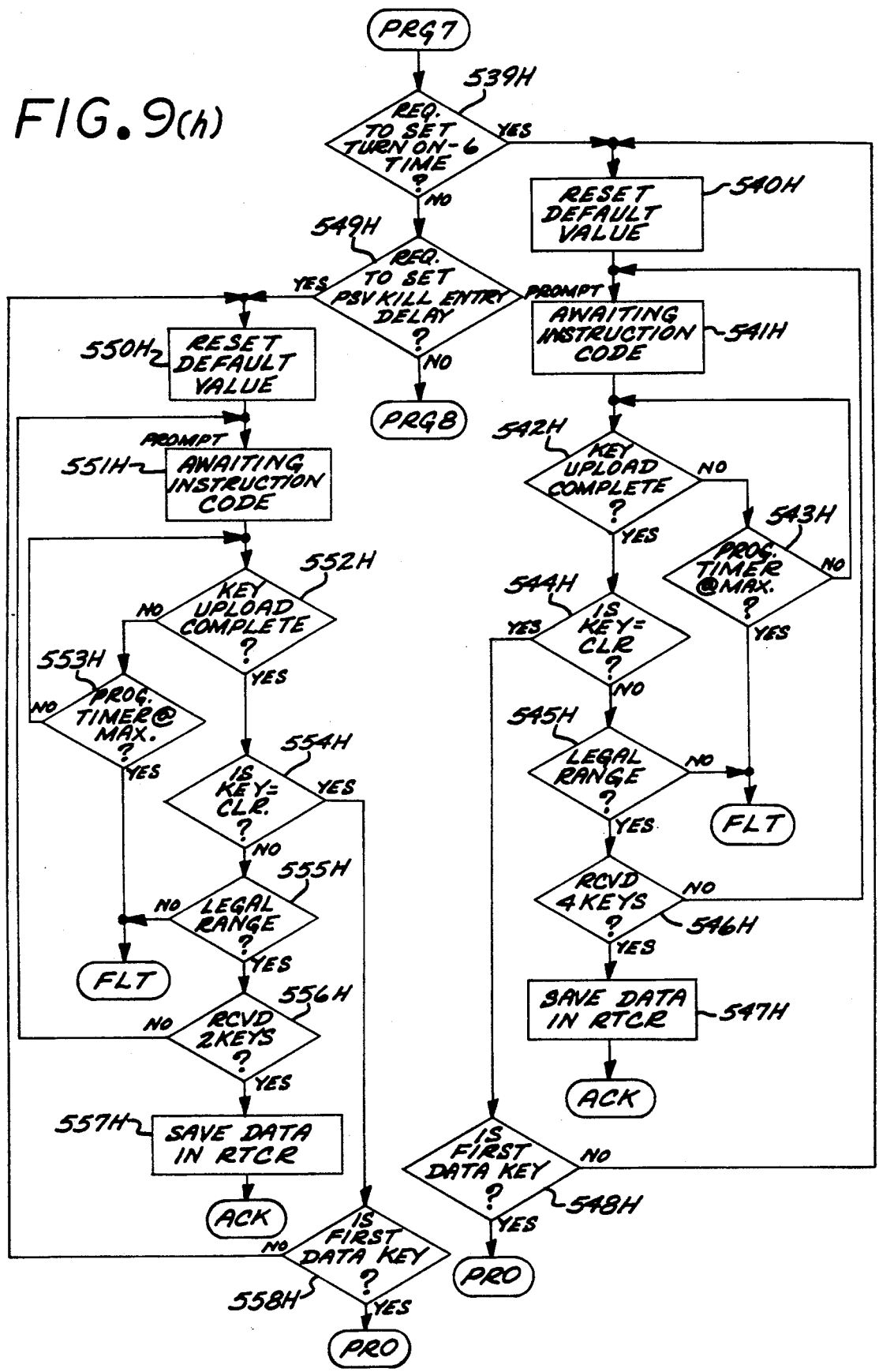
Figure 9I:
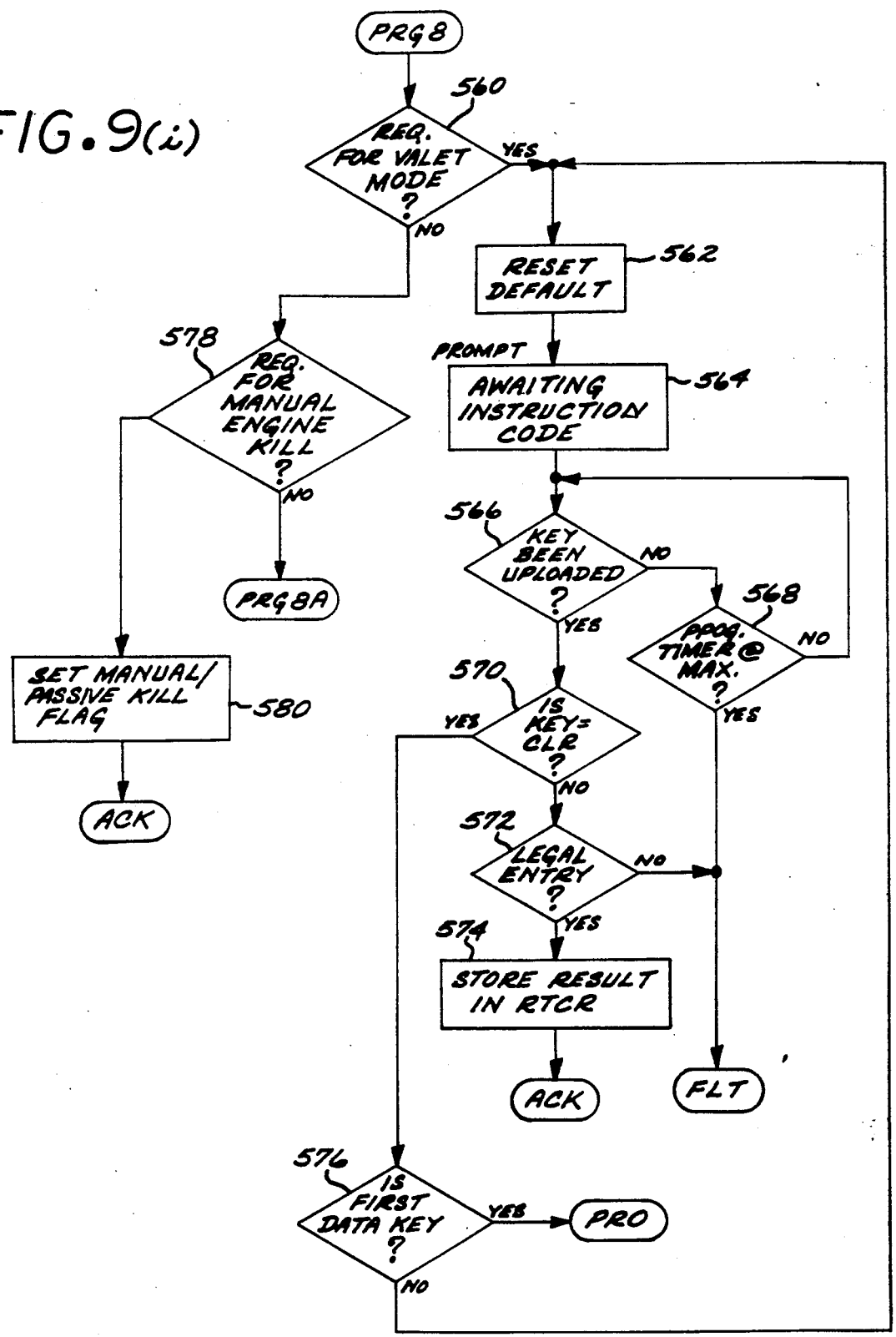
Figure 9J:
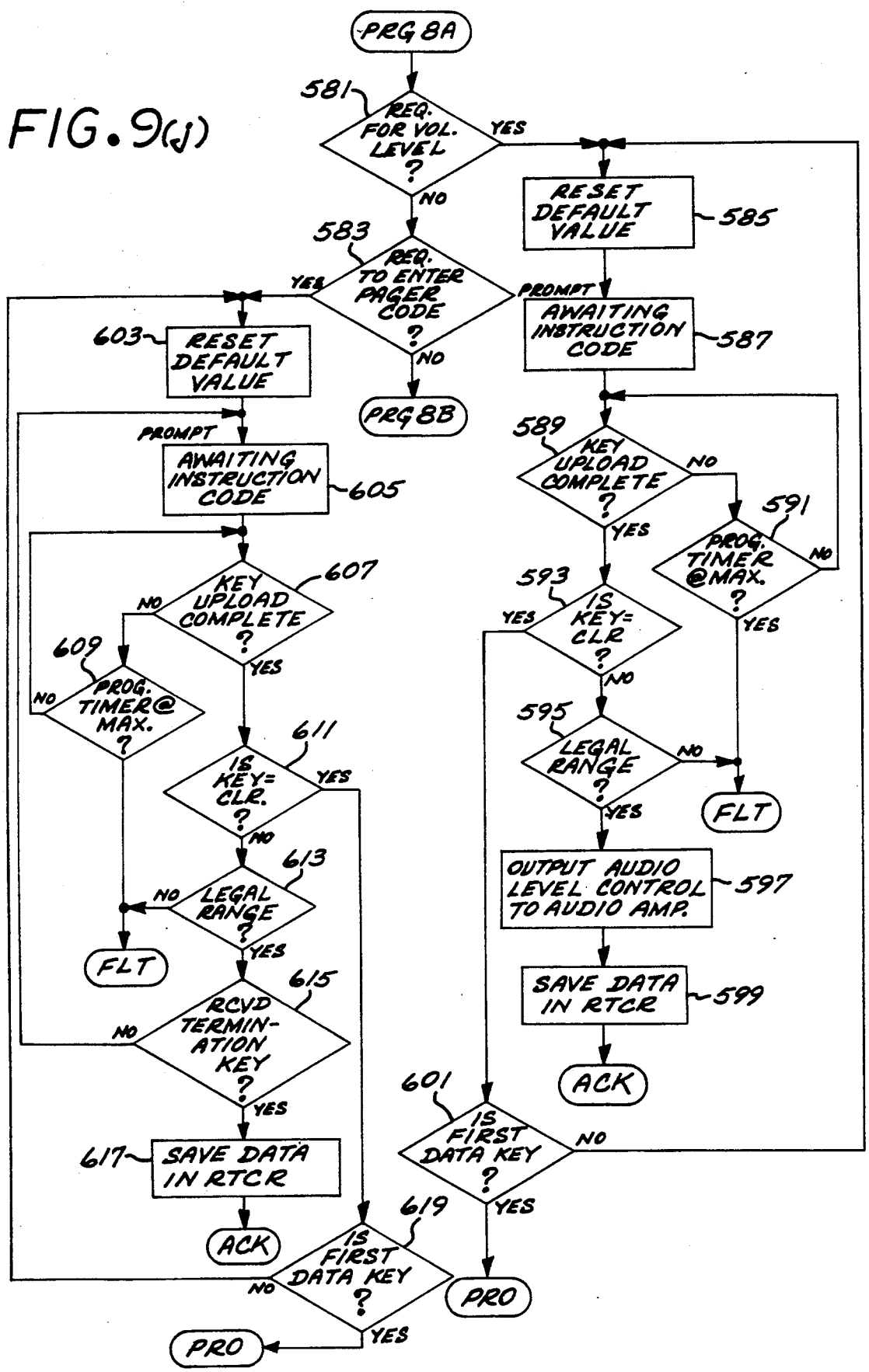
Figure 9K:
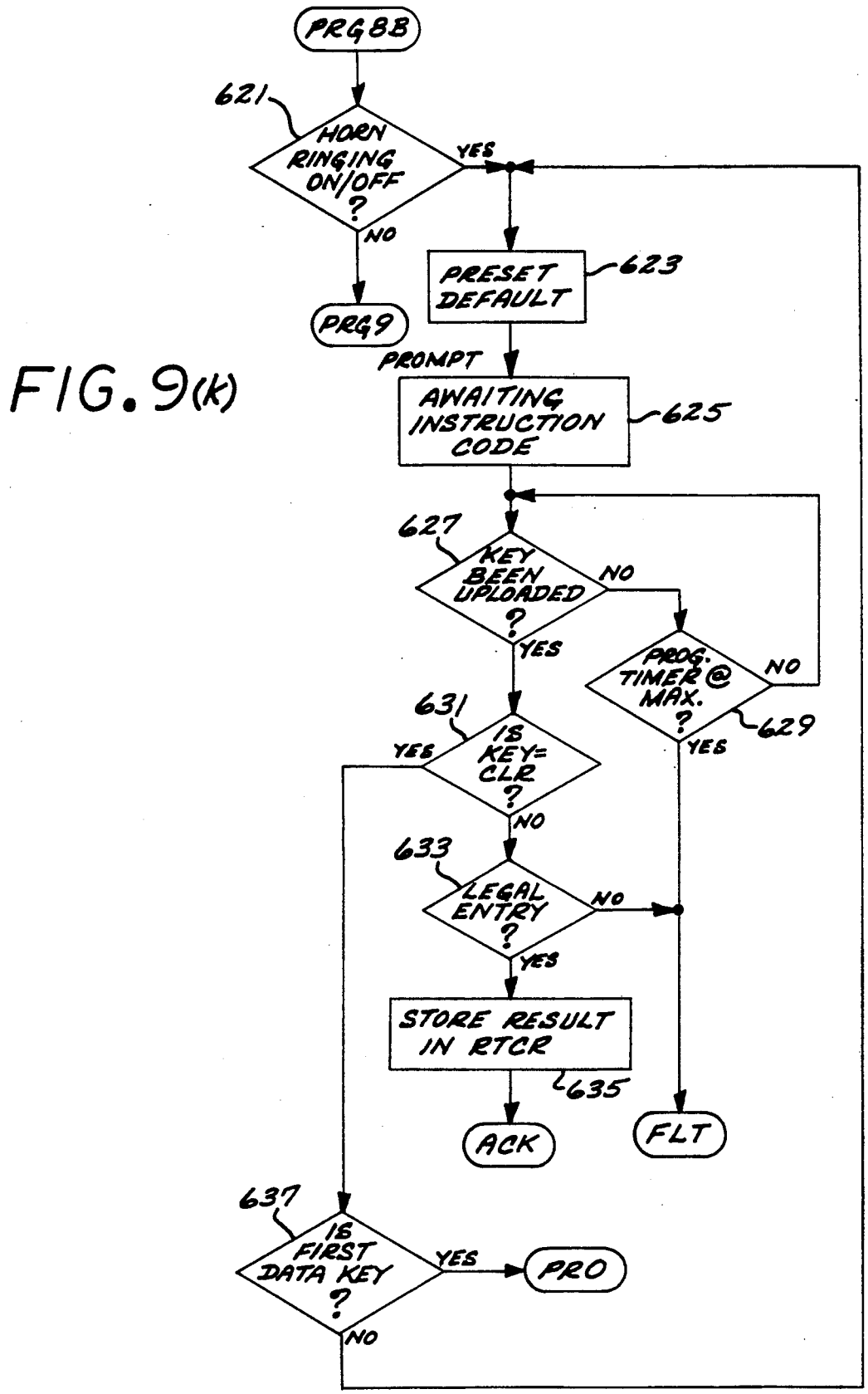
Figure 9L:
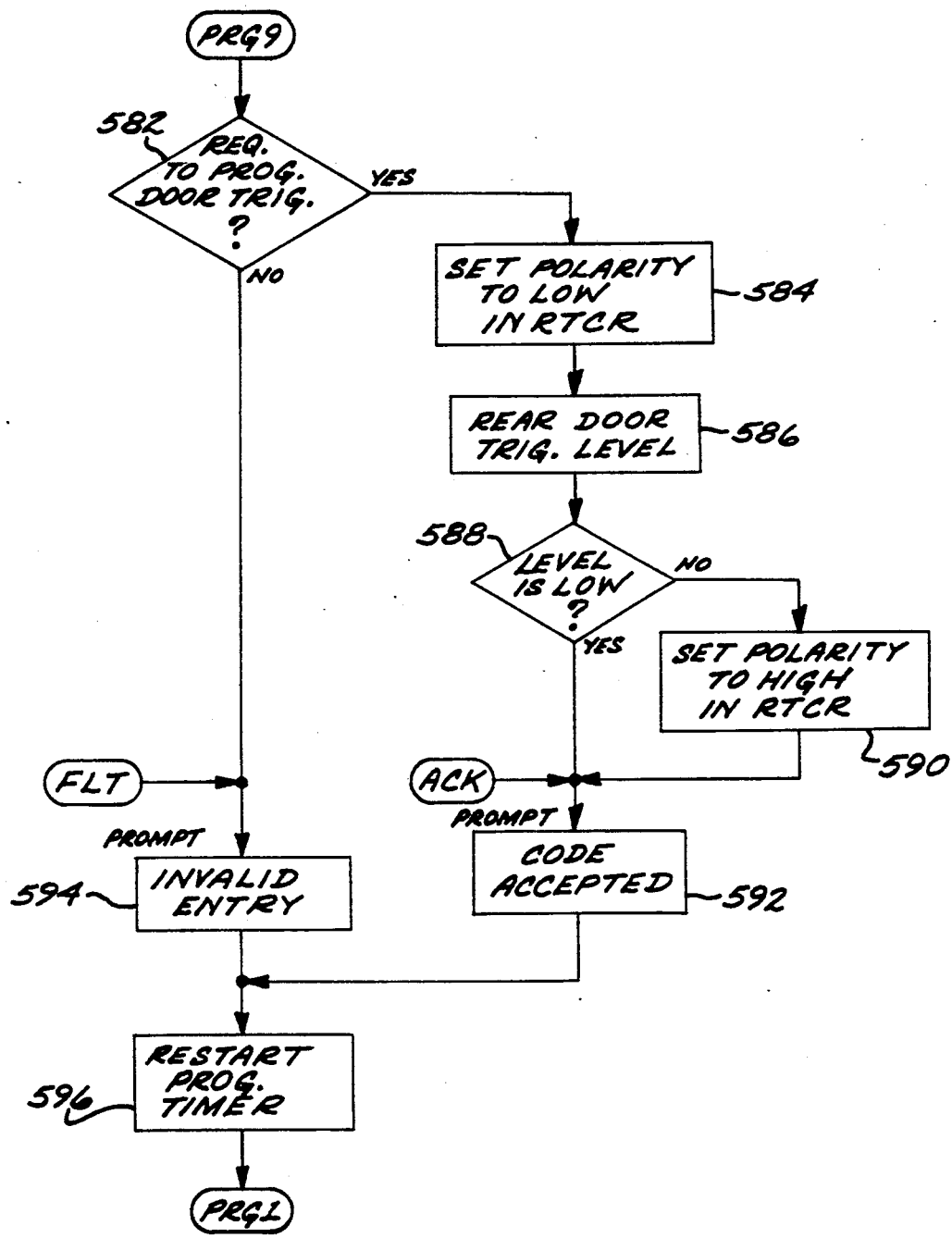

At node PRG4 (FIG. 9(e)), if the entered keys indicate a request to set the local time, the user is allowed to enter values to set the time (540E–546E) via four keys, at which time the values are stored in memory before operation proceeds to node ACK. If the entered keys indicate a request to set the first telephone turn-on time (549E), steps 550E–557E illustrate the sequence of steps performed to enter and store a date in memory. FIGS. 9(f)–9(h) illustrate the steps to program the second through sixth telephone turn-on times, respectively. Also shown in FIG. 9(h) are the steps for programming the passive kill entry delay time (549H–557H). FIG. 9(i) shows the steps for programming the valet mode (560, 562, 564, 568, 570, 572, 574, 576) and for activating the manual engine kill (578, 580). FIG. 9(j) shows the steps for programming the volume level (585, 587, 589, 591, 593, 595, 597, 599) and for entering a new pager code (583, 603, 605, 607, 609, 611, 613, 615, 617). FIG. 9(k) shows the steps for programming the system so that the horn ringing feature is either enabled or disabled. FIG. 9(l) shows the steps for programming the polarity of the door trigger recognized by the system.

Figure 10A:
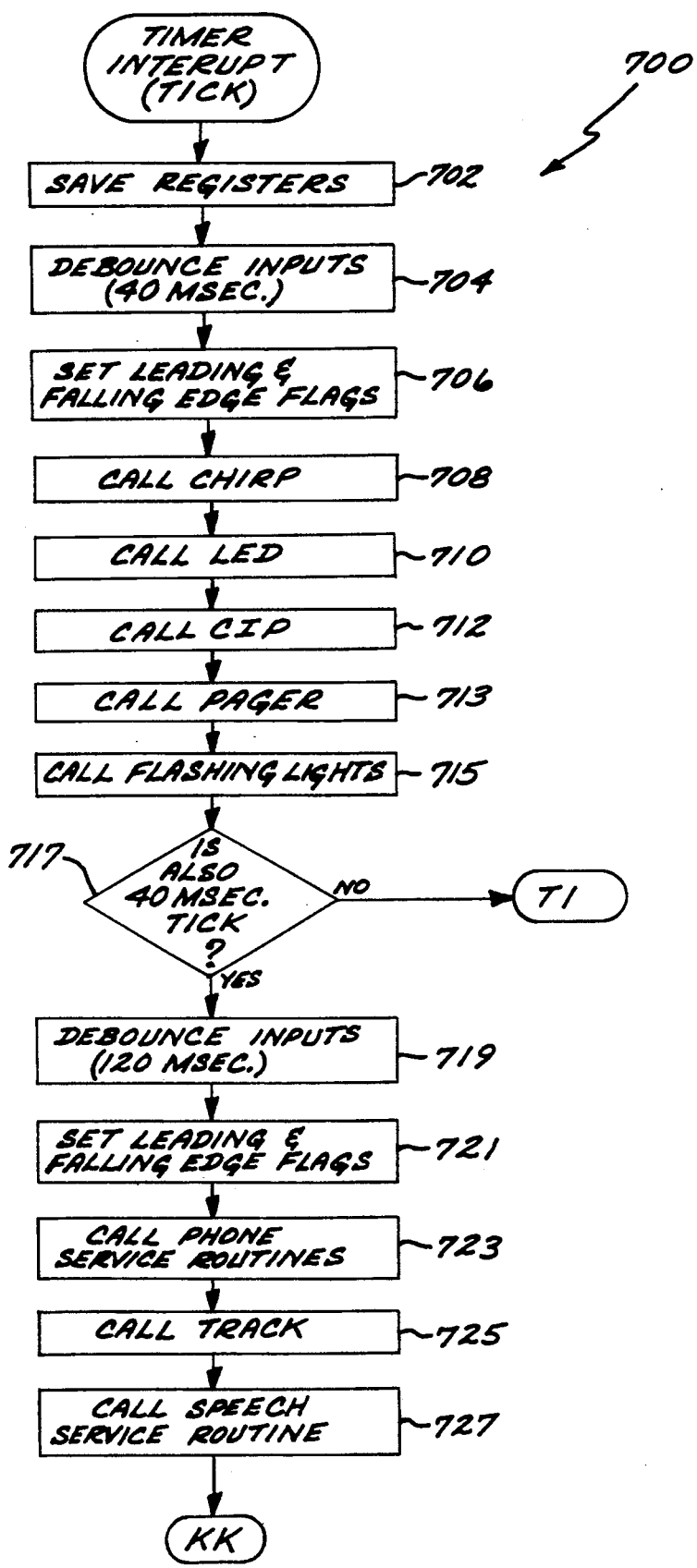
FIGS. 10(a) and 10(b) are flow diagrams of the Periodic Timer background routine of the program of the present invention.
Figure 10B:
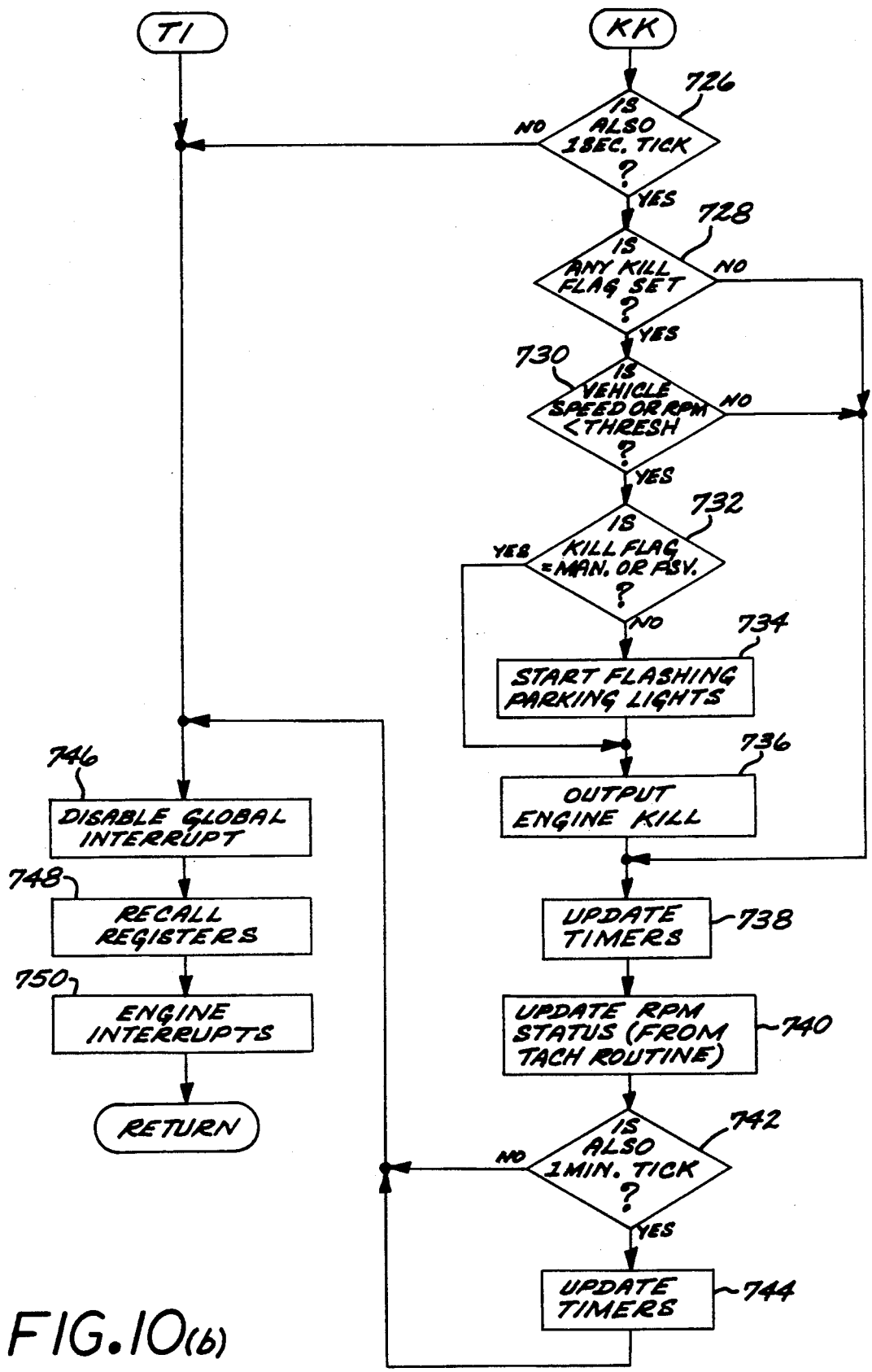

Now for the utility routines 120. The Periodic Timer routine 700 is shown in FIGS. 10(a) and 10(b). As mentioned above, the Periodic Timer routine 700 periodically interrupts the execution of the high level routines and performs miscellaneous housekeeping functions. These functions are called by numerous subroutines and provide for a check of the status of the (optional) security system (13), the status of the call-in-progress interface 28 (712), the programming of a pager (713), processing of tracking data (725), the execution of telephone and speech synthesizer service subroutines (723 and 727), and updates of general input/output status (702, 704, 706, 708, 710, 715, 719, 721). The subroutines called by the Periodic Timer routine 700 are shown in FIGS. 10(c)–10(m).

Figures 10C, 10D:
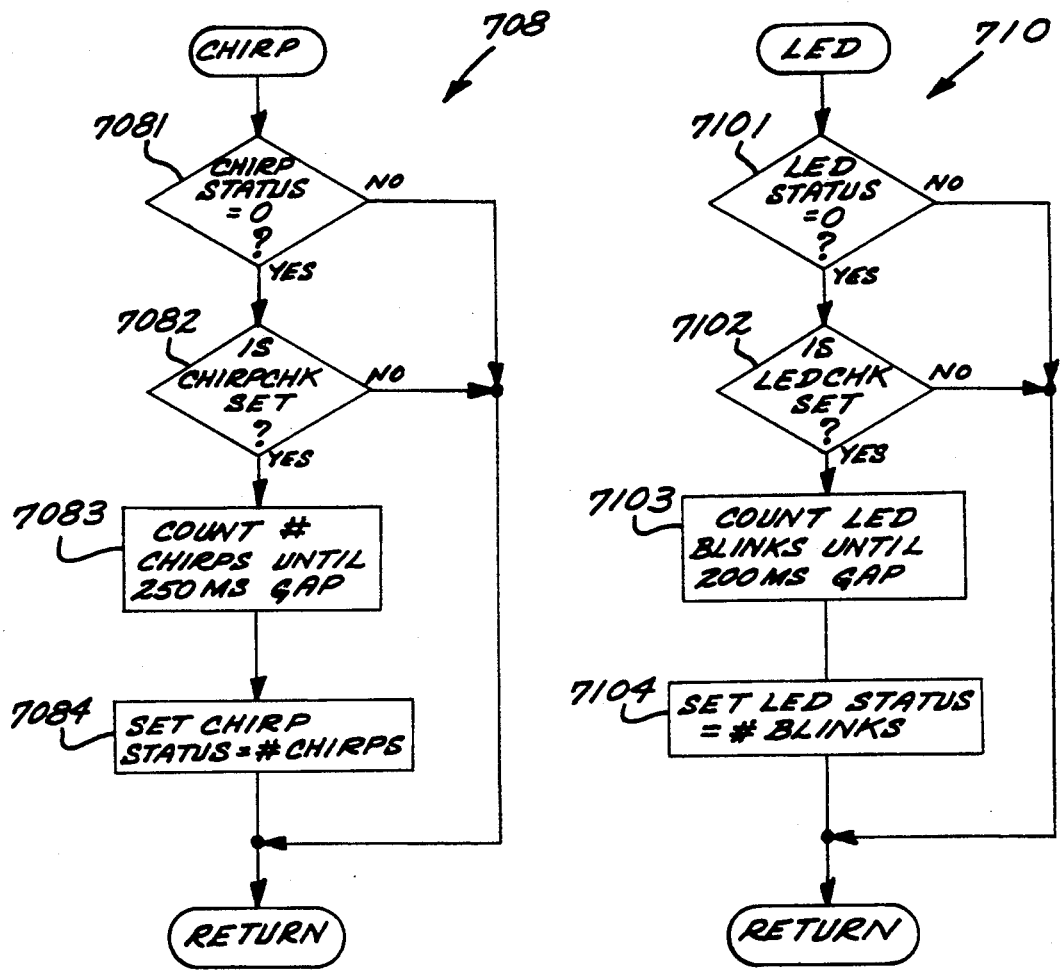
FIGS. 10(c) through 10(m) are flow diagrams of the subroutines called by the Periodic Timer background routine of the program of the present invention.

FIG. 10(c) illustrates the steps for updating the chirp status variable which indicates the number of audible chirps generated by the security system via the siren signal. Similarly, FIG. 10(d) illustrates the subroutine for updating the security system LED status variable to indicate the number of LED blinks. The number of blanks and chirp provide status and diagnostic information regarding the security system.

Figure 10E:
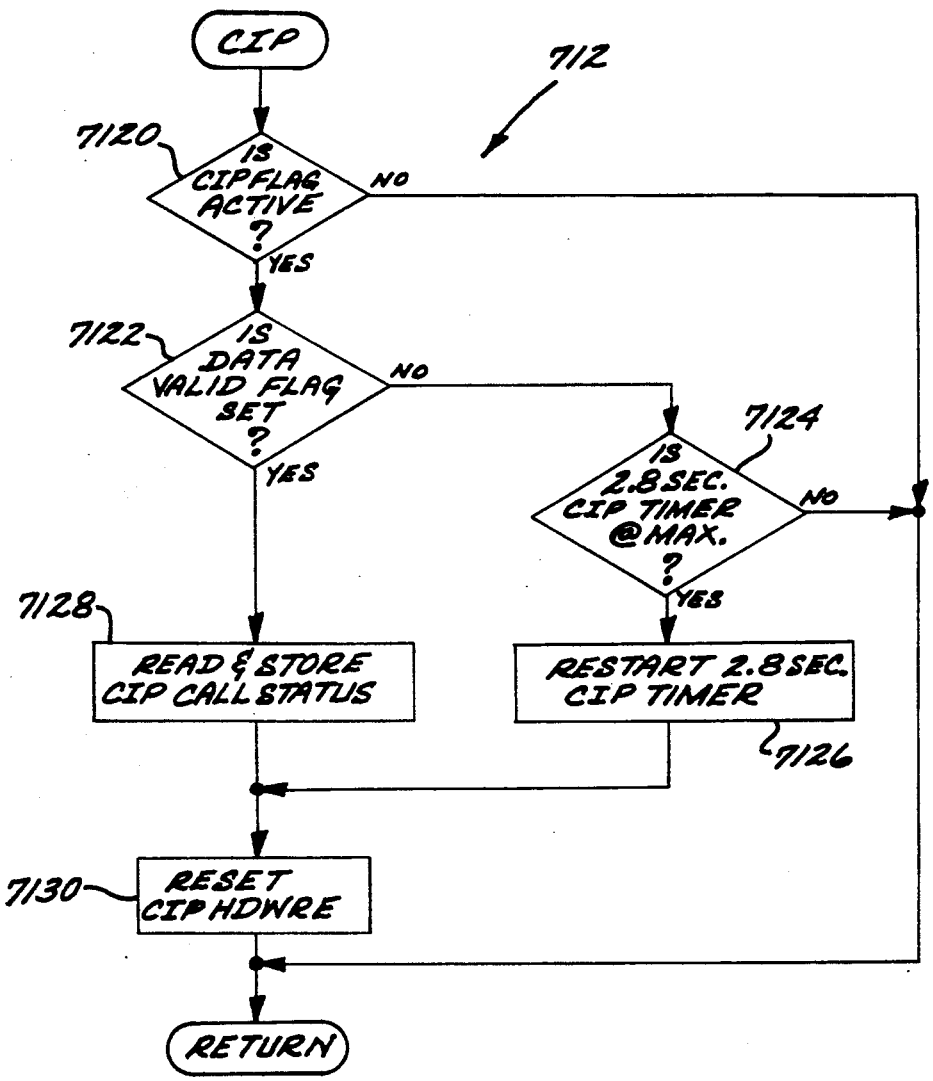

FIG. 10(e) shows the CIP subroutine for reading and storing the status of the call-in-progress interface 28.

Figure 10F:
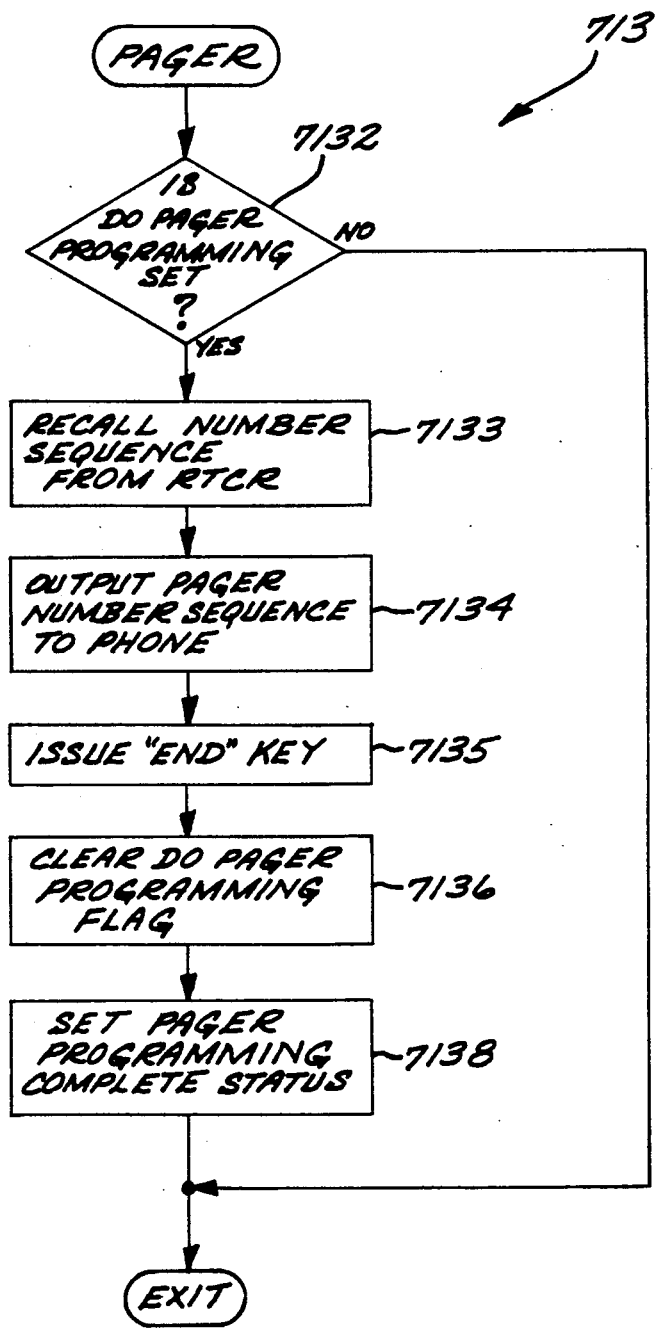

FIG. 10(f) shows the pager subroutine 713 which is called when an outgoing call placed by the system 10 is answered by a pager system. If the flag DO PAGER PROGRAMMING is set (7132), the pager number sequence is recalled from memory (7133), and the number sequence is sent to the cellular telephone (7134). An "end" key signal is issued (7135) to terminate the call. The flag DO PAGER PROGRAMMING is cleared (7136), and the flag PAGER PROGRAMMING is set (7138).

Figure 10G:
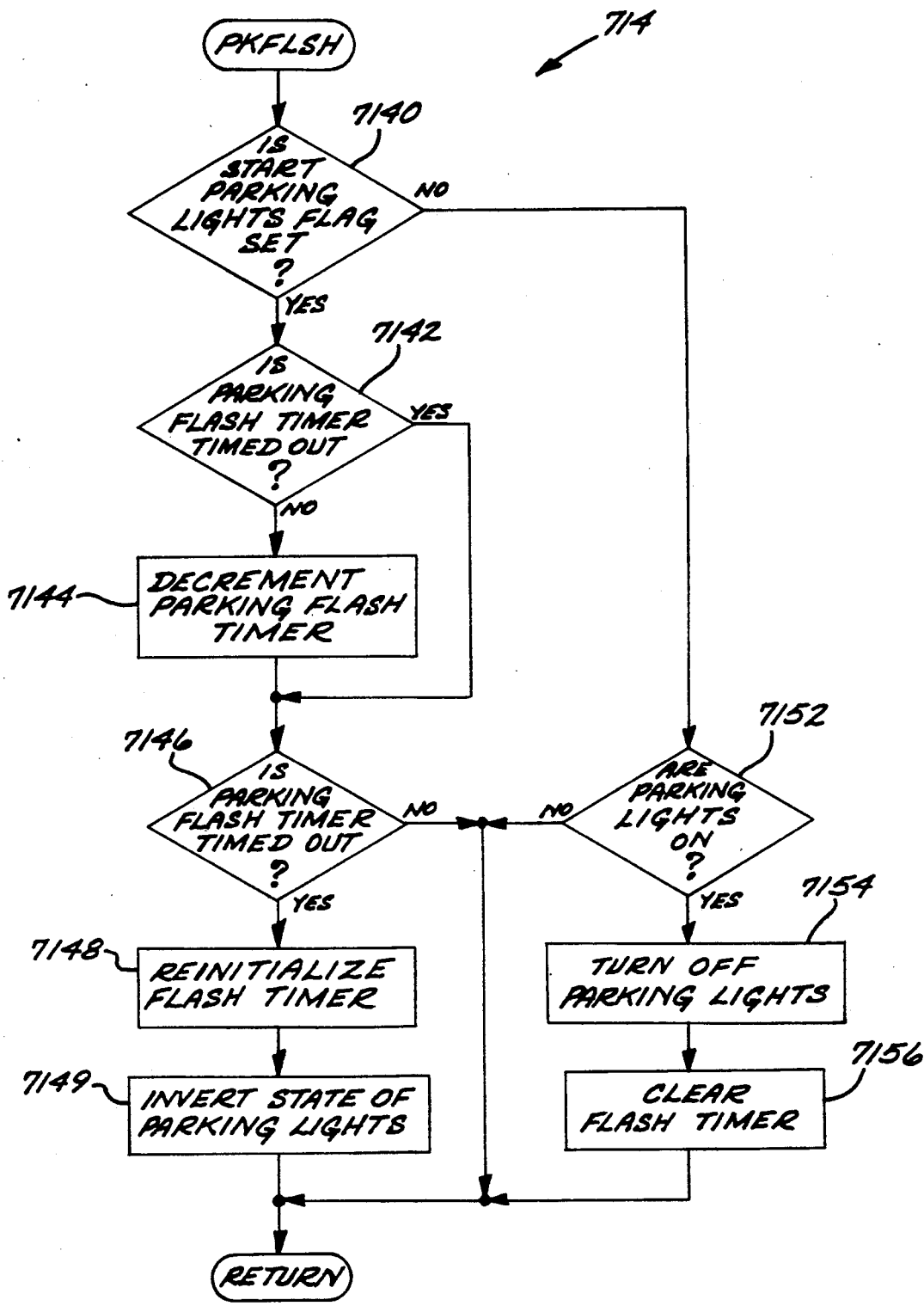

FIG. 10(g) shows the PKFLSH subroutine for flashing the vehicle parking lights when the security system is tripped.

Figure 10H:
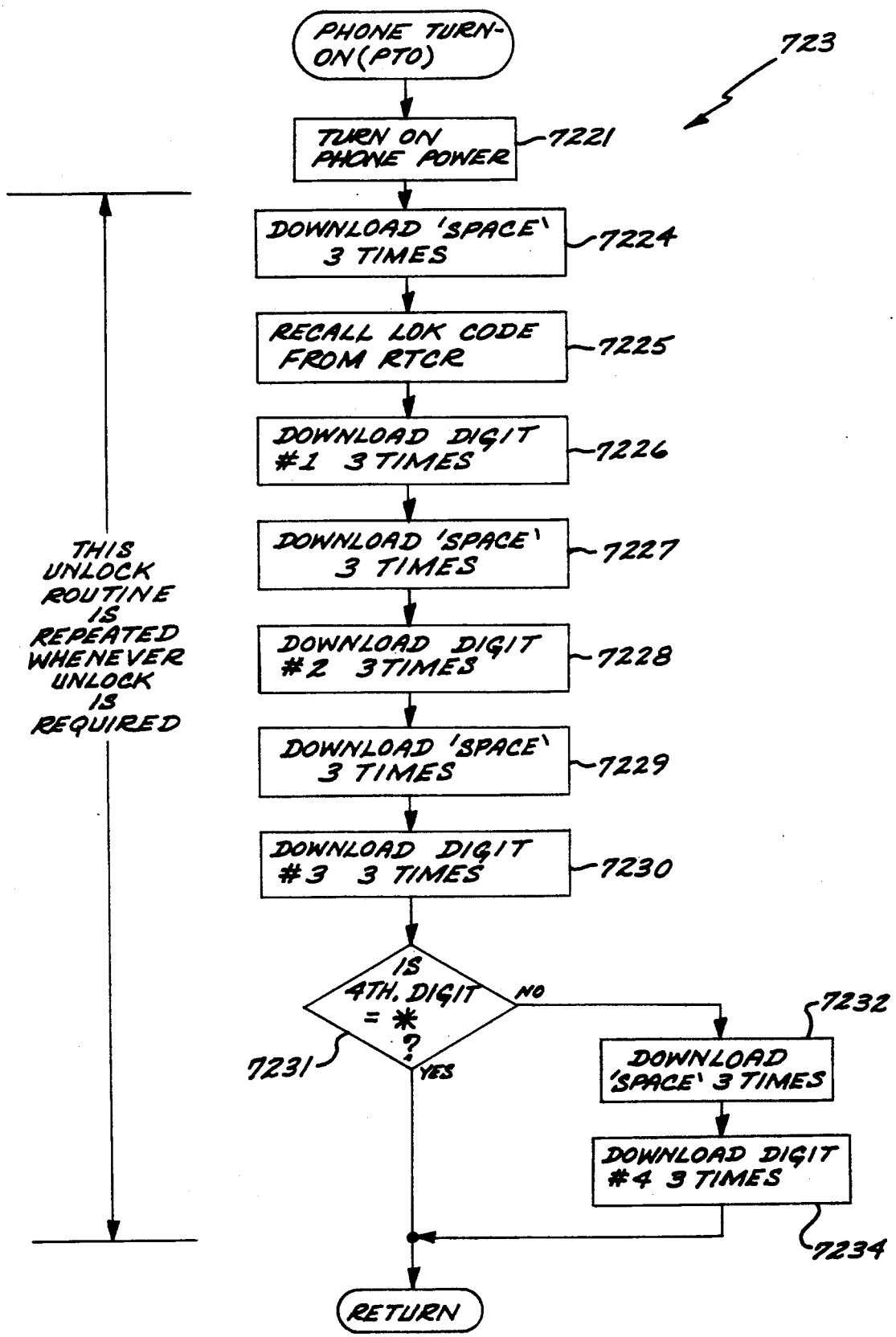

FIG. 10(h) shows the PHONE TURN-ON subroutine for unlocking and turning on the telephone whenever appropriate.

Figure 10I:
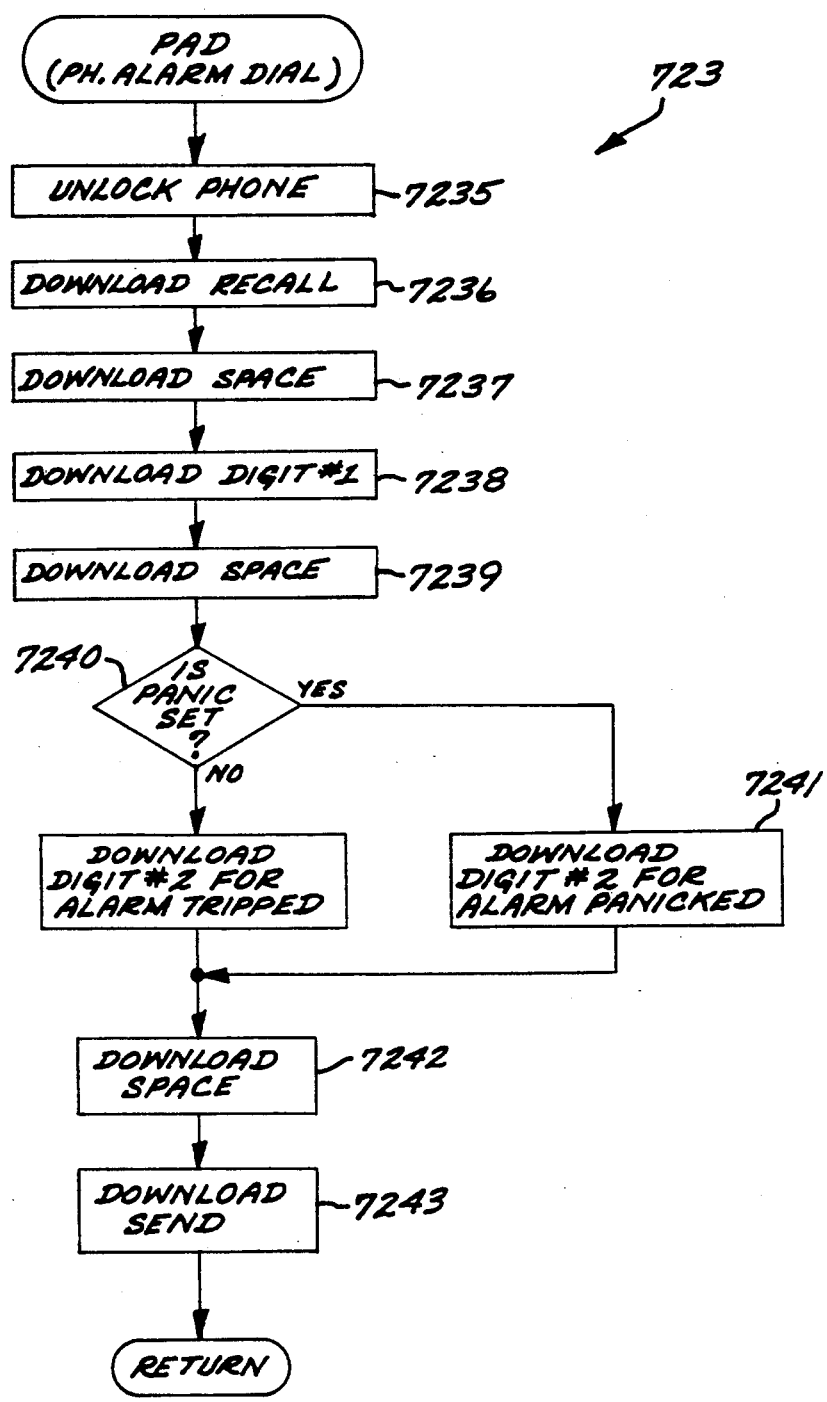

FIG. 10(i) shows the PAD subroutine or "phone alarm dial."

Figure 10J:
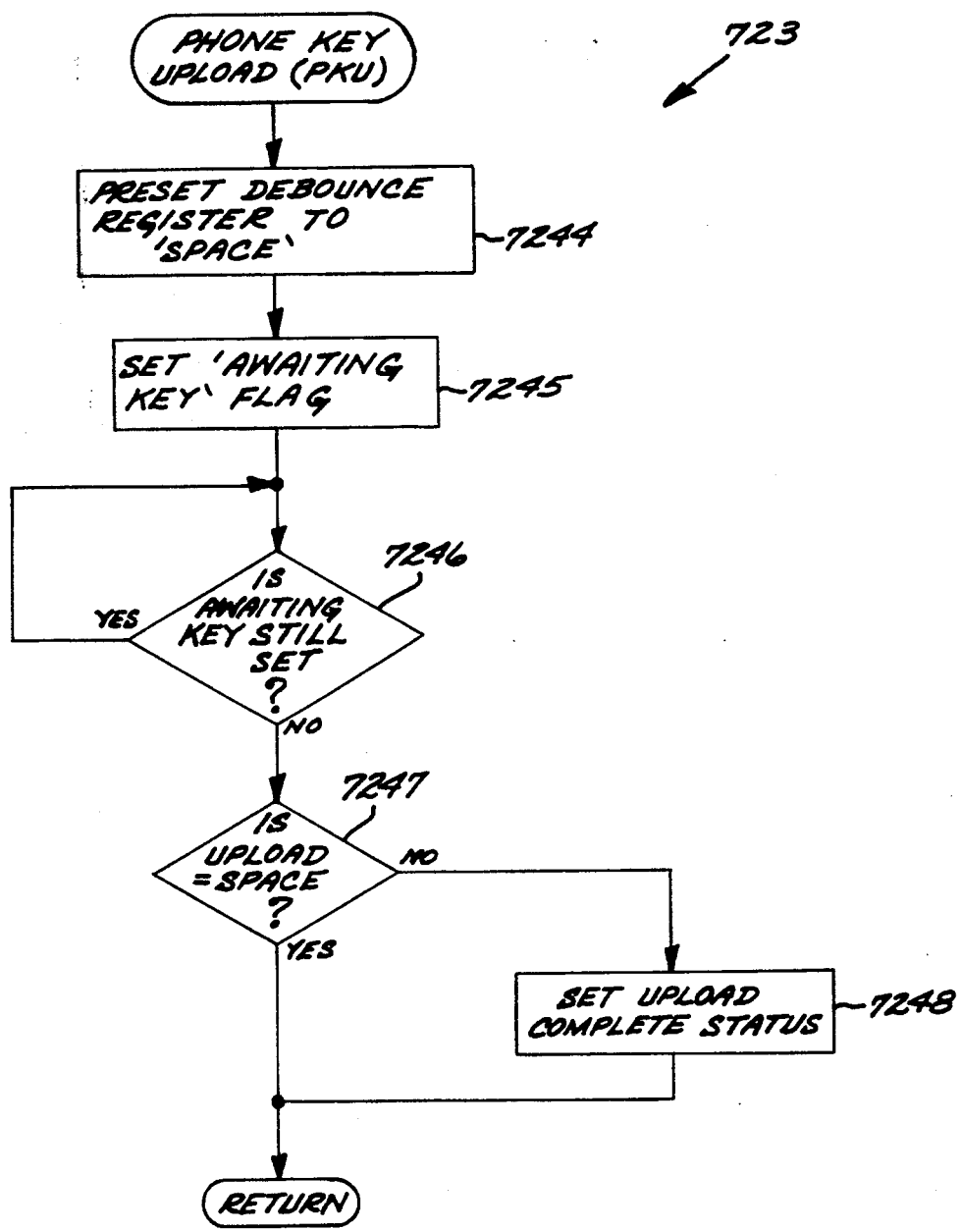

FIG. 10(j) shows the PHONE KEY UPLOAD subroutine which reads the status of the keys on the telephone keypad.

Figures 10K, 10L:
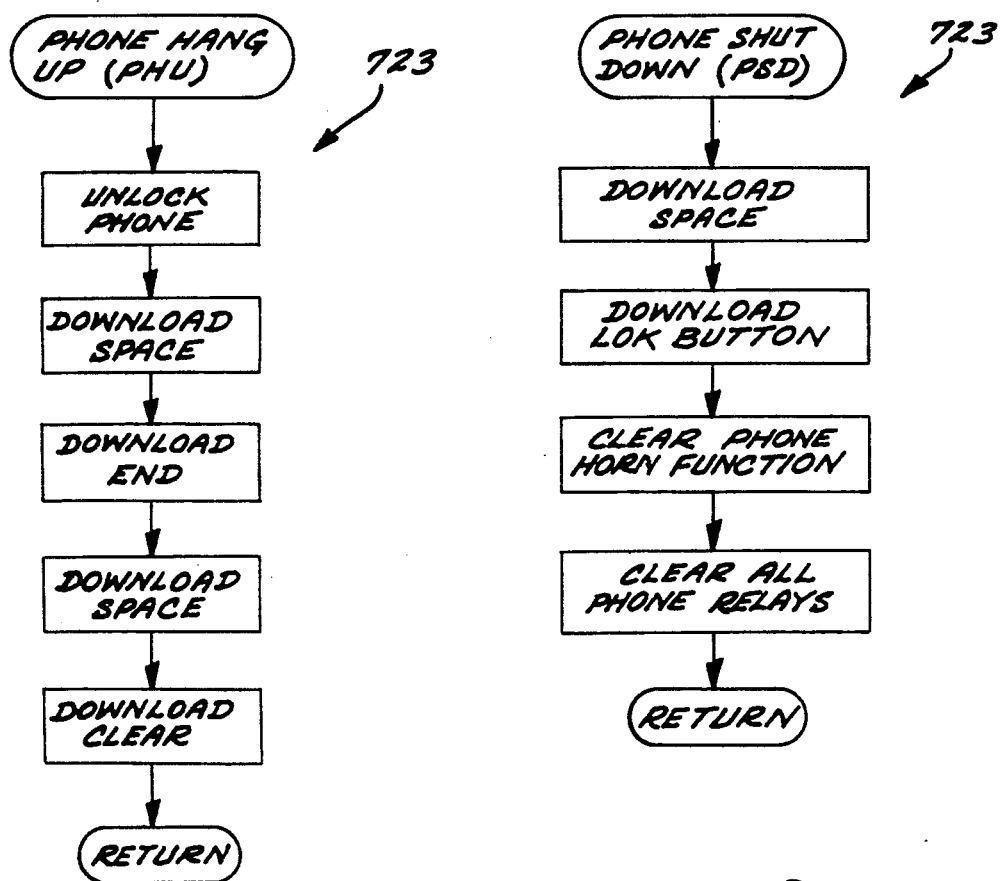

FIG. 10(k) shows the PHONE HANG-UP subroutine which performs necessary steps to electronically hang up the telephone.

FIG. 10(l) shows the PHONE SHUT DOWN routine turning off the telephone.

Figure 10M:
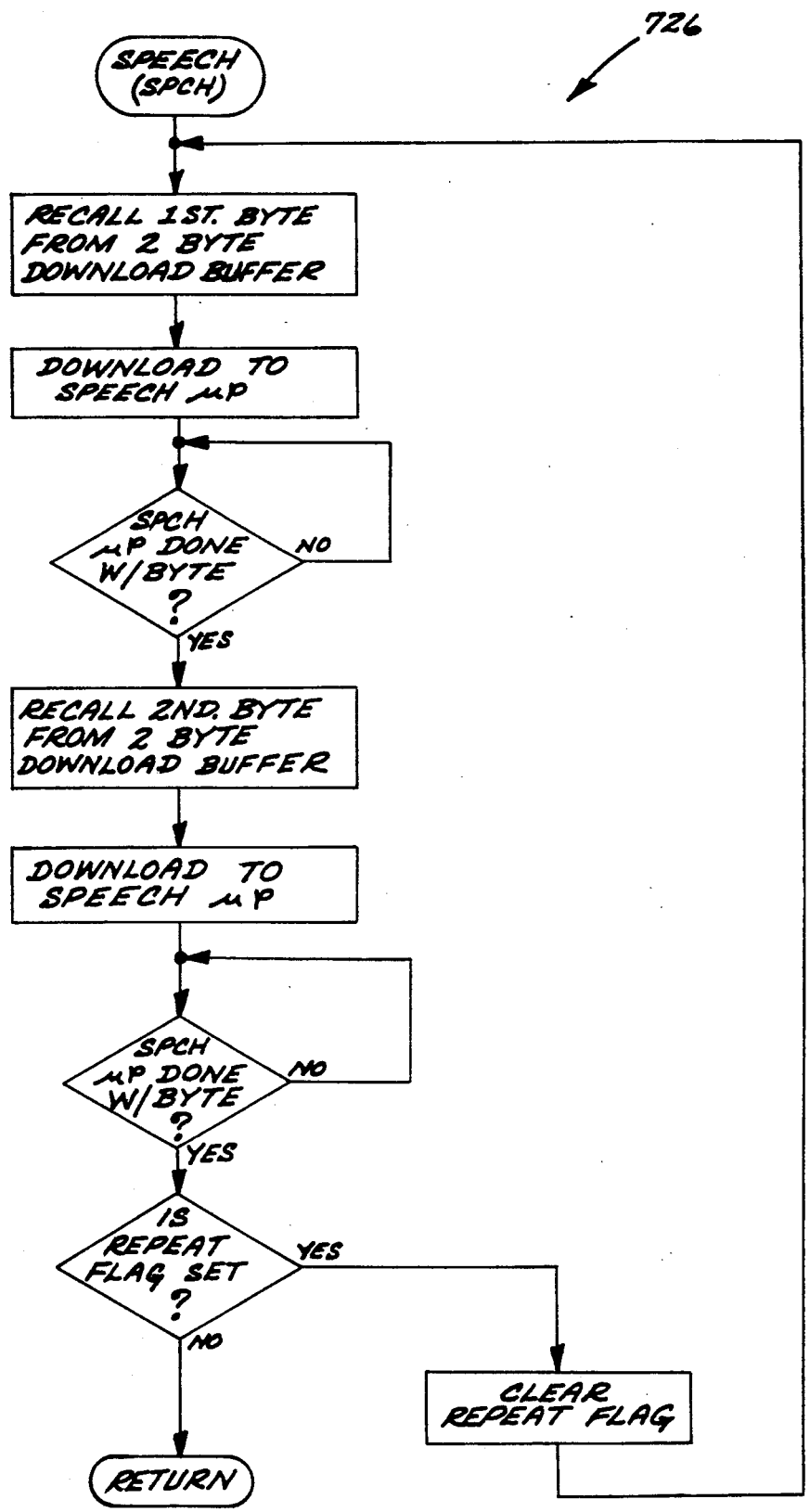
Figure 10N:
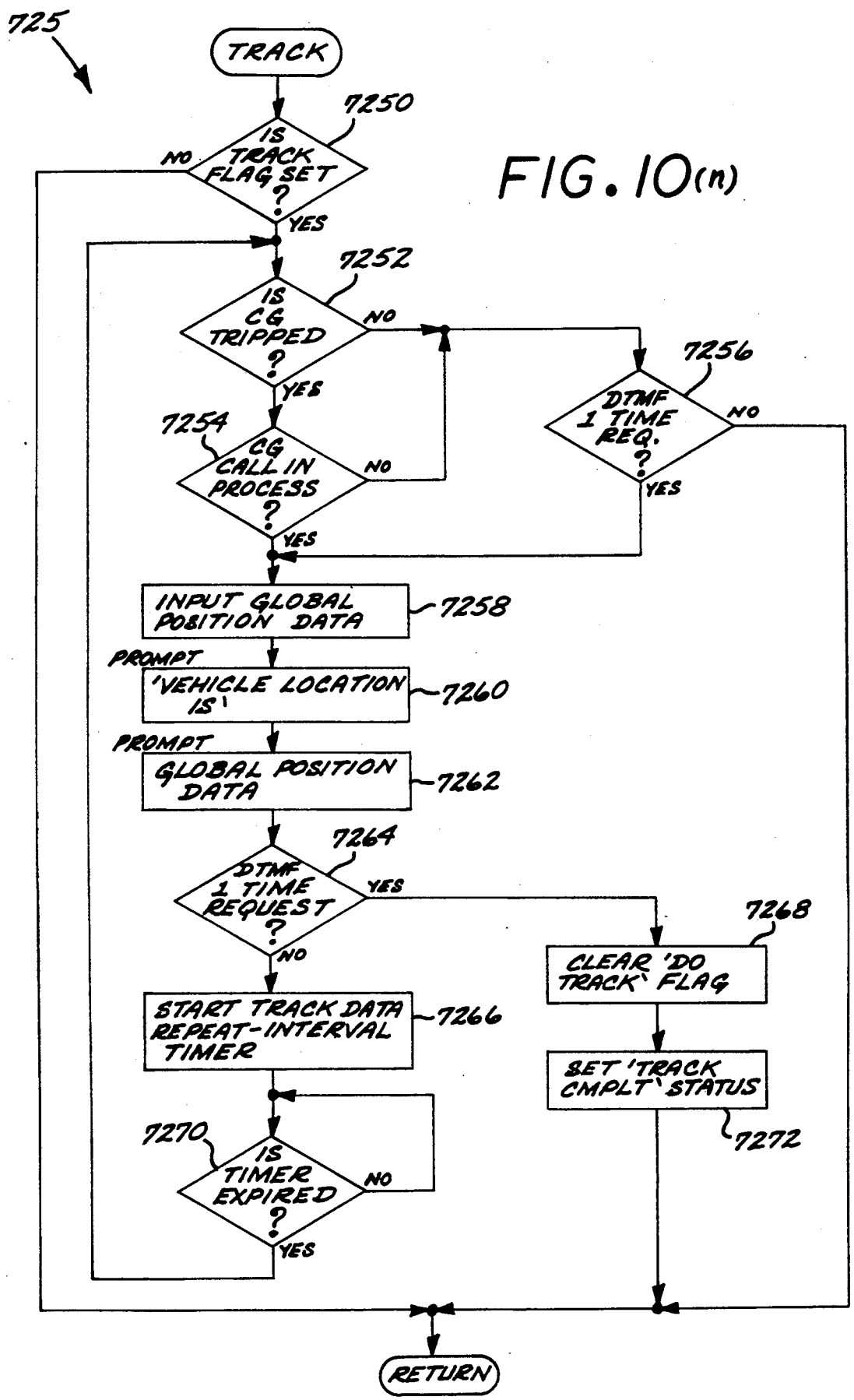
FIG. 10(n) is a flow diagram of the tracking background routine of the program of the present invention.

FIG. 10(m) shows the SPEECH subroutine for controlling the speed synthesizer to generate the voice messages employed to communicate with the user and vehicle occupants.

FIG. 10((n) shows the TRACK subroutine which is the tracking data routine. If the flag TRACK is set (7250), and the interface system has been tripped (7252, indicating an intrusion, then once an outgoing call is in progress (7254) to the predetermined telephone number, global position data is entered from the external tracking inputs (7258), a prompt is issued, for example, "vehicle location is . . . ," and then the prompt ". . . [position data] . . . " is issued (7262). This output may be in the form of speech, DTMF signals, modem codes or other format. Then, if the request for tracking data was a one-time request (7264), the flag DO TRACK is cleared (7268) and the status of the "track complt" variable is set (7272) before operation returns. If the request was not a one-time request, the track data repeat-interval timer is stated (7266), and a wait loop (7270) is entered before operation returns to 7252.

Figures 11, 12:
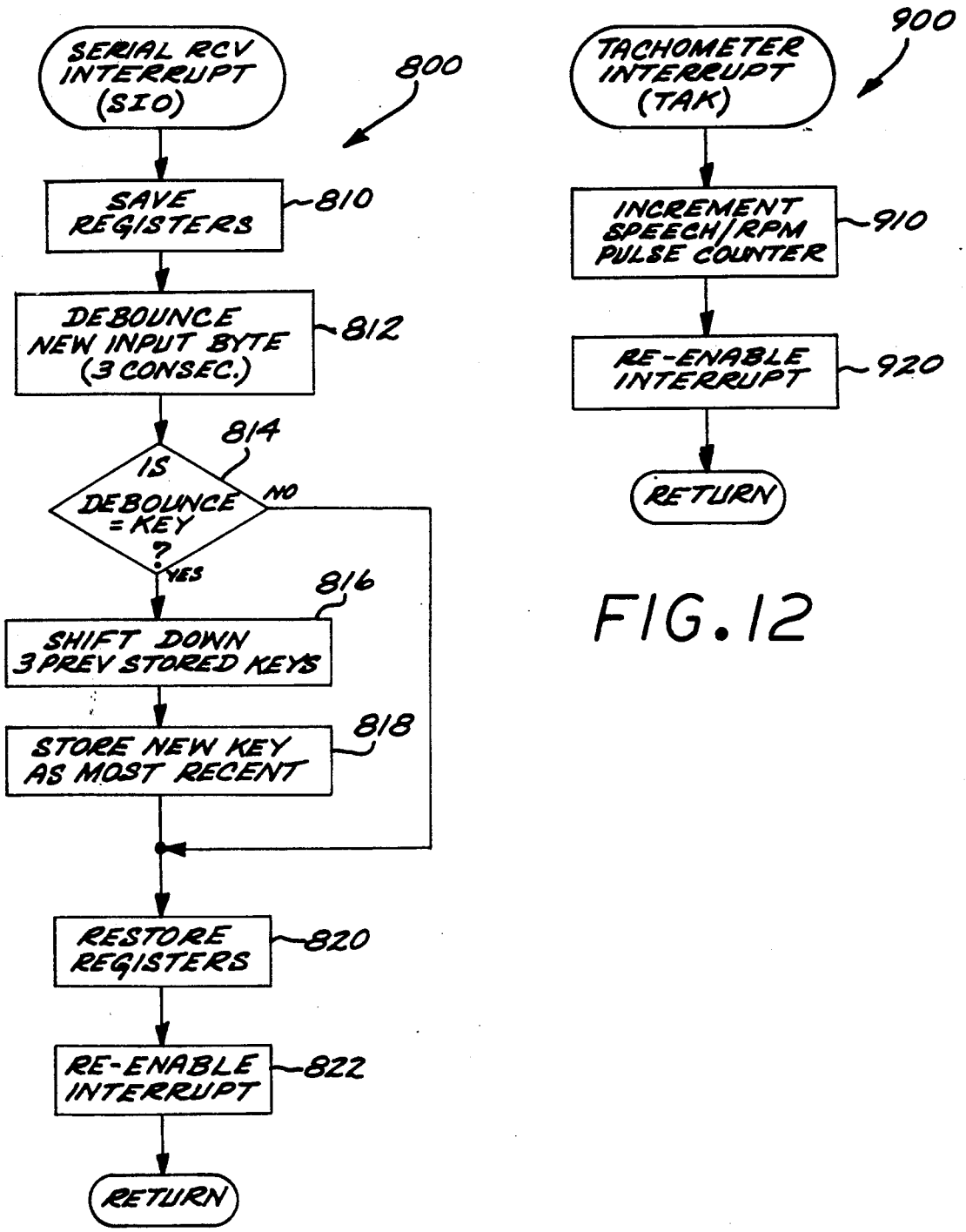
FIG. 11 is a flow diagram of the Serial Telephone Receiver Buffer background routine of the program of the present invention.
FIG. 12 is a flow diagram of the Tachometer background routine of the program of the present invention.

The serial interrupt and tachometer routines 800 and 900 are shown in FIGS. 11 and 12, respectively. These routines provide for interrupts to the foreground routines from the keypad of the handset 14 and the vehicle tachometer or other RPM (or speed)-indicating device (not shown).

The program 100 of the present invention has a modular structure within which the executive routines 110 call selected input/output modules as required to perform an operation. For example, to place a call, the following modules (among others) are called: Turn-on 224, Unlock 618, Dial 628, Hang-up 250, and Horn Alert 310. Within each input/output module (e.g., Turn-on), the telephone type is checked in the library and the sub-module containing the protocols from the translation table specific to that telephone type is used. Each input/output module contains a series of commands representing either key depressions or telephone responses (to key depressions). For each request to send a key, or receive a key, a subroutine call is made to the telephone key-code library to fetch the appropriate hex code (representing a key depression or release).

At the entry to the telephone library, the telephone type is used to vector to the appropriate telephone key-code translation table. Each translation table consists of a list of possible telephone keys and their corresponding on/off codes. Table I below provides an exemplary key-on table for a cellular telephone. The key-off code may either be the same code for all keys (also shown below for 'key release') or may be derived by adding to, subtracting from, or otherwise processing the 'key-on' code.

TABLE I

| : MODEL SERIES XX PHONES |
| --- |
| PH1KEY: MVI L, 0ECH ;KEYPAD 'SPACE' CODE |
| MVI L, 0BDH ;KEYPAD 0 CODE |
| MVI L, 08DH ;KEYPAD 1 CODE |
| MVI L, 0CDH ;KEYPAD 2 CODE |
| MVI L, 04DH ;KEYPAD 3 CODE |
| MVI L, 0EDH ;KEYPAD 4 CODE |
| MVI L, 06DH ;KEYPAD 5 CODE |
| MVI L, 0ADH ;KEYPAD 6 CODE |

TABLE I-continued

| : MODEL SERIES XX PHONES |
| --- |
| MVI L, 02DH ;KEYPAD 7 CODE |
| MVI L, 0FDH ;KEYPAD 8 CODE |
| MVI L, 07DH ;KEYPAD 9 CODE |
| MVI L, 0DDH ;KEYPAD # CODE |
| MVI L, 03DH ;KEYPAD * CODE |
| MVI L, 01DH ;KEYPAD LOK CODE |
| MVI L, 09DH ;KEYPAD END CODE |
| MVI L, 086H ;KEYPAD CLR CODE |
| MVI L, 0A6H ;KEYPAD FCN CODE |
| MVI L, 0A6H ;KEYPAD RCL CODE |
| MVI L, 05DH ;KEYPAD SEND CODE |
| MVI L, 0C6H ;KEYPAD STORE CODE |
| MVI L, 0E9H ;KEYPAD RELEASE CODE |
| MVI L, 026H ;KEYPAD ONHOOK |
| MVI L, 0F6H ;KEYPAD OFFHOOK |
| POP V ;RETRIEVE ACC |
| RET ; |

Thus, a series of tables such as Table I are provided which contain a data segment that can be called from anywhere in the program. A set of variables is used to select the appropriate table for a given telephone type and selected key code within a given table. That is, the selected telephone type sets one variable, e.g., "x," which selects the appropriate table and the software sets a second variable, e.g., "y," to a place in the table to acquire the appropriate code corresponding to a given key for the selected telephone type. Thus, the complete variable expression might take the form x,y. The variables are passed by a suitable routine (not shown). Those skilled in the art will recognize that the table is essentially an assembly language program with the telephone-specific table from which the appropriate key code hex value is returned to the calling subroutine with nonselected codes acting as no-ops. Note that actual cellular key codes are proprietary to the particular manufacturer; this table is representative of a typical table but any correspondence to an actual cellular telephone is purely coincidental.

The tables are stored in a nonvolatile memory such as PROM 40. In order to update the system 10 with new protocol tables, so that the system will interface with protocols defined after the system is installed, the nonvolatile memory can be changed to a memory in which the new protocol tables have been added.

Operation

The operation of the system 10 of the present invention is essentially set forth in the flow diagrams shown and discussed above. However, exemplary functions which may be performed by the invention are set forth below to illustrate particularly advantageous aspects thereof.

The system may be set to receive incoming calls up to a predetermined number of times per day at user programmable times while the host vehicle is unattended. This allows the user to remotely start and stop the engine, reprogram outgoing telephone numbers stored in the cellular telephone, output an external signal to an accessory of the user's choice, receive engine (off/running) status, request tracking data to identify the location of the vehicle, issue a command to disable the engine and communicate directly with any occupant of the vehicle (e.g., an intruder). See, e.g., FIGS. 6, 10(e), 10(h), 10(k), 10(l), 10(n) and 12.

The user can manually issue an engine disable command from the cellular telephone keypad 14 prior to leaving the vehicle. See, e.g., FIGS. 9(a), 9(b), 9(i) and 12.

If the security system has been tripped, the system 10 issues an immediate engine disable and makes an outgoing call to a user-designated telephone number. If the telephone call was not completed, the system 10 will try again to place the call. If the call is completed, tracking data (vehicular position) will be periodically output, and the receiving party (user) may communicate with any vehicle occupant. If a pager number is called, upon receipt of the pager program tones, the system 10 will output a predesignated telephone number (previously stored in program mode) and then terminate the call. Thereafter, whenever the ignition is on, the system turns on the telephone system 12 and checks for an incoming call from the user so that the user may communicate with the intruder. See, e.g., FIGS. 4(c), 4(d), 7, 8(a)-8(e), 10(c)-10(e), 10(f), 10(g)-10(i), 10(k)-10(n) and 12.

The system 10 may be programmed to passively kill the engine after an exit delay (triggered by ignition off and door open) has expired. The user can program his entry delay, during which, if the ignition is turned on, the engine disable is cleared; if the delay expires, the disable must be removed by the user with a LOCK security code. See, e.g., FIGS. 4(c), 4(f), 4(g), 5, 5(b), 7, 9(a), 9(h), 9(i), 10(j).

The system 10 detects a Panic state and immediately places a call to a user-designated number. It repeatedly verbalizes a programmed statement until stopped by the user when he or she is ready to speak. See, e.g., FIGS. 8(a)-8(e).

On detection of either panicked or tripped security system status, the vehicle hazard lights are activated and continue to flash until the disable command is cleared. See, e.g., FIG. 10(g).

The system 10 communicates with the user by verbally identifying itself both in the vehicle and over the telephone, acknowledging remote cellular telephone commands, prompting the user through programming steps, if the engine is disabled, notifying the user upon entry to the vehicle, to clear the engine disable, and when used with security systems having LED diagnostics, verbalizing security system status. See, e.g., FIGS. 2(b), 4(a), 4(b), 10(a), 10(b) 10(m) and 11.

The system 10 provides cellular telephone auto-shut-off when the user is finished with a user-placed call, minimizing telephone charges in case the call was not terminated by the user properly. See, e.g., FIGS. 4(e), 10(e), 10(k), 10(l).

The design of the present system provides a powerful versatile system which allows for the provision of numerous feature including an ability to expand and update the system's library with a protocol of new types of models of cellular telephones. The system further includes means for starting the vehicle engine and verifying the engine's status from any direct dial telephone anywhere in the world. As discussed above, another feature enables the vehicle's owner to telephone the vehicle once it has been discovered that the vehicle has been stolen and stop the engine. (See, e.g., FIGS. 4(c), 6, 10(e), 10(g), 10(h), 10(k), 10(l), 10(n) and 12.) If the vehicle is being driven while the command to stop the engine is received, the command will be registered. However, the execution of the command will take place only when the engine's RPM or vehicle speed is below a preset level, at which point the engine will be disabled and the lights will flash. The system further includes means to electronically lock the telephone keypad preventing an intruder from interrupting or terminating any incoming or outgoing command or calls. (See, e.g., FIG. 5(b).

Another feature allows the owner to listen in or have a two-way voice communication with an intruder, even through the telephone's handset is resting in its cradle. (See, e.g., FIGS. 8(a)-8(e) and 10(i)). Another feature system from any direct dial telephone in the world and program into the system a telephone number at which the owner can be reached and notified in case of intrusion into the vehicle.

As mentioned above, another feature of the invention activates a navigation system when the alarm is triggered and repeatedly transmits at certain time intervals over the communication system the coordinates identifying the vehicle location. Also, the invention provides synthesized voice guiding and prompting for the operation and control of the system. Other features of the invention provide for programming through the cellular telephone keypad such features as entry delay, valet mode enabling, horn sounding and sound loudness control. (See, e.g., FIGS. 4(g), 5, 6, 7, 9(a)-9(l), 10(j) and 12).

All user-programmable features are accessed via the user's cellular telephone keypad; no obtrusive hardware need be visible in the passenger compartment. These and other features and advantages will become more apparent from the following description and claims.

Thus, the present invention has been described herein with reference to a particular embodiment for a particular application. Those having ordinary skill in the art and access to the present teachings will recognize additional modification, applications and embodiments within the scope thereof.

It is intended by the appended claims to cover any and all such applications, modifications and embodiments within the scope of the present invention.

What is claimed is:

1. An interfacing system installed in a vehicle for integrating a cellular communication system having an operating protocol with a vehicle security system, said interfacing system comprising:

a system controller;

first interfacing means for interfacing said cellular communication system to said system controller, said first means including:

first library means for storing a plurality of specific sets of data corresponding to the different protocols of a plurality of cellular communication systems;

initializing means for selecting an operating protocol for said interfacing system from said first library means which is compatible with the protocol of said cellular communication system; and a speech synthesizer for generating predetermined voice messages;

second interfacing means for interfacing said security system to said controller; said means for communicating said voice messages to an occupant of the vehicle;

thereby enabling said security system to be compatible with a variety of cellular communication systems to permit communication between a user and the vehicle security system via said communication system.

2. An interfacing system installed in a vehicle for integrating a cellular telephone communication system having an operating protocol with a vehicle security system, said interfacing system comprising:
- a system controller;
- first means for interfacing said cellular telephone system to said system controller, said first means including:
  - first library means for storing a plurality of specific sets of data corresponding to the different protocols of a plurality of cellular telephone systems;
  - initializing means for selecting an operating protocol for said interfacing system from said first library means which is compatible with the protocol of said cellular telephone system;
- second means for interfacing said security system to said controller;
- said system controller comprising a digital computer means for executing a computer program and a first memory means for storing a program for execution by said controller, and wherein said program includes a state control module for executing any of a plurality of foreground routines thereby controlling the operating mode of said system for integrating said cellular telephone system with said vehicle security system, said program including a foreground routine for allowing said system for integrating said cellular telephone system with said vehicle security system to be programmed through said cellular telephone system, said program further including a foreground routine for allowing said system for integrating said cellular telephone system with said vehicle security system to place an outgoing telephone call through said cellular telephone; and
- means for remotely changing the outgoing call number;
- thereby enabling said security system to be compatible with a variety of cellular telephone systems to permit a communication between a user and the vehicle security system via said cellular telephone system.

3. An interfacing system installed in a vehicle for integrating a cellular communication system with a vehicle security system which is tripped when an alarm condition is detected, said interfacing system comprising:
- a system controller comprising means for storing at least one outgoing telephone call number;
- first interfacing means for interfacing said cellular communication system to said system controller;
- second interfacing means for interfacing said security system to said system controller;
- means for interfacing a pager system to said controller; and
- means for remotely changing the outgoing telephone call number; and
- wherein said controller further comprises means for causing an outgoing telephone call to a stored outgoing call number to be placed in the event the vehicle security system is tripped.

4. An interfacing system installed in a vehicle for integrating a cellular telephone communication system having an operating protocol with a vehicle security system, said interfacing system comprising:
- a system controller monitoring the armed status of said vehicle security system and programmable during an interfacing system programming mode to program one or more features;
- first interfacing means for interfacing said cellular telephone system to said system controller, said first means including:
  - first library means for storing a plurality of specific translation tables corresponding to the different protocols of a plurality of cellular telephone systems;
  - initializing means for selecting an operating protocol for said interfacing system from said first library means which is compatible with the protocol of said cellular telephone system;
- second means for interfacing said security system to said controller; and
- means for preventing a user from programming any features while the security system is in the armed state;
- thereby enabling said security system to be compatible with a variety of cellular telephone systems to permit communication between a user and the vehicle security system via said communication system.

5. An interfacing system installed in a vehicle for integrating a cellular telephone communication system with a vehicle security system, said interfacing system comprising:
- a system controller;
- first means for interfacing said cellular telephone system to said system controller;
- second means for interfacing said security system to said controller;
- said system controller comprising a digital computer means for executing a computer program and a first memory means for storing a program for execution by said controller, and wherein said program includes a state control module for executing any of a plurality of foreground routines thereby controlling the operating mode of said system for integrating said cellular telephone system with said vehicle security system, said program including a foreground routine for allowing said system for integrating said cellular telephone system with said vehicle security system to be programmed through said cellular telephone system, said program further including a foreground routine for allowing said system for integrating said cellular telephone system with said vehicle security system to place an outgoing telephone call through said cellular telephone; and
- means for remotely changing the outgoing call number.

6. An interfacing system installed in a vehicle for integrating a cellular telephone communication system with a vehicle security system, said interfacing system comprising:
- a system controller;
- first interfacing means for interfacing said cellular telephone system to said system controller;
- second interfacing means for interfacing said security system to said controller; and
- means for preventing an intruder in said vehicle from interrupting or terminating any incoming or outgoing telephone call over said cellular system.

7. An interfacing system installed in a vehicle for integrating a cellular telephone communication system with a vehicle security system, said interfacing system comprising:
- a system controller monitoring the armed status of said vehicle security system and programmable during an interfacing system programming mode to program one or more features;

first interfacing means for interfacing said cellular telephone system to said system controller;

second means for interfacing said security system to said controller; and means for preventing a user from programming any features while the security system is in the armed state.

8. An interfacing system installed in a vehicle for integrating a cellular telephone communication system having an operating protocol with a vehicle security system, the security system characterized by one or more security functions, said interfacing system comprising:

a system controller;

first interfacing means for interfacing said cellular telephone system to said system controller, said first means including:

first library means for storing a plurality of specific translation tables corresponding to the different protocols of a plurality of cellular telephone systems; and initializing means for selecting an operating protocol for said interfacing system from said first library means which is compatible with the protocol of said cellular telephone system, comprising means for selecting said operating protocol from the keypad of said cellular telephone, said selecting means comprising means activated during a telephone initialization mode for recognizing predetermined sequences of tones generated by user-actuation of said keypad to identify the particular cellular telephone type and select a corresponding operating protocol; and wherein said controller comprises means permitting a message regarding the security system status to be sent via said cellular communication system to a remote communication destination, means permitting messages to be received via said cellular communication system, and means for acting on said received messages to control one or more predetermined security system functions in dependence on the particular received message;

thereby enabling said security system to be compatible with a variety of cellular telephone systems to permit two-way communication between a user and the vehicle security system via said cellular telephone system.

9. An interfacing system installed in a vehicle for integrating a cellular telephone communication system having an operating protocol with a vehicle security system, the security system characterized by one or more security functions, said interfacing system characterized by a plurality of user-programmable features, and comprising:

a system controller comprising means for monitoring the armed/disarmed status of the security system;

first interfacing means for interfacing said cellular telephone system to said system controller, said first means including:

first library means for storing a plurality of specific translation tables corresponding to the different protocols of a plurality of cellular telephone systems; and initializing means for selecting an operating protocol for said interfacing system from said first library means which is compatible with the protocol of said cellular telephone system;

second interfacing means for interfacing said security system to said controller;

means for preventing the programming of said features via said cellular telephone while the security system is armed;

wherein said controller comprises means permitting a message regarding the security system status to be sent via said cellular communication system to a remote communication destination, means permitting messages to be received via said cellular communication system, and means for acting on said received messages to control one or more predetermined security system functions in dependence on the particular received message;

thereby enabling said security system to be compatible with a variety of cellular telephone systems to permit two-way communication between a suer and the vehicle security system via said cellular telephone system.

10. An interfacing system installed in a vehicle for integrating a cellular telephone communication system having an operating protocol with a vehicle security system, said interfacing system comprising:

a system controller which is programmable during an interfacing system programming mode to program one or more features;

first interfacing means for interfacing said cellular telephone system to said system controller, said first means including;

first library means for storing a plurality of specific translating tables corresponding to the different protocols of a plurality of cellular telephone systems;

initializing means for selecting an operating protocol for said interfacing system from said first library means which is compatible with the protocol of said cellular telephone system;

second interfacing means for interfacing said security system to said controller;

a speech synthesizer controlled by said system controller to generate a plurality of voice messages indicative of the status of said security system;

means for selectively disabling the operation of said vehicle;

means preventing the enabling of said program mode while the vehicle disabling means is activated;

wherein said controller comprises means permitting a message regarding the security system status to be sent via said cellular communication system to a remote communication destination, means permitting messages to be received via said cellular communication system, and means for acting on said received messages to control one or more predetermined security system functions in response to the particular received message;

thereby enabling said security system to be compatible with a variety of cellular telephone systems to permit communication between a user and the vehicle security system via said telephone system.

11. An interfacing system installed in a vehicle for integrating a cellular communication system comprising a cellular telephone having an operating protocol and a telephone keypad with a vehicle security system, the security system characterized by one or more security functions, said interfacing system comprising:

a system controller;

first interfacing means for interfacing said cellular communication system to said system controller, said first interfacing means including:
first library means for storing a plurality of specific sets of data corresponding to the different protocols of a plurality of cellular communication systems; and
initializing means for selecting an operating protocol for said interfacing system from said first library means which is compatible with the protocol of said cellular communication system, said initializing means includes a tone decoder connected between said telephone and said controller for decoding tones received from the telephone, and means activate during telephone initialization mode for recognizing predetermined sequences of tones generated by actuation of said keypad that identifies the particular telephone type and electronically selects a corresponding operating protocol; and
second interfacing means for interfacing said security system to said controller; and
wherein said controller comprises means permitting a message regarding the security system status to be sent via said cellular communication system to a remote communication destination, means permitting messages to be received via said cellular communication system, and means for acting on said received messages to control one or more predetermined security system functions in dependence on the particular received message;
thereby enabling said security system to be compatible with a variety of cellular communication systems to permit two-way communication between a user and the vehicle security system via said cellular communication system.

12. An interfacing system installed in a vehicle for integrating a cellular telephone system with a vehicle security system which is tripped when an alarm condition is detected, said interfacing system comprising:
a system controller;
first means for interfacing said cellular communication system to said controller;
second means for interfacing said security system to said system controller; and
means for interfacing a pager system to said controller via said cellular telephone system, said pager system characterized in that it is responsive to telephone tones received at a predetermined pager system telephone number; and
wherein said pager system interfacing means comprises means for placing an outgoing call via said cellular telephone system to said pager telephone number, means for detecting an answering by said pager system at said telephone number, and means for generating a predetermined sequence of tones after detecting said answering for transmission over said cellular telephone to said pager system; and
wherein said controller further comprise means for causing an outgoing telephone call to be placed to said pager system telephone number and said sequence of tones to be generated in the event the vehicle security system is tripped.

13. The system of claim 12 further comprising means responsive to the tripping of said security system and the ignition switch of said vehicle being in the "on" position, and once said outgoing call to said pager telephone has been completed, to turn on said cellular telephone system and check for an incoming call so that a remote user may communicate with persons inside said vehicle.

14. An interfacing system installed in a vehicle for integrating a cellular telephone communication system having an operating protocol with a vehicle positioning system, said interfacing system comprising:
a system controller;
first interfacing means for interfacing said cellular communication system to said system controller;
second interfacing means for interfacing said vehicle positioning system to said system controller to provide the capability of remotely communicating vehicle position indicating signals via said cellular communication system, said signals comprising voice-synthesized messages which describe the current location of the vehicle; and
wherein said controller is responsive to commands received via said cellular telephone system to communicate said position indicating signals via said cellular telephone system.

15. The invention of claim 14 wherein said controller comprises means for storing a telephone number, and wherein said controller comprises means for calling a stored telephone number in response to said position interrogation commands to communicate said position indicating signals.

16. An interfacing system installed in a vehicle for integrating a cellular telephone communication system having an operating protocol with a vehicle security system, the security system characterized by one or more security functions, said interfacing system comprising:
a system controller;
first interfacing means to interfacing said cellular telephone system to said system controller, said first means including;
first library means for storing a plurality of specific translation tables corresponding to the different protocols of a plurality of cellular telephone systems, and
initializing means for selecting an operating protocol for said interfacing system from said first library means which is compatible with the protocol of said cellular telephone system, said initializing means comprising means responsive to data entered via the cellular telephone by the user which defines the particular cellular telephone system;
second interfacing means for interfacing said security system to said controller; and
wherein said controller comprises means permitting a message regarding the security system status to be sent via said cellular communication system to a remote communication destination, means permitting messages to be received via said cellular communication system, and means for acting on said received messages to control one or more predetermined security system functions in dependence on the particular received message;
thereby enabling said security system to be compatible with a variety of cellular telephone systems to permit two-way communication between a user and the vehicle security system via said cellular telephone system.

17. The invention of claim 16 wherein said initializing means includes tone decoder for decoding tones generated by said cellular telephone system and generating decoder output signals indicative of the particular tone, and wherein said unique cellular telephone system defining data comprises predetermined sequences of said decoder output signals, whereby a user may enter the particular data sequence during an initializing mode which identifies to the controller the particular unique table corresponding to the user's particular cellular telephone.

18. An interfacing system installed in a vehicle for integrating a cellular communication system comprising a cellular telephone having an operating protocol with a vehicle security system, said interfacing system comprising:

a system controller;

first means for interfacing said cellular communication system to said system controller, said first means including;

first library means for storing a plurality of specific sets of data corresponding to the different protocols of a plurality of cellular communication systems;

data input means responsive to data input by the system user or installer to identify the particular type of cellular communication system installed in said vehicle, said data input means for providing a signal to the controller identifying said particular type of cellular communication system; and means responsive to said signal for selecting from said library means a particular one of said sets of data corresponding to the protocol for said identified type of cellular communication system;

second means for interfacing said security system to said controller;

said system controller comprising means for monitoring the armed status of said security system and the "system tripped" status of said security system, said controller further comprising means for making an outgoing call to a user-designated telephone number via said cellular telephone and providing a message indicating that the security system has been tripped.

19. The system of claim 18 wherein said means permitting two-way communication with said occupant is responsive to a voice-synthesized prompt from said interfacing system and communicated over said communication system to accept a command from a remote user authorizing said two-way communication.

20. The system of claim 18 wherein said means for making an outgoing call in the event said security system is tripped comprises means for detecting that the call was not completed, and trying again to make the call.

21. An interfacing system installed in a vehicle for integrating a cellular telephone communication system having an operating protocol with a vehicle security system, said interfacing system comprising:

a system controller;

first interfacing means for interfacing said cellular telephone system to said system controller, said first means including:

first library means for storing a plurality of specific sets of data corresponding to the different protocols of a plurality of cellular telephone systems;

initializing means for selecting an operating protocol for said interfacing system from said first library means which is compatible with the protocol of said cellular telephone system;

second interfacing means for interfacing said security system to said controller; and means for preventing an intruder in said vehicle from interrupting or terminating any incoming or outgoing telephone call over said cellular system;

thereby enabling said security system to be compatible with a variety of cellular telephone systems to permit communication between a user and the vehicle security system via said telephone system.

22. The invention of claim 21 wherein said preventing means comprises means for electronically locking the keypad of said telephone in the event said security system is tripped.

23. The invention of claim 21 wherein said security system is further characterized by a plurality of programmable features, and said interfacing system further comprises means for programming said features via said cellular telephone.

24. An interfacing system installed in a vehicle for integrating a cellular telephone system having an operating protocol with a security system and an automated vehicle position indication system, the position indication system characterized in that it does not rely on user input in normal use, comprising:

a system controller;

first means for interfacing said cellular telephone system to said system controller; and means for interfacing the security system to said interfacing system controller;

means for interfacing said vehicle positioning system to said system controller to provide the capability of communicating vehicle position indicating signals remotely to a user via said cellular telephone system, said signals comprising voice-synthesized messages which describe the current position of the vehicle; and wherein said controller further comprises means activated when the security system is tripped for communicating said position indicating signals via said cellular telephone.

25. The invention of claim 24 wherein said first means includes:

first library means for storing a plurality of unique translation tables corresponding to the protocols of a plurality of unique cellular communication systems; and initializing means for selecting an operating protocol for said interfacing system from said first library means which is compatible with the protocol of said cellular communication system.

26. The invention of claim 24 wherein said controller comprises means for storing a telephone number to be called in the event the security system is tripped, and wherein said communicating means comprises means for calling a stored telephone number in the event the security system is tripped to communicate said position indicating signals.

27. The invention of claim 24 wherein said controller further comprises means activated in response to position interrogation signals received via said cellular telephone for communicating said voice-synthesized message.

28. The invention of claim 24 wherein said voice-synthesized messages define coordinates of the vehicle position.

29. The system of claim 24 wherein said means activated when the security system is tripped for communicating said position indicating signals comprises means for placing an outgoing telephone call to a predetermined telephone number and periodically communicating messages describing the current location of said vehicle.

30. The system of claim 24 wherein said means activated when the security system is tripped for communicating said position indicating signals comprises means for placing an outgoing telephone call to a predetermined telephone number, and said system further comprises means for remotely changing the outgoing telephone number.

31. An interfacing system installed in a vehicle for integrating a cellular telephone communication system having an operating protocol with a vehicle security system, said interfacing system comprising:
 a system controller;
 first interfacing means for interfacing said cellular telephone system to said system controller, said first means including:
  first library means for storing a plurality of specific sets of data corresponding to the different protocols of a plurality of cellular telephone systems;
  initializing means for selecting an operating protocol for said interfacing system from said first library means which is compatible with the protocol of said cellular telephone system;
 second interfacing means for interfacing said security system to said controller; and
 means for receiving commands via said telephone from a remote user during predetermined time intervals to activate one or more predetermined functions;
 thereby enabling said security system to be compatible with a variety of cellular telephone systems to permit communication between a user and the vehicle security system via said cellular telephone system.

32. The invention of claim 31 wherein said functions include remote starting of the vehicle engine.

33. The invention of claim 31 wherein said functions include issuance of a command to disable the vehicle engine.

34. The invention of claim 31 wherein said functions include programming an outgoing telephone number, to be called by said interfacing system in the event the vehicle security system is tripped.

35. The invention of claim 31 wherein said functions include a command to communicate data to the user via said telephone indicative of the vehicle's position.

36. The system of claim 31 wherein said functions include the communication of engine status data via said cellular telephone system in response to engine status commands.

37. The system of claim 31 wherein said functions include communication with an occupant of the vehicle via said cellular telephone system.

38. An interfacing system installed in a vehicle for integrating a cellular communication system with a vehicle security system, said interfacing system comprising:
 a system controller;
 first interfacing means for interfacing said cellular communication system to said system controller, said first means including a speech synthesizer for generating predetermined voice messages;
 second interfacing means for interfacing said security system to said controller; and
 means for selectively communicating said voice messages to an occupant of the vehicle.

39. The system of claim 38 further characterized in that said voice messages comprise verbal statements describing said security system status under predetermined conditions.

40. The system of claim 38 further characterized in that said controller is programmable during an interfacing system programming mode to program one or more features, and wherein said voice messages prompt the user through programming steps.

41. The system of claim 38 further comprising means for selectively disabling the operating of the vehicle engine, and said voice messages comprise messages which notify the user upon entry to the vehicle to clear the engine displacement.

42. The system of claim 28 wherein said voice messages provide voice prompting for the operation and control of said interfacing system.

43. An interfacing system installed in a vehicle for integrating a cellular telephone system with a vehicle security system, the security system characterized by one or more security functions, said interfacing system comprising:
 a system controller;
 first interfacing means for interfacing said cellular telephone system to said system controller;
 second interfacing means for interfacing said security system to said controller; and
 third interfacing means for interfacing said controller to said vehicle to selectively interact with one or more operating systems of said vehicle;
 means activated by said controller for disabling the operation of the vehicle; and
 wherein said controller further comprises means permitting a message regarding the security system status to be sent via said cellular telephone system to a remote communication destination, means permitting messages to be received via said cellular telephone system, and means for acting on said received messages to control one or more predetermined security system functions in dependence on the particular received message, said function controlling means comprising means for activating said disabling means in response to a vehicle disable command received via said cellular telephone system.

44. The invention of claim 43 wherein said interfacing system further comprises means for providing a speed signal indicative of the engine speed of said vehicle engine or the speed of the vehicle, and said controller is responsive to said speed signal and said vehicle disable command to activate said vehicle disabling means after receipt of said command and at such time as the engine speed or the vehicle speed is at or below a predetermined threshold value.

45. The invention of claim 44 wherein said speed signal is an engine tachometer signal.

46. The invention of claim 43 wherein said controller further comprises means for placing an outgoing telephone call to a predetermined telephone number in response to tripping of said security system and communicating a message indicating that the security system has been tripped, and said activating means acts in response to disable commands received as a result of said message that the security system has been tripped.

47. The invention of claim 46 wherein said vehicle is characterized by an ignition switch, and said interfacing means further comprises means activated in response to said tripping of said security system for activating said telephone system and placing it in condition to receive incoming telephone calls whenever said vehicle ignition switch is turned on, thereby permitting said vehicle disable command to be received at any time said ignition switch is turned on.

48. The invention of claim 43 wherein said controller further comprises means for turning on said telephone system at predetermined time intervals to permit incoming telephone calls to be received, wherein said engine disable commands may be received during said predetermined time intervals.

49. An interfacing system installed in a vehicle for integrating a cellular telephone system characterized by a telephone keypad with a vehicle operation disabling means, comprising:
   a system controller;
   first interfacing means for interfacing said cellular telephone system to said system controller;
   second interfacing means for interfacing said vehicle operation disabling means to said controller; and
   wherein said system controller further comprises means for enabling the operation of said disabling means under predetermined conditions, and means for disabling the operation of said vehicle disabling means upon receipt of a security code entered via said telephone keypad.

50. The system of claim 49 wherein said vehicle operation disabling means comprises means for disabling the vehicle engine ignition system.

51. The system of claim 49 wherein said means for enabling the operation of said disabling means comprises means for automatically enabling said operation a given time delay after the vehicle ignition has been turned off and the vehicle driver's door has been opened and closed.

52. The system of claim 51 wherein said controller further comprises means for programming said time delay by data entered via said keypad during a system programming mode.

53. An interfacing system installed in a vehicle for integrating a cellular telephone communication system having an operating protocol with a vehicle security system, said interfacing system comprising:
   a system controller;
   first interfacing means for interfacing said cellular telephone system to said system controller, said first means including:
      first library means for storing a plurality of specific translating tables corresponding to the different protocols of a plurality of cellular telephone systems;
      data input means responsive to data input by the system user or installer to identify the particular type of cellular telephone system installed in said vehicle, said data input means for providing a signal to the controller identifying said particular type of cellular telephone system; and
      means responsive to said signal for selecting from said library means a particular one of said sets of data corresponding to the protocol for said identified type of cellular telephone system;
   second interfacing means for interfacing said security system to said controller;
   a speech synthesizer controlled by said system controller to generate a plurality of voice messages indicative of the status of said security system;
   wherein said controller comprises means permitting a message regarding the security system status to be sent via said cellular communication system to a remote communication destination, means permitting messages to be received via said cellular communication system, and means for acting on said received messages to control one or more predetermined security system functions in response to the particular received message;
   thereby enabling said security system to be compatible with a variety of cellular telephone systems to permit communication between a user and the vehicle security system via said telephone system.

54. The invention of claim 53 wherein said unique translation tables each comprise a list of possible telephone keys and their corresponding on/off codes.

55. The invention of claim 53 wherein said cellular telephone is characterized by an on/off switch, and said system further comprises means for automatically electronically turning the cellular telephone off after the user is finished with a telephone call, but with the telephone switch still "on".

56. The invention of claim 53 wherein said interfacing means comprises means for selectively electronically locking the telephone keypad in response to the tripping of said security system to prevent an intruder from interrupting a telephone call.

57. The invention of claim 53 wherein said interfacing system includes means responsive to a system PANIC state to place a call to a user-designated telephone number and synthesize a verbal statement.

58. The system of claim 57 wherein said means responsive to a system PANIC state comprises means for repeating said verbal statement until a command is received via said telephone system indicating that a person at the user-designated telephone number is ready to speak.

59. The invention of claim 53 wherein said controller is programmable during an interfacing system programming mode to program one or more features.

60. The invention of claim 59 wherein said program mode may be enabled only after the user enters a predetermined code.

61. An interfacing system installed in a vehicle for integrating a cellular communication system having an operating protocol with a vehicle security system, the security system characterized by one or more security functions, said interfacing system comprising:
   a system controller;
   first interfacing means for interfacing said cellular communication system to said system controller, said first interfacing means including:
      first library means for storing a plurality of specific sets of data corresponding to the different protocols of a plurality of cellular communication systems; and
      data input means responsive to data input by the system user or installer to identify the particular type of cellular communication system installed in said vehicle, said data input means for providing a signal to the controller identifying said particular type of cellular communication system; and
      means responsive to said signal for selecting from said library means a particular one of said sets of data corresponding to the protocol for said identified type of cellular communication system;

second interfacing means for interfacing said security system to said controller; and wherein said controller comprises means permitting a message regarding the security system status to be sent via said cellular communication system to a remote communication destination, means permitting messages to be received via said cellular communication system, and means for acting on said received messages to control one or more predetermined security system functions in dependence on the particular received message;

thereby enabling said security system to be compatible with a variety of cellular communication systems to permit two-way communication between a user and the vehicle security system via said cellular communication system.

62. The invention of claim 61 wherein said sets of data comprise unique translation tables corresponding to the protocols of a plurality of unique cellular communication systems.

63. The invention of claim 61 including means for detecting any use of the communication system.

64. The invention of claim 61 including means for remotely starting the engine of said vehicle in response to instructions received by said controller via said communication system.

65. The invention of claim 61 including means for monitoring the operating status of the vehicle engine, third interfacing means for interfacing said controller to said monitoring means, and means permitting a user to remotely verify said engine status via said cellular communication system.

66. The invention of claim 61 wherein said unique translation tables each comprise a list of possible telephone keys and their corresponding one/off codes.

67. The invention of claim 61 wherein said cellular communication system comprises a cellular telephone, and further comprising means for automatically shutting off said cellular telephone a predetermined time delay after receipt of the last voice signals over said telephone and while the telephone on/off switch is still "on".

68. The invention of claim 61 wherein said first interfacing means includes a speech synthesizer for generating predetermined voice messages.

69. The invention of claim 68 wherein said interfacing system further comprises means for communicating said voice messages to a user via said cellular communication system indicative of the security system status.

70. The invention of claim 61 wherein said cellular communication system comprises a cellular telephone, said cellular telephone is characterized by an on/off switch, and said system further includes means for automatically electronically shutting off said cellular telephone when a call has been terminated improperly by the user and the telephone switch is still "on".

71. The invention of claim 70 wherein said means for automatically shutting off said cellular telephone comprises means for electronically hanging up and powering down said telephone a predetermined time delay after voice signals over said telephone have ended.

72. The invention of claim 70 wherein said means for automatically shutting off said cellular telephone is not operable if the vehicle ignition switch is turned off.

73. The invention of claim 61 wherein said controller comprises means for monitoring the armed status of said security system and the "system tripped" status of said security system.

74. The invention of claim 73 wherein said interfacing system further comprises a means for selectively disabling the operation of said vehicle, and said controller further comprises means for activating said disabling means when said security system is tripped.

75. The invention of claim 73 wherein said communication system comprises a cellular telephone, and said controller comprises means for making an outgoing call to a user-designated telephone number via said cellular telephone and providing a voice-synthesized message indicating that the security system has been tripped.

76. The invention of claim 75 wherein said interfacing system further comprises means for interfacing an automated vehicle positioning system to said system controller, said positioning system characterized in that it requires no driver input or attention in normal use, and said controller is further responsive to the tripping of the security system to send tracking data messages generated by said automated positioning system over said communication system indicative of the vehicle position, said messages comprising voice-synthesized messages which describe the position of the vehicle.

77. The invention of claim 75 wherein said interfacing system further includes a means for interfacing a pager system to said controller, wherein said controller activates the operation of said pager system in the event said security system is tripped, wherein said pager system is responsive to telephone tones received at a predetermined pager telephone number, said pager interfacing means comprising means for placing an outgoing call via said cellular telephone to said pager telephone number, means for detecting an answering by said pager system at said telephone number, and means for generating a predetermined sequence of tones for transmission over said cellular telephone to said pager system.

78. The invention of claim 61 wherein said controller comprises a digital computer means for executing a computer program and a first memory means for storing a program for execution by said controller, and said program includes a state control module for executing any of a plurality of foreground routines thereby controlling the operating mode of said system for integrating said cellular communication system with said vehicle security system.

79. The invention of claim 78 wherein said cellular communication system comprises a cellular telephone, and said program includes a foreground routine for allowing said system for integrating said cellular system with said vehicle security system to receive and act on an incoming telephone call through said cellular telephone.

80. The invention of claim 78 wherein said cellular communication system comprises a cellular telephone, and said program includes a serial telephone receive buffer routine which provides for interrupts to the foreground routines from the keypad of a handset of said cellular telephone allowing the system to act on commands entered via the cellular telephone keypad.

81. The invention of claim 78 wherein said program includes a tachometer routine for providing interrupts to foreground routines from an engine revolution per minute detecting device associated with a vehicle in which said system for integrating said cellular communication system with said vehicle security system is mounted.

82. The invention of claim 78 wherein said program includes a foreground routine for allowing said interfacing system to be programmed through said cellular communication system.

83. The invention of claim 82 wherein said cellular communication system comprises a cellular telephone, and said program includes a foreground routine for allowing said system for integrating said cellular system with said vehicle security system to place an outgoing telephone call through said cellular telephone.

84. The invention of claim 78 wherein said program includes at least one background routine which performs a variety of functions related to the status of said system for integrating said cellular communication system with said vehicle security system independently of said foreground routines.

85. The invention of claim 84 including a periodic timer routine for checking the status of the security system, the status of the user of the cellular system, general system input/output status, and execution of service subroutines.

86. The invention of claim 84 wherein said program includes a speedometer background routine for providing interrupts to foreground routines from a vehicle speed indicating device.

87. The invention of claim 61 wherein said interfacing system further comprises third interfacing means for interfacing said controller to said vehicle to selectively interact with one or more operating systems of said vehicle.

88. The invention of claim 87 wherein said operating systems of vehicle comprises the vehicle engine system, whereby the controller monitors the operating status of the vehicle engine.

89. The invention of claim 87 wherein said operating system comprises the vehicle engine starting system, and said controller is responsive to an engine start signal received via said cellular communication system to remotely start the vehicle engine.

90. The invention of claim 87 wherein said interfacing system further comprises means activated by said controller for disabling the operation of the vehicle, and said controller further comprises means for activating said disabling means in response to a vehicle disable command received via said cellular communication system.

91. The invention of claim 90 wherein said interfacing system further comprises means for providing a speed signal indicative of the engine speed of said vehicle engine or the speed of the vehicle, and said controller is responsive to said speed signal and said vehicle disable command to activate said vehicle disabling means after receipt of said command and at such time as the engine speed or the vehicle speed is at or below a predetermined threshold value.

92. The invention of claim 91 wherein said speed signal is an engine tachometer signal.

* * * * *